United States Patent [19]

Yamamoto et al.

[11] Patent Number: 5,663,818
[45] Date of Patent: Sep. 2, 1997

[54] OPTICAL CONCENTRATOR AND OPTICAL COMMUNICATION NETWORK USING THE SAME

[75] Inventors: Noboru Yamamoto, Yamato; Toru Nakata, Yokohama; Kazuhiko Hojyo, Atsugi, all of Japan

[73] Assignee: Canon Kabushiki Kaisha, Tokyo, Japan

[21] Appl. No.: 136,698

[22] Filed: Oct. 15, 1993

[30] Foreign Application Priority Data

| Oct. 15, 1992 | [JP] | Japan | 4-302963 |
| May 25, 1993 | [JP] | Japan | 5-122637 |
| Jul. 8, 1993 | [JP] | Japan | 5-169200 |
| Jul. 16, 1993 | [JP] | Japan | 5-176773 |
| Oct. 8, 1993 | [JP] | Japan | 5-253054 |
| Oct. 8, 1993 | [JP] | Japan | 5-253055 |
| Oct. 8, 1993 | [JP] | Japan | 5-277764 |

[51] Int. Cl.$^6$ .......................... H04B 10/20; H04J 14/00; H04J 14/02
[52] U.S. Cl. .......................... 359/118; 359/119; 359/121; 359/127; 359/128
[58] Field of Search .......................... 359/124, 125, 359/126, 127, 118, 119, 120, 121, 173, 128, 166, 168

[56] References Cited

U.S. PATENT DOCUMENTS

| 3,986,020 | 10/1976 | Kogelnik | 250/199 |
| 4,781,427 | 11/1988 | Husbands et al. | 359/173 |
| 5,127,067 | 6/1992 | Delcoco et al. | 359/127 |
| 5,365,344 | 11/1994 | Eda et al. | 359/124 |
| 5,369,515 | 11/1994 | Majima | 359/125 |
| 5,404,241 | 4/1995 | Ota | 359/121 |

FOREIGN PATENT DOCUMENTS

| 0494831A2 | 7/1992 | European Pat. Off. |
| WO8501850 | 4/1985 | WIPO . |

OTHER PUBLICATIONS

C.A. Brackett, Dense Wavelength Division Multiplexing Networks: Principles and Applications; IEEE Journal on Selected Areas in Communications, vol. 8, No. 6, pp. 948–963.

"Photonic Access Network Architecture", Takashi Nakashima, et al., Countdown to the New Millennium, Globecom '91, IEEE Global Telecommunications Conference, Phoenix, Arizona, Dec. 2–5, 1991, vol. 1, pp. 0602–0606.

S. Wagner and T. Chapuran, *Multiwavelength Ring Networks for Switch Consolidation and Interconnection*, Conference Record, International Conference on Communications '92, vol. 3, pp. 1173–1179 (1992).

G.R. Hill, *A Wavelength Routing Approach to Optical Communications Networks*, Proceedings, Infocom '88, 7th Annual Joint Conference of the IEEE Computer and Communication Societies, pp. 354–361 (1988).

(List continued on next page.)

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

In an optical concentrator a plurality of ports are provided for inputting and outputting first and second optical signals having different wavelength regions. An optical coupler is connected to each of the plurality of ports without being through remaining ones of the plurality of ports. The optical coupler transmits the second optical signal input from one of the plurality of ports to at least one of the remaining ports. A transmitter is provided to connect the plurality of ports in a loop form. The first optical signal input from each port is transmitted from the transmitter. Demultiplexers are arranged at each port for demultiplexing the first and second optical signals input from each port so as to guide the first optical signal to the transmitter and the second optical signal to the optical coupler.

83 Claims, 45 Drawing Sheets

OTHER PUBLICATIONS

L. Ciminiera, C. Demartini, A. Serra, a. Valenzano, *Fiber Optic Local Area Networks*, International Journal of Mini & Microcomputers, vol. 10, No. 3, pp. 62–67 (1988).

J. Sasaki, N. Takato, *An Optical Multiaccessor Designed for a Fiber–Optic Star–Ring LAN*, Journal of Lightwave Technology, vol. 10, No. 2, pp. 250–254 (1992).

T. Lee, M. Goodman and E. Arthurs, *A Broadband Optical Multicast Switch*, Proceedings, International Switching Symposium 1990, pp. 7–13 (1990).

F. Ellefson, *Migration of Fault Tolerant Networks*, Conference Record, IEEE Global Telecommunications Conference, 2–5 Dec. 1990, vol. 1, pp. 65–71 (1990).

C. Yang, L. Zu and M. Sau, *Reconfigurable ring connected modular tree architecture*, International Journal of Electronics, vol. 72, No. 3, pp. 471–482 (1992).

OPTICAL CONCENTRATOR AND OPTICAL COMMUNICATION NETWORK USING THE SAME

BACKGROUND OF THE INVENTION

1. Field of the Invention

The present invention relates to an optical concentrator and an optical communication network using the same.

2. Related Background Art

Along with developments of computers and their peripheral devices, a LAN (Local Area Network) for networking the computers and their peripheral devices has been popular. LANs are classified into LANs using an electrical signal, an optical signal, and a radio signal. LANs can also be classified into a data type LAN and a video type LAN in accordance with types of information. A typical data type optical LAN is an FDDI (Fiber Distributed Data Interface). The network configuration of the FDDI is shown in FIG. 1. This configuration is obtained by coupling stations (nodes) through links constituted by optical fiber transmission channels. Stations are classified into a dual attachment station 1711 and single attachment stations 1701, 1702, .... The dual attachment station constitutes a dual ring using two links. One dual ring 1741 is used for actual data transmission, while the other dual ring 1742 is used during a system failure.

Each single attachment station has only one link. The single attachment stations are connected to concentrators 1721, 1722, 1723, and 1731 capable of connecting a plurality of single attachment stations through upstream and downstream optical fibers 1751 and 1761, thereby constituting a single ring.

The concentrator has a function of arranging single attachment stations in a star shape to increase the number of single attachment stations which perform loop type communication. The schematic arrangement of a concentrator having four ports is shown in FIG. 2. This concentrator has input ports 1811, 1812, 1813, and 1814 to which upstream optical fibers are connected, and output ports 1821, 1822, 1823, and 1824 to which downstream optical fibers are connected. Optical receivers (O/Es) 1831, 1832, 1833, and 1834 convert input optical signals into electrical signals, and optical transmitters (E/Os) 1841, 1842, 1843, and 1844 convert electrical signals into optical signals and output the optical signals. The fourth port (constituted by input and output ports) in FIG. 2 serve as a repeating port. Nodes are respectively connected to the first, second, and third ports through optical fiber transmission channels, respectively. For example, an FDDI optical signal output from the node connected to the first port is input to the input port 1811 and converted into an electrical signal by the optical receiver 1831. This electrical signal is then converted into an optical signal again by the optical transmitter 1842. This optical signal is sent from the output port 1822 to the node connected to the second port. Other optical signals are sent in the same manner as described above. Therefore, the optical signals are sent to another concentrator through the repeating port.

Each concentrator has a repeating function of converting an input optical signal into an electrical signal and then this electrical signal into an optical signal again and outputting the optical signal (this function will be referred to as electrical regenerative repeating or simply regenerative repeating hereinafter). FDDI optical signals are sequentially sent to the nodes. In the FDDI, a signal is transmitted by packet switching or a combination of packet switching and circuit switching. In a node such as a single or dual attachment station, an optical signal is appropriately processed after being converted into an electrical signal, and then the electrical signal is converted into an optical signal again, thereby outputting the resultant optical signal.

On the other hand, a large-capacity communication channel is required for a video type LAN because it processes information having a large volume. For this reason, a low-end video type LAN apparatus which can be used in a general office is not yet developed. However, a broad ISDN (B-ISDN) or the like has been considered as a future video network. In this network, subscribers are connected in a star shape centered on a circuit exchanger or switching unit, and the subscribers can exchange information having a large volume such as video information with each other.

Higher-performance computer systems have been developed, and a high-speed computer network centered on a supercomputer has been recently prepared.

An HIPPI (High Performance Parallel Interface) has recently received a great deal of attention as an input/output interface for a supercomputer, and standardization of the HIPPI is in progress at the ANSI (American National Standard Institute). The HIPPI is an interface for transferring a parallel signal having a 4-byte width at a rate of 100 Mb/s and can be utilized for communication between supercomputers and video transfer. A high-speed network configuration using the HIPPI is shown in FIG. 3. This configuration is obtained by coupling workstations (WSs) and a supercomputer (SC) through access units (AUs) via a link constituted by a transmission channel as of optical fibers. Workstations (WSs) 1901, 1902, and 1903 are connected to access units (AUs) 1922 and 1923 through transmission channels 1941, 1942, and 1943 of a branch LAN. A supercomputer (SC) 1911 is connected to the access unit 1921 through a transmission channel 1951 of the HIPPI standards. The access units 1921, 1922, and 1923 are respectively connected to optical fiber transmission channels 1931, 1932, and 1933 of a very-high-speed backbone LAN. Communication between the workstations and the supercomputer is performed such that the WS 1901 converts an internal parallel signal into a serial or parallel signal of the branch LAN standards and outputs the serial or parallel signal to the AU 1922 through the transmission channel 1943. The AU 1922 converts this signal into a serial signal of the very-high-speed backbone LAND standards and outputs it to the AU 1921 through the optical fiber transmission channel. The AU 1921 converts this signal into a parallel signal of the HIPPI standards to access the SC 1911 through the transmission channel 1951. The SC 1911 transmits a signal processing result to the WS 1901 in procedures reverse to the procedures described above, thereby completing the communication. In this manner, each WS communicates with the SC or another WS.

However, when a workstation or supercomputer processes information having a large volume, the capacity of the backbone LAN is undesirably increased, and the communication circuits of the backbone LAN apparatus or workstation are overloaded. Even if an optical signal is used to increase the communication capacity, the following problem is posed by a loop type optical LAN such as an FDDI. In a station (node) or concentrator, the electrical circuit of the station is overloaded in multi-channel transmission of high-speed signals such as video signals because the optical signal is converted into an electrical signal. In addition, in time division multiplex communication, a circuit switching type optical network must switch a communication route for each packet, thereby complicating the switching unit or exchanger and failing to perform a high-speed operation. In addition, it is difficult to transmit a signal to a plurality of arbitrary subscribers.

In order to solve these problems, a network in which a loop type LAN is arranged integrally with a star type LAN is taken into consideration. The loop type LAN transmits a time division Signal or the like, while the star type LAN transmits a large-capacity signal. In this manner, the circuit is switched in accordance with the types of signals. For example, such a network is proposed in IEEE JOURNAL ON SELECTED AREAS IN COMMUNICATIONS, VOL. 8, NO. 6, PP. 948–963, AUGUST 1990 or the like. FIG. 4 shows the configuration of such a network. This network includes nodes 7611, 7612, . . . 7615, a loop circuit transmission channel 7621, a loop circuit backup transmission channel 7622, and a star circuit transmission channel 7623. A time division signal such as an FDDI signal is transmitted through the loop circuit, and a large-capacity signal such as a video signal is transmitted through the star circuit, thereby compensating for the drawbacks of each other.

However, the above network undesirably has a long total transmission channel and a difficulty in expansion of the network because the transmission channels are independently installed. Dual attachment is generally provided for the loop type transmission channel to overcome failures such as disconnections of transmission channels and failures of node devices. In this case, if failures have occurred in a plurality of locations, the network is undesirably divided.

SUMMARY OF THE INVENTION

It is an object of the present invention to provide a simple optical concentrator capable of solving the conventional problems described above and properly transmitting different types of signals such as a data signal and a video signal, and an optical communication network using this optical concentrator.

It is another object of the present invention to provide a simple optical concentrator capable of properly transmitting the different types of signals and overcoming failures such as failures of node devices, and an optical communication network using this optical concentrator.

According to one aspect of the present invention, there is provided an optical concentrator which includes:

a plurality of ports for inputting and outputting first and second optical signals having different wavelength regions;

an optical coupler connected to each of the plurality of ports, the optical coupler transmitting the second optical signal input from one of the plurality of ports to at least one of the remaining ports;

transmitting means for connecting the plurality of ports in a loop form and transmitting the first optical signal input from each port; and demultiplexing means, arranged at each port, for demultiplexing the first and second optical signals input from each port, and guiding the first optical signal to the transmitting means and the second optical signal to the optical coupler.

According to another aspect of the present invention, there is provided an optical communication network which includes:

an optical concentrator having a plurality of ports for inputting and outputting first and second optical signals having different wavelength regions; and a plurality of nodes connected to said ports of the optical concentrator;

wherein the optical concentrator includes an optical coupler connected to each of the plurality of ports, the optical coupler transmitting the second optical signal input from one of the plurality of ports to at least one of the remaining ports, transmitting means for connecting the plurality of ports in a loop form and transmitting the first optical signal input from each port, and demultiplexing means, arranged at each port, for demultiplexing the first and second optical signals input from each port, and guiding the first optical signal to the transmitting means and the second optical signal to the optical coupler.

According to a further aspect of the present invention, there is provided an optical communication network including:

a first optical concentrator having a plurality of ports for inputting and outputting first and second optical signals having different wavelength regions;

a second optical concentrator having a repeating port connected to one of the plurality of ports of the first concentrator and a plurality of ports for inputting and outputting the first and second optical signals;

and a plurality of nodes connected to all ports except for the repeating port of the second optical concentrator;

wherein the second optical concentrator includes a first tree coupler for dividing the second optical signal input from the repeating port to all ports except for the repeating port, a second tree coupler for transmitting the second optical signals input from all the ports except for the repeating port to the repeating port, transmitting means for connecting the repeating port and all the ports except for the repeating ports in a loop form and transmitting the first signal input from each port, first demultiplexing means, arranged at the repeating port, for demultiplexing the first and second optical signals input from the repeating port, and guiding the first optical signal to the transmitting means and the second optical signal to the first tree coupler, and second demultiplexing means, arranged at each port except for the repeating port, for demultiplexing the first and second optical signals input from each port, and guiding the first signal to the transmitting means and the second optical signal to the second tree coupler.

According to a further aspect of the present invention, there is provided a method of transmitting optical signals using an optical concentrator comprising a plurality of ports, an optical coupler having ports each of which is connected without being through remaining ones of the plurality of ports, and transmitting means for connecting the plurality of ports in a loop form, wherein the method comprises the steps of:

inputting first and second optical signals having different wavelength regions from one of the plurality of ports;

demultiplexing the first and second optical signals input from said one port;

transmitting the demultiplexed first optical signal through said transmitting means; and transmitting the demultiplexed second optical signal to at least one of the remaining ports by the optical coupler.

According to another aspect of the present invention, there is provided an optical concentrator which comprises:

N (where N is an integer of not less than two) ports for inputting and outputting optical signals;

N wavelength division demultiplexers, respectively, connected to said N ports, for demultiplexing the optical signals input from the N ports into first and second portions;

an optical coupler, connected to the N wavelength division demultiplexers, for outputting the second portion of the optical signal input from one of the N ports to at least one of remaining ports; and N wavelength division multiplexers, respectively connected to the N ports and arranged such that a first wavelength division multiplexer of the N wavelength division multiplexers multiplexes the first portion of the optical signal demultiplexed by an N-th wavelength division demultiplexer and the second portion of the optical signal output from the optical coupler, and a k-th (where k=1, 2, . . . N) wavelength division multiplexer multiplexes the first portion of the optical signal demultiplexed by a (k−1)-th wavelength division demultiplexer and the second portion of the optical signal output from the optical coupler.

According to a further aspect of the present invention, there is provided an optical communication network which comprises:

an optical concentrator having N (where N is an integer of not less than two) ports for inputting and outputting optical signals; and a plurality of nodes connected to the N ports of the optical concentrator;

wherein the optical concentrator comprises:

N wavelength division demultiplexers, respectively, connected to the N ports, for demultiplexing the optical signals input from the N ports into first and second portions, an optical coupler, connected to the N wavelength division demultiplexers, for outputting the second portion of the optical signal input from one of the N ports to at least one of remaining ports, and N wavelength division multiplexers, respectively connected to the N ports and arranged such that a first wavelength division multiplexer of the N wavelength division multiplexers multiplexes the first portion of the optical signal demultiplexed by an N-th wavelength division demultiplexer and the second portion of the optical signal output from the optical coupler, and a k-th (where k=1, 2, . . . N) wavelength division multiplexer multiplexes the first portion of the optical signal demultiplexed by a (k−1)-th wavelength division demultiplexer and the second portion of the optical signal output from the optical coupler.

According to a still further aspect of the present invention, there is provided an optical concentrator which comprises:

N (where N is an integer of not less than two) ports for inputting and outputting first and second optical signals, each of the N ports having a first input terminal for inputting the first optical signal, a second input terminal for inputting the second optical signal, a first output terminal for outputting the first optical signal, and a second output terminal for outputting the second optical signal;

an optical coupler, connected to the second input and output terminals of the N ports, for outputting the second optical signal input from the second input terminal of one of the N ports to the second output terminal of at least one of remaining ports; and transmitting means for connecting the N ports in a loop form, the transmitting means connecting the first input terminal of a first port to the first output terminal of an N-th port and the first input terminal of a k-th (where k=1, 2, . . . N) port to the first output terminal of a (k−1)-th port.

According to yet another aspect of the present invention, there is provided an optical communication network which comprises:

an optical concentrator having N (wherein N is an integer of not less than two) ports for inputting and outputting first and second optical signals; and a plurality of nodes connected to the N ports of the optical concentrator;

each port of the optical concentrator having a first input terminal for inputting the first optical signal, a second input terminal for inputting the second optical signal, a first output terminal for outputting the first optical signal, and a second output terminal for outputting the second optical signal, and wherein the optical concentrator further comprises an optical coupler, connected to the second input and output terminals of the N ports, for outputting the second optical signal input from the second input terminal of one of the N ports to said second output terminal of at least one of remaining ports, and transmitting means for connecting the N ports in a loop form, the transmitting means connecting the first input terminal of a first port to the first output terminal of an N-th port and the first input terminal of a k-th (where k=1, 2, . . . N) port to the first output terminal of a (k−1)-th port.

DETAILED DESCRIPTION OF THE PREFERRED EMBODIMENTS

Figure 5:
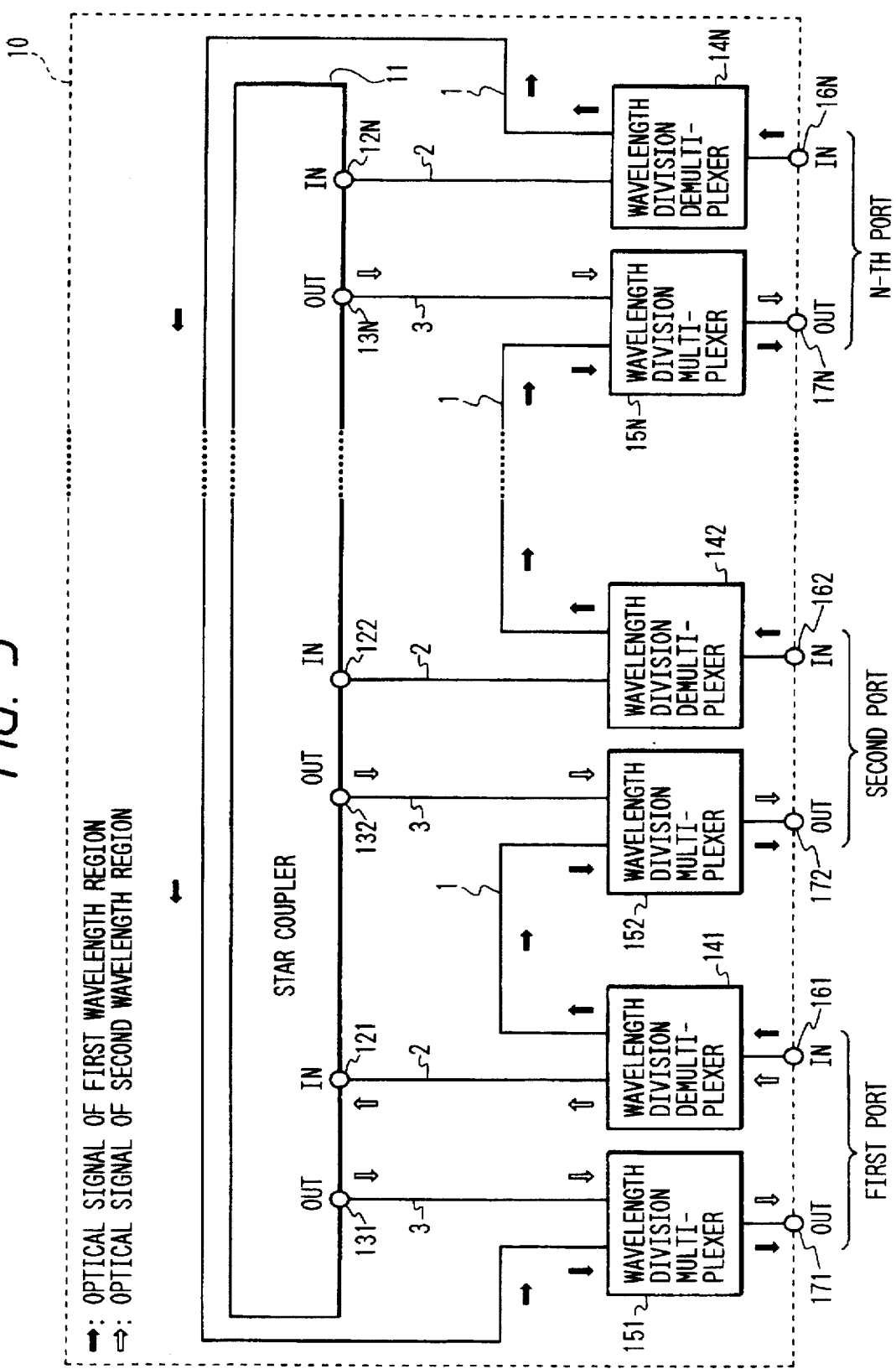
FIG. 5 is a block diagram showing the first embodiment of an optical concentrator according to the present invention.
Figure 6:
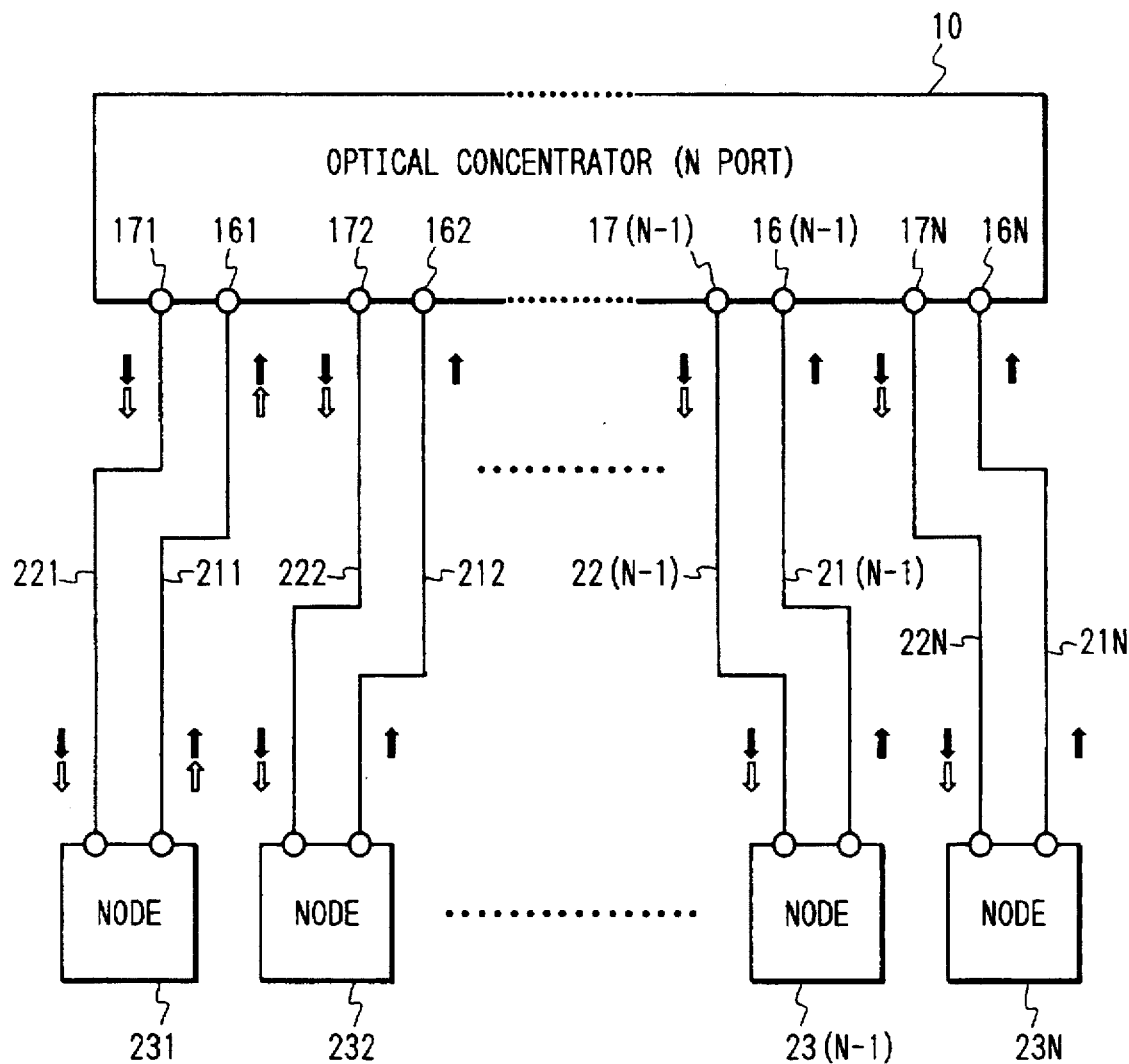
FIG. 6 is a block diagram showing the first embodiment of an optical communication network using the optical concentrator of the present invention.
Figure 7:
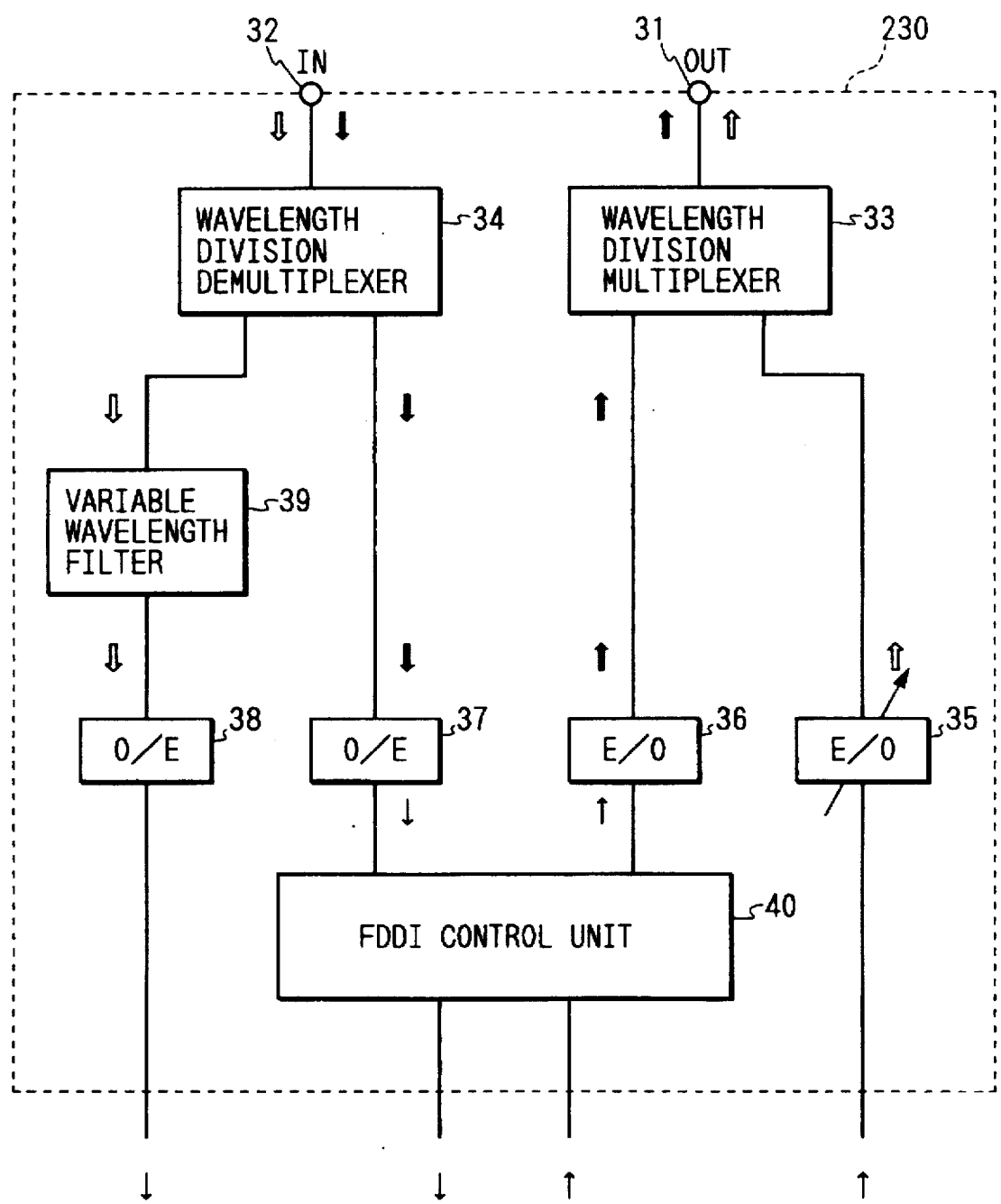
FIG. 7 is a block diagram showing the arrangement of an optical node used in the optical communication network of the present invention.

FIGS. 5 and 6 are block diagrams showing the first embodiment of the present invention. FIG. 5 shows the first embodiment of an optical concentrator according to the present invention, and FIG. 6 shows the arrangement of an optical communication network using this concentrator. FIG. 7 shows the arrangement of a node suitably used in this optical communication network. The arrangements of the optical concentrator, the optical communication network, and the node will be described with reference to FIGS. 5 to 7.

An N×N (N is an integer of two or more) star coupler 11 has N input terminals 121, 122, . . . 12N and N output terminals 131, 132, . . . 13N, wherein 121 and 131, 122 and 132, . . . constitute sets (pairs) of input and output terminals. For example, an optical signal input to the input terminal 121 is divided in the star coupler 11 and is output from the output terminals 131, 132, . . . 13N. An optical signal input to another input terminal is also output from the output terminals 131, 132, 133, . . . in the same manner as described above. Each of wavelength division demultiplexers 141, 142, . . . 14N demultiplexes a first wavelength region (i.e., a solid black arrow) from a second wavelength region (i.e., a hollow arrow). Each output terminal of the second wavelength region is connected to the corresponding input terminal of the star coupler 11. The input terminals of the wavelength division demultiplexers 141, 142, . . . 14N respectively serve as input ports 161, 162, . . . 16N of a concentrator 10 of this embodiment. Wavelength division multiplexers 151, 152, . . . 15N multiplex the optical signals of the first and second wavelength regions. The input terminals of the second wavelength region are respectively connected to the output terminals 131, 132, . . . 13N of the star coupler 11. The output terminals of the wavelength division multiplexers respectively serve as output ports 171, 172, . . . 17N of the concentrator 10.

The output terminals of the first wavelength region of the wavelength division demultiplexers 141, 142, . . . 14N are connected to the input terminals of the first wavelength region of the wavelength division multiplexers 151, 152, . . . 15N of the next ones of ports arranged in a predetermined order. That is, referring to FIG. 5, the output terminal of the first wavelength region of the wavelength division demultiplexer 141 is connected to the input terminal of the first wavelength region of the wavelength division multiplexer 152, and the output terminal of the first wavelength region of the wavelength division demultiplexer 142 is connected to the input terminal of the first wavelength region of the wavelength division multiplexer 153 (not shown in FIG. 5).

Similarly, the output terminal of the first wavelength region of the wavelength division demultiplexer 14N of the N-th port is connected to the input terminal of the first wavelength region of the wavelength division multiplexer 151 of the first port.

Of the N wavelength division multiplexers 151, 152, ... 15N, the first wavelength division multiplexer 151 multiplexes the optical signal of the first wavelength region demultiplexed by the N-th wavelength division demultiplexer 14N with the optical signal of the second wavelength region output from the output terminal 131. If k=1, 2, ... N, then the k-th wavelength division multiplexer multiplexes the optical signal of the first wavelength region demultiplexed by the (k−1)-th wavelength division demultiplexer with the optical signal of the second wavelength region output from the k-th output terminal of the star coupler 11. Each wavelength division demultiplexer is connected to a corresponding wavelength division multiplexer through an optical transmission channel 1 constituted by optical fibers. Each output terminal of the star coupler 11 is connected to each wavelength division multiplexer through an optical transmission channel 3 constituted by optical fibers. Each input terminal of the star coupler 11 is connected to each wavelength division demultiplexer through an optical transmission channel 2 constituted by optical fibers.

Referring to FIG. 6, the concentrator 10 having the arrangement described with reference to FIG. 5 has N input ports and N output ports. Optical fibers (upstream optical fibers) 211, 212, ... 21(N−1), and 21N transmit optical signals from nodes 231, 232, ... 23(N−1), and 23N to the concentrator 10, and are respectively connected to the input ports 161, 162, ... 16(N−1), and 16N. Optical fibers (downstream optical fibers) 221, 222, ... 22(N−1), and 22N transmit output optical signals from the concentrator 10 to the respective nodes and are respectively connected to the output ports 171, 172, ... 17(N−1), and 17N.

Referring to FIG. 7, a node 230 has output and input terminals 31 and 32. The output and input terminals 31 and 32 are connected to the corresponding input and output ports of the concentrator 10 through the corresponding optical fiber transmission channel. A wavelength division multiplexer 33 has almost the same optical multiplexing characteristics as those of the wavelength division multiplexers 151, 152, ... 15N in the concentrator 10 in FIG. 5. The output terminal of the wavelength division multiplexer 33 is connected to the output terminal 31 of the node 230 to multiplex the optical signal of the first wavelength region with the optical signal of the second wavelength region. A wavelength division demultiplexer 34 has almost the same optical demultiplexing characteristics as those of the wavelength division demultiplexers 141, 142, ... 14N in the optical concentrator 10 in FIG. 5. The input terminal of the wavelength division demultiplexer 34 is connected to the input terminal 32 of the node 230 to demultiplex the signal into the optical signal of the first wavelength region and the optical signal of the second wavelength region. An optical transmitter (E/O) 35 has a light source for outputting an optical signal in the second wavelength region and is connected to the input terminal of the second wavelength region of the wavelength division multiplexer 33. In this embodiment, a variable wavelength semiconductor laser for outputting an optical wavelength signal which is wavelength-multiplexed in the second wavelength region is used as the light source. In a signal transmission mode, an appropriate optical wavelength is selected from the wavelengths multiplexed in the second wavelength region is selected, and this variable wavelength semiconductor laser outputs an optical signal having the selected wavelength.

An optical transmitter (E/O) 36 has a light source for outputting a light signal in the first wavelength region and is connected to the input terminal of the first wavelength region of the wavelength division multiplexer 33. The optical transmitter 36 is connected to an FDDI control unit 40 to convert a signal from a computer (not shown in FIG. 7) into an optical signal. An optical receiver (O/E) 37 is connected to the output terminal of the first wavelength region of the wavelength division demultiplexer 34 to convert the optical signal of the first wavelength region into an electrical signal. This electrical signal is sent to the FDDI control unit 40. A variable wavelength filter 39 has the input terminal connected to the output terminal of the second wavelength region of the wavelength division demultiplexer 34, selects an arbitrary wavelength signal selected from the plurality of wavelengths multiplexed in the second wavelength region, and outputs the selected wavelength. The output wavelength signal is sent to the optical receiver (O/E) 38. Note that the optical transmitting means and the optical receiving means in the node 230 are particularly illustrated, and other parts are not illustrated in FIG. 7.

The operations of the concentrator and the optical communication network using the concentration according to this embodiment will be described with reference to FIGS. 5, 6, and 7. In the following description, assume that an optical signal is sent from the node 231 connected to the input port 161 of the concentrator 10 through the upstream optical fiber 211 and is received by the node 231 connected to the output port 171 of the concentrator 10 through the downstream optical fiber 221. A signal output from the FDDI control unit 40 is converted into an optical signal of the first wavelength region by the optical transmitter 36. This optical signal passes through the wavelength division multiplexer 33 and is output to the upstream optical fiber 211 from the output terminal 31. The above optical signal transmitted through the optical fiber 211 and input to the input port 161 of the first port of the concentrator 10 is demultiplexed by the wavelength division demultiplexer 141 and is input to the wavelength division multiplexer 152 of the second port as the adjacent port. The optical signal output from the wavelength division multiplexer 152 is transmitted to the node 232 through the downstream optical fiber 222 connected to the output port 172. In the node 232, the optical fiber is demultiplexed by the wavelength division demultiplexer 34 and is converted into an electrical signal by the optical receiver 37. This electrical signal is then supplied to the FDDI control unit 40. The FDDI control unit 40 analyzes the contents of the received signal and sends a necessary signal to the optical transmitter 36. This signal is converted into an optical signal of the first wavelength region by the optical transmitter 36, and the optical signal is then output from the output terminal 31 to the upstream optical fiber 212 through the wavelength division multiplexer 33. The optical signal of the first wavelength region output from the node 232 connected to the second port is input to the input port 162 of the second port of the concentrator 10. The input signal is demultiplexed by the wavelength division demultiplexer 142 and is input to the wavelength division multiplexer (not shown in FIG. 5) of the third port as the next port. Similarly, the optical signal of the first wavelength region is sequentially supplied to a plurality of ports arranged in a predetermined order. Therefore, the optical signal of the first wavelength region is sequentially transmitted to the respective nodes connected to the concentrator 10, so that a loop-like transmission circuit is formed, thereby performing loop type optical communication between the nodes 231, 232, ... 23(N−1), and 23N.

On the other hand, an optical signal of the second wavelength region output from the optical transmitter 35 in the node 231 is multiplexed with an optical signal of the first wavelength region by the wavelength division multiplexer 33, and the resultant signal is output from the output terminal 31 to the optical fiber 211. This signal is input to the input port 161 of the first port of the concentrator 10. The optical signal of the second wavelength region of the input signal is demultiplexed from the optical signal of the first wavelength region by the wavelength division demultiplexer 141. Only the optical signal of the second wavelength region is input to the input terminal 121 of the star coupler 11 and is divided to the output terminals 131, 132, . . . 13N in the star coupler 11. For example, the optical signal output to the output terminal 132 is multiplexed with the optical signal of the first wavelength region by the connected wavelength division multiplexer 152, and the resultant signal is output from the output port 172 through the downstream optical fiber 222. This signal is then input to the node 232. In the node 232, the optical signal of the second wavelength region is demultiplexed from the optical signal of the first wavelength region by the wavelength division demultiplexer 34, and only the optical signal of the second wavelength region is input to the variable wavelength filter 39. When the transmission wavelength of the variable wavelength filter 39 is set to the wavelength of the optical signal sent from the node 231, this wavelength signal can be received by the optical receiver 38. Remaining optical signals divided except for the output terminal 132 of the star coupler 11 can be received by the respective nodes in the same manner as described above.

When each node outputs optical wavelength signals wavelength-multiplexed in the second wavelength region (an optical wavelength signal is also transmitted from the N-th node in FIG. 5), each node can select a target wavelength signal using the corresponding variable wavelength filter 39 and can receive the signal without radio interference. In this manner, the optical signal of the second wavelength region can be divided to each port of the concentrator 10 and can be transmitted in a star type optical communication form. In particular, since the optical signal of the second wavelength region passes through only a passive optical element, highly reliable communication can be performed. In addition, as described in this embodiment, wavelength multiplexing in the second wavelength region can be performed, and a large number of high-speed signals can be simultaneously and easily transmitted.

As described above, the nodes 231, 232, . . . 23(N-1), and 23N are connected to the concentrator 10 of this embodiment through the upstream and downstream optical fibers to constitute a wavelength multiplex optical communication network in which a loop type optical communication system and a star type optical communication system are integrated.

In this embodiment, each node has loop and star type optical transmitters and loop and star type optical receivers. However, the network can be properly operated even if one or both of the star type optical transmitter 35 and the optical receiver 38 are not arranged.

The light source of the second wavelength region and the filter are exemplified by the variable wavelength light source and the variable wavelength filter, respectively. However, a plurality of fixed wavelength light sources and a plurality of fixed filters which have different wavelengths in the second wavelength region may be used.

Figure 8:
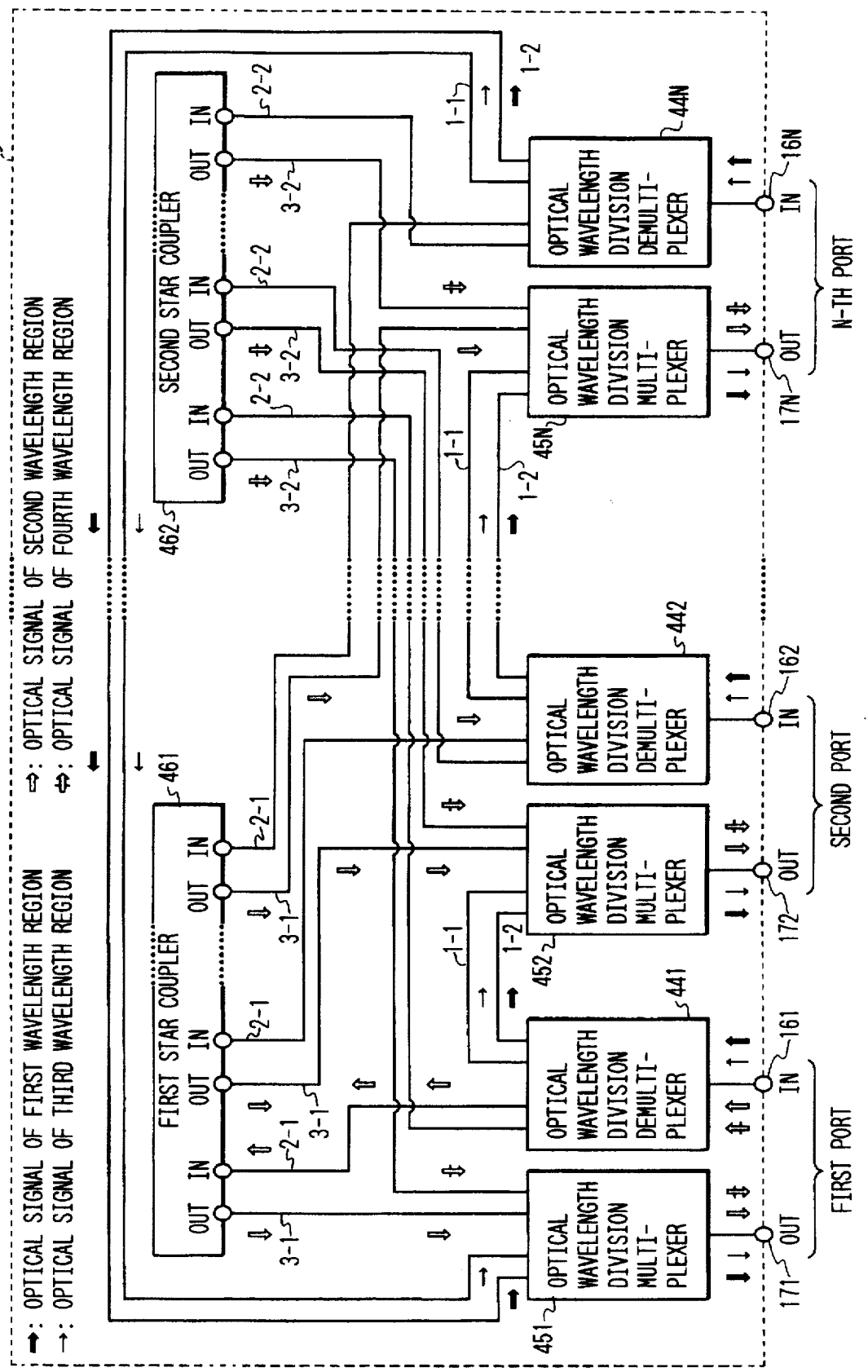
FIG. 8 is a block diagram showing the second embodiment of an optical concentrator according to the present invention.

The second embodiment of the present invention will be described with reference to FIG. 8. FIG. 8 shows the arrangement of the second embodiment of an optical concentrator according to the present invention.

A concentrator 410 of this embodiment has a plurality of wavelength regions for performing loop type optical communication and a plurality of wavelength regions for performing star type optical communication. The first and third wavelength regions are assigned to loop type optical communication, while the second and fourth wavelength regions are assigned to star type optical communication, as shown in FIG. 8. Referring to FIG. 8, each of wavelength division demultiplexers 441, 442, . . . 44N has demultiplexing characteristics in the first, second, third, and fourth wavelength regions. Each of wavelength division multiplexers 451, 452, . . . 45N has multiplexing characteristics in the first, second, third, and fourth wavelength regions. The output terminals of the first and third wavelength regions of the wavelength division demultiplexers 441, 442, . . . 44N are connected to the input terminals of the first and third wavelength regions of the wavelength division multiplexers 451, 452, . . . 45N of next ones of the ports arranged in a predetermined order as in the optical concentrator 10 of the first embodiment. For example, the wavelength division demultiplexer 441 is connected to the wavelength division multiplexer 452, and the wavelength division demultiplexer 44N is connected to the wavelength division multiplexer 451. The output terminals of the second and fourth wavelength regions of the wavelength division demultiplexers 441, 442, . . . 44N are connected to the input terminals of star couplers 461 and 462 in the same manner as in the optical concentrator 10 of the first embodiment. The input terminals of the second and fourth wavelength regions of the wavelength division multiplexers 451, 452, . . . 45N are connected to the output terminals of star couplers 461 and 462. Note that two N×N star couplers are used in this embodiment, so that an optical signal of the second wavelength region passes through the first star coupler 461, while an optical signal of the fourth wavelength region passes through the second star coupler 462.

In this embodiment, each wavelength division demultiplexer is connected to a corresponding wavelength division multiplexer through optical transmission channels 1-1 and 1-2 constituted by optical fibers. Each output terminal of the first star coupler 461 is connected to a corresponding wavelength division multiplexer through an optical transmission channel 3-1 constituted by optical fibers. Each input terminal of the first star coupler 461 is connected to a corresponding wavelength division demultiplexer through an optical transmission channel 2-1 constituted by optical fibers. Similarly, each output terminal of the second star coupler 462 is connected to a corresponding wavelength division multiplexer through an optical transmission channel 3-2 constituted by optical fibers. Each input terminal of the second star coupler 462 is connected to a corresponding wavelength division demultiplexer through an optical transmission channel 2-2 constituted by optical fibers.

The operation of the optical concentrator 410 of this embodiment will be described below. An optical signal of the first wavelength region and an optical signal of the third wavelength region are sequentially transmitted to the node connected to the ports arranged in the predetermined order in the same manner as the optical signal of the first wavelength region of the optical concentrator 10 of the first embodiment, thereby performing loop type optical communication. A node connected to the optical concentrator 410 of this embodiment has a means for demultiplexing a signal into the optical signals of the first and third wavelength regions and transmitting and receiving these signals. An optical signal of the second wavelength region and an optical signal of the fourth wavelength region are processed in the same manner as the optical signal of the second wavelength region of the optical concentrator 10 of the first embodiment. That is, the optical signal of the second wavelength region is divided to each output terminal by the first star coupler 461 and is multiplexed with the optical signal of the fourth wavelength region by each wavelength division multiplexer. The multiplexed signals are output from output ports 171, 172, ... 17N. The signal of the fourth wavelength region is divided to each output terminal of the second star coupler 462 and is multiplexed with the optical signal of the second wavelength region by each wavelength division multiplexer. The multiplexed signals are output from the output terminals 171, 172, ... 17N. In this manner, star type optical communication using the optical signals of the second and fourth wavelength regions can be performed. Note that the optical concentrator 410 of this embodiment can be effectively used for a plurality of wavelength signals wavelength-multiplied in the second and fourth wavelength regions.

The optical concentrator 410 of this embodiment can be used to constitute an optical communication network similar to that shown in FIG. 6. Note that a means for demultiplexing an input signal into the respective wavelength signals and receiving and transmitting the wavelength signals is arranged not to cause radio interference of the optical signals of the first, second, third, and fourth wavelength regions at the connected node.

In this embodiment, in order to reduce optical losses of the optical signals of the second and fourth wavelength regions, the optical signals of the second and fourth wavelength regions pass through different star couplers 461 and 462. However, the output terminals of the second and fourth wavelength regions of each of the wavelength division demultiplexers 441, 442, ... 44N may be connected to another wavelength division multiplexer to obtain one output terminal, the input terminals of the second and fourth wavelength regions of each of the wavelength division multiplexers 451, 452, ... 45N may be connected to the output terminal of another wavelength division demultiplexer to obtain one input terminal, and the resultant output terminal and the resultant input terminal may be connected to a pair of input and output terminals of a star coupler. In this case, only one star coupler can be used.

In this embodiment, two loop type optical communication circuits and two star type optical communication circuits are used. However, the number of circuits of these two different optical communication systems can be increased on the basis of the principle of this embodiment. Either loop type optical communication or star type optical communication may be performed by one circuit, as a matter of course.

Figure 9:
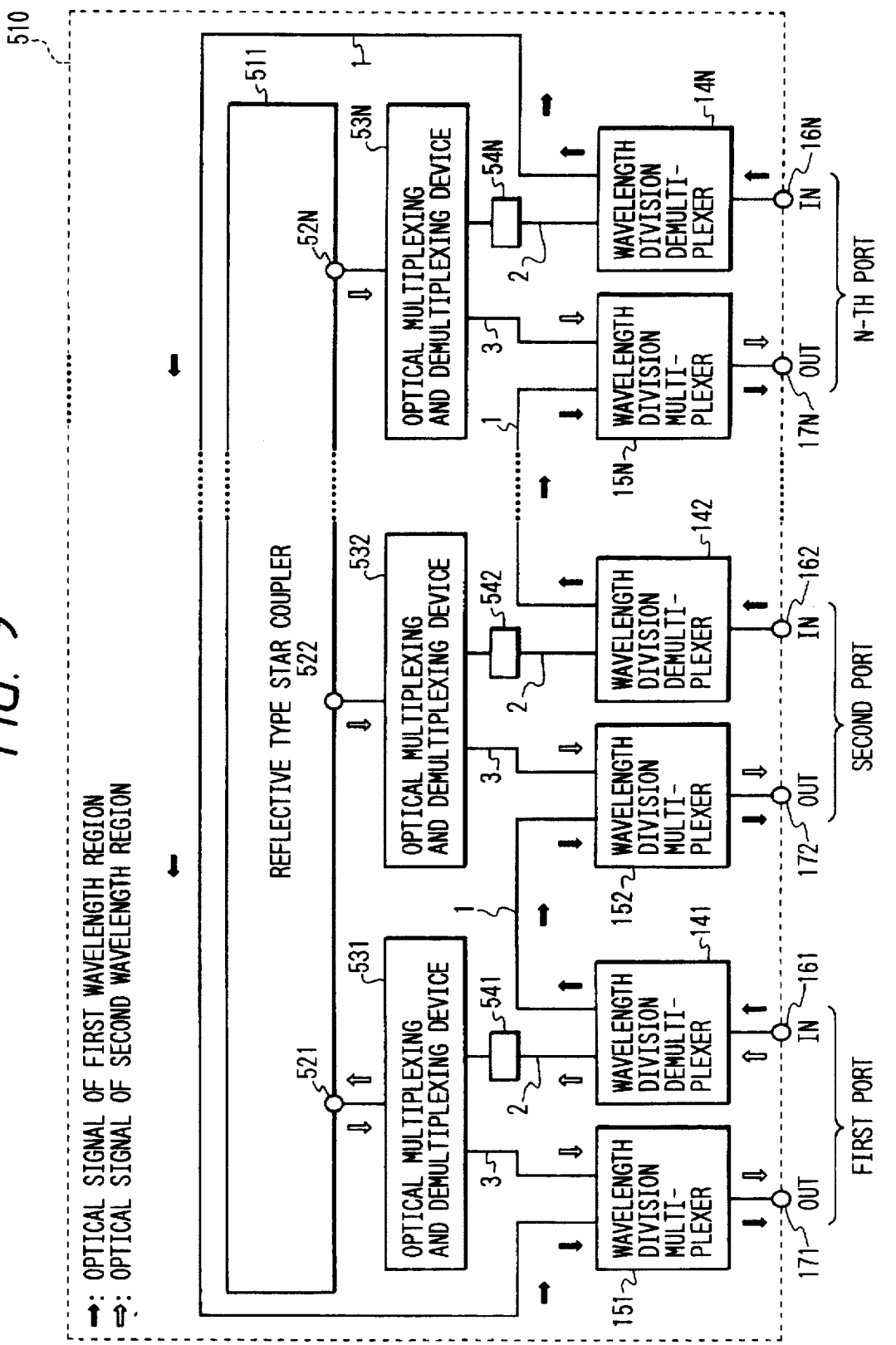
FIG. 9 is a block diagram showing the third embodiment of an optical concentrator according to the present invention.

The third embodiment of the present invention will be described with reference to FIG. 9. FIG. 9 shows the arrangement of the third embodiment of a concentrator according to the present invention.

The basic arrangement of a concentrator 510 of this embodiment is almost the same as that of the concentrator 10 of the first embodiment shown in FIG. 5. The same reference numerals as in the first embodiment denote the same parts in the third embodiment. The third embodiment is different from the first embodiment in that a star coupler for coupling and dividing optical signals of a second wavelength region (indicated by hollow arrows) is constituted by a reflective type star coupler 511. The reflective type star coupler 511 have common input/output terminals 521, 522, ... 52N.

After optical signals from the respective input terminals are coupled into one signal, this signal is reflected by a reflecting means such as a mirror, and the reflected signal is divided to the respective common output terminals. For this reason, there is provided a means for outputting, to the reflective type star coupler 511, optical signals of the second wavelength region output from wavelength division demultiplexers 141, 142, ... 14N, and at the same time, outputting, to wavelength division multiplexers 151, 152, ... 15N, optical signals of the second wavelength region output from the reflective star coupler 511. In this embodiment, optical multiplexing and demultiplexing devices 531, 532, ... 53N and optical isolators 541, 542, ... 54N are arranged between the reflective type star coupler 511 and an arrangement constituted by the wavelength division demultiplexers 141, 142, ... 14N and the wavelength division multiplexers 151, 152, ... 15N.

The operation of the concentrator 510 of this embodiment will be described below. Optical signals of the first wavelength region (solid black arrows) are operated in the same manner as in the first embodiment, and a detailed description thereof will be omitted. For example, when the optical signal of the second wavelength region is input from an input port 161 of the first port, it is demultiplexed by the wavelength division demultiplexer 141, passes through the optical isolator 541 and the optical multiplexing and demultiplexing device 531, and input to the input/output terminal 521 of the reflective type star coupler 511. The optical signals divided in the reflective type star coupler 511 are output from the input/output terminals 521, 522, ... 52N. For example, an optical signal output from the input/output terminal 521 is input to the optical multiplexing/demultiplexing device 531 again and demultiplexed into components on the wavelength division multiplexer 151 side and the 25 optical isolator 541 side. The optical signal input to the wavelength division multiplexer 151 is output from an output port 171 of the first port. However, the optical signal input to the isolator 541 is interrupted by the isolator 541 and will not be output from the input port 161 of the first port.. Optical signals output from the remaining input/output terminals are output to the output ports of the corresponding ports. If optical isolators are omitted, the optical signals are also output from the input ports 161, 162, ... 16N. If an optical isolator is arranged in a corresponding node to eliminate an influence of return light, the optical isolators 541, 542, ... 54N in the concentrator 510 may be omitted.

The concentrator 510 of this embodiment can be suitably used in the optical communication network shown in FIG. 6 in the same manner as in the first embodiment. At this time, a node connected in this network is the node having the arrangement shown in FIG. 7.

Figure 10:
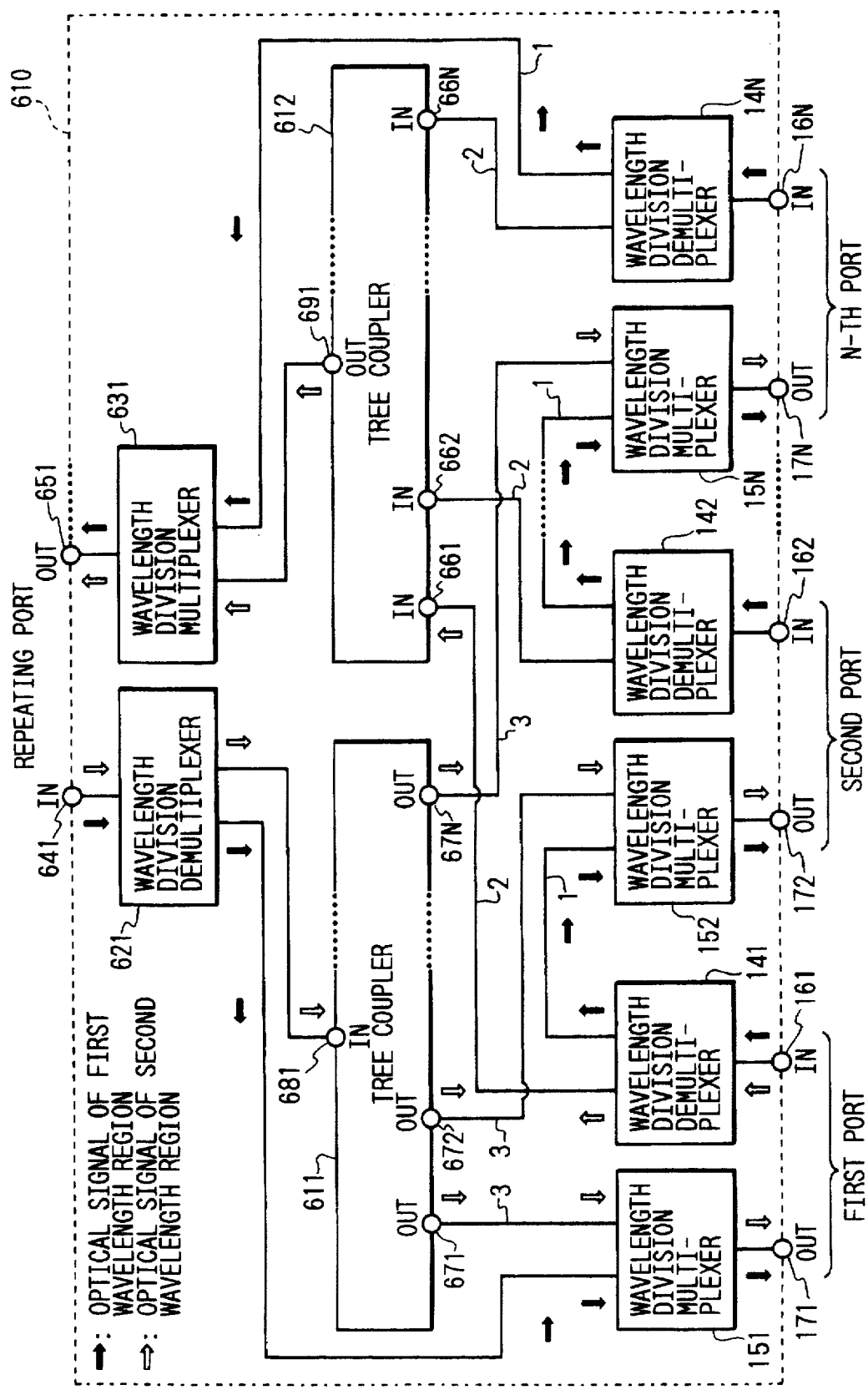
FIG. 10 is a block diagram showing the fourth embodiment of an optical concentrator according to the present invention.
Figure 11:
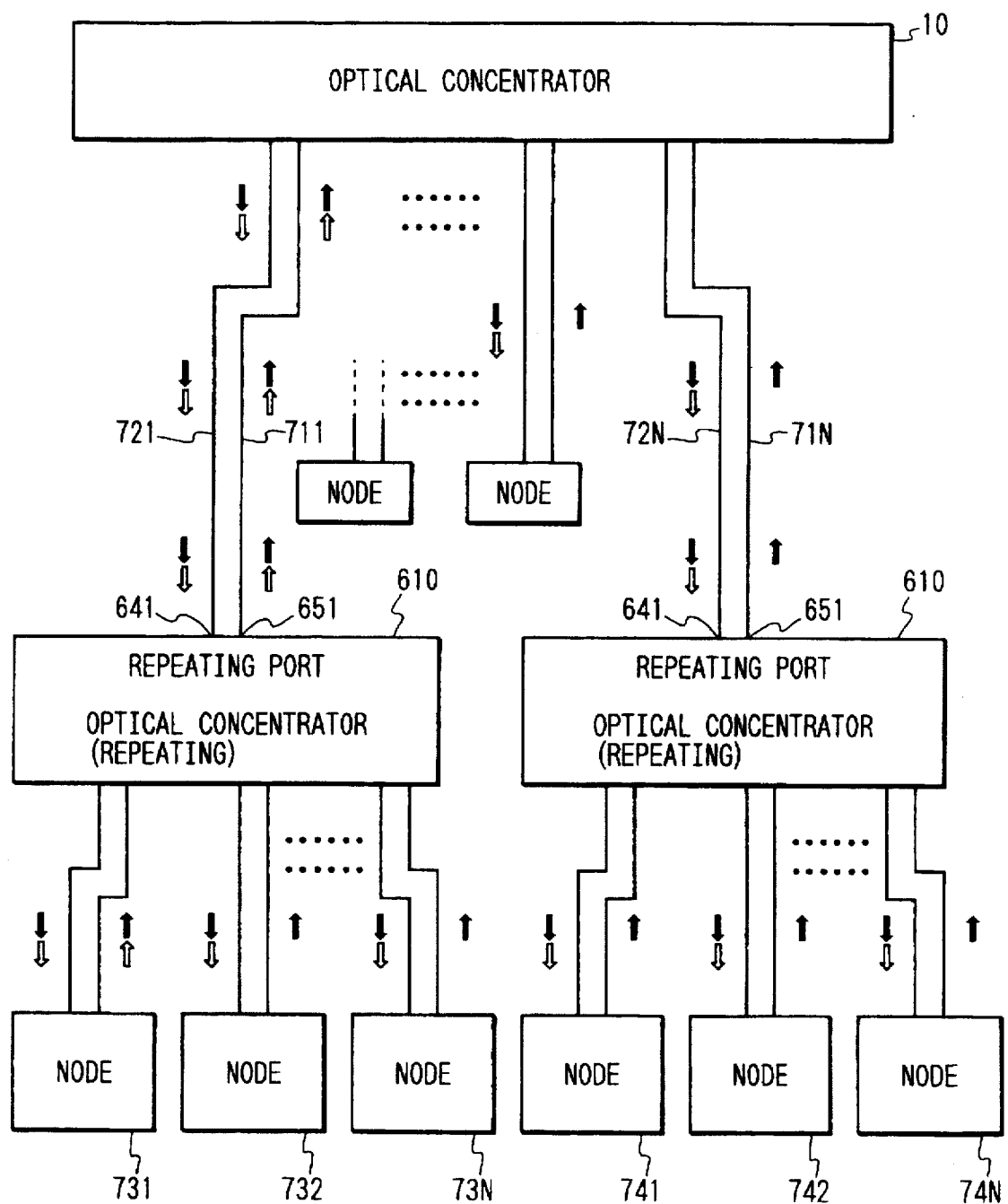
FIG. 11 is a block diagram showing the second embodiment of an optical communication network using the concentrators shown in FIGS. 5 and 6.

The fourth embodiment of the present invention will be described with reference to FIGS. 10 and 11. FIG. 10 shows the arrangement of the fourth embodiment of a concentrator according to the present invention. In particular, the arrangement of a repeating concentrator for expanding the optical communication network shown in FIG. 6 is illustrated. FIG. 11 shows an expanded optical communication network using the repeating concentrator.

Referring to FIG. 10, an input port 641 and an output port 651 constitute an expansion repeating port and are connected to another concentrator through optical fibers. A concentrator 610 has input ports 161, 162, ... 16N and output ports 171, 172, ... 17N. Input/output port pairs are respectively connected to nodes. A repeating concentrator (to be described later in this embodiment) may be connected.

Wavelength division demultiplexers 141, 142, ... 14N demultiplex input signals into optical signals of first and second wavelength regions as in the first embodiment. The input terminals of the wavelength division demultiplexers 141, 142, ... 14N are connected to the input ports 161, 162, ... 16N of the concentrator 610. The input terminal of a wavelength division demultiplexer 621 having the same arrangement as in the above wavelength division demultiplexers is connected to the input port 641 of the repeating port. Wavelength division multiplexers 151, 152, ... 15N multiplex optical signals of the first and second wavelength regions as in the first embodiment. The output terminals of the wavelength division multiplexers 151, 152, ... 15N are connected to the output terminals 171, 172, ... 17N of the concentrator 610. The output terminal of a wavelength division multiplexer 631 having the same arrangement as in the above wavelength division multiplexers is connected to the output port 651 of the repeating port. The output terminals of the first wavelength region of the wavelength division demultiplexers 141, 142, ... 14N are connected to the input terminals of the first wavelength region of the wavelength division multiplexers 151, 152, ... 15N of the next ones of the ports arranged in a predetermined order. Note that the wavelength division multiplexer 631 and the wavelength division demultiplexer 621 for the repeating port are arranged between the wavelength division demultiplexer 14N of the N-th port and the wavelength division multiplexer 151 of the first port in this embodiment.

A 1×N first tree coupler 611 has one input terminal 681 and N output terminals 671, 672, ... 67N. An N×1 second tree coupler 612 has N input terminals 661, 662, ... 66N and one output terminal 691. The output terminals 671, 672, ... 67N of the first tree coupler 611 are connected to the input terminals of the second wavelength region of the wavelength division multiplexers 151, 152, ... 15N, respectively. The input terminal 681 is connected to the output terminal of the second wavelength region of the wavelength division demultiplexer 621 at the repeating port. The input terminals 661, 662, ... 66N of the second tree coupler 612 are connected to the output terminals of the second wavelength region of the wavelength division demultiplexers 141, 142, ... 14N, respectively. The output terminal 691 is connected to the input terminal of the second wavelength region of the wavelength division multiplexer 631.

Figure 1:
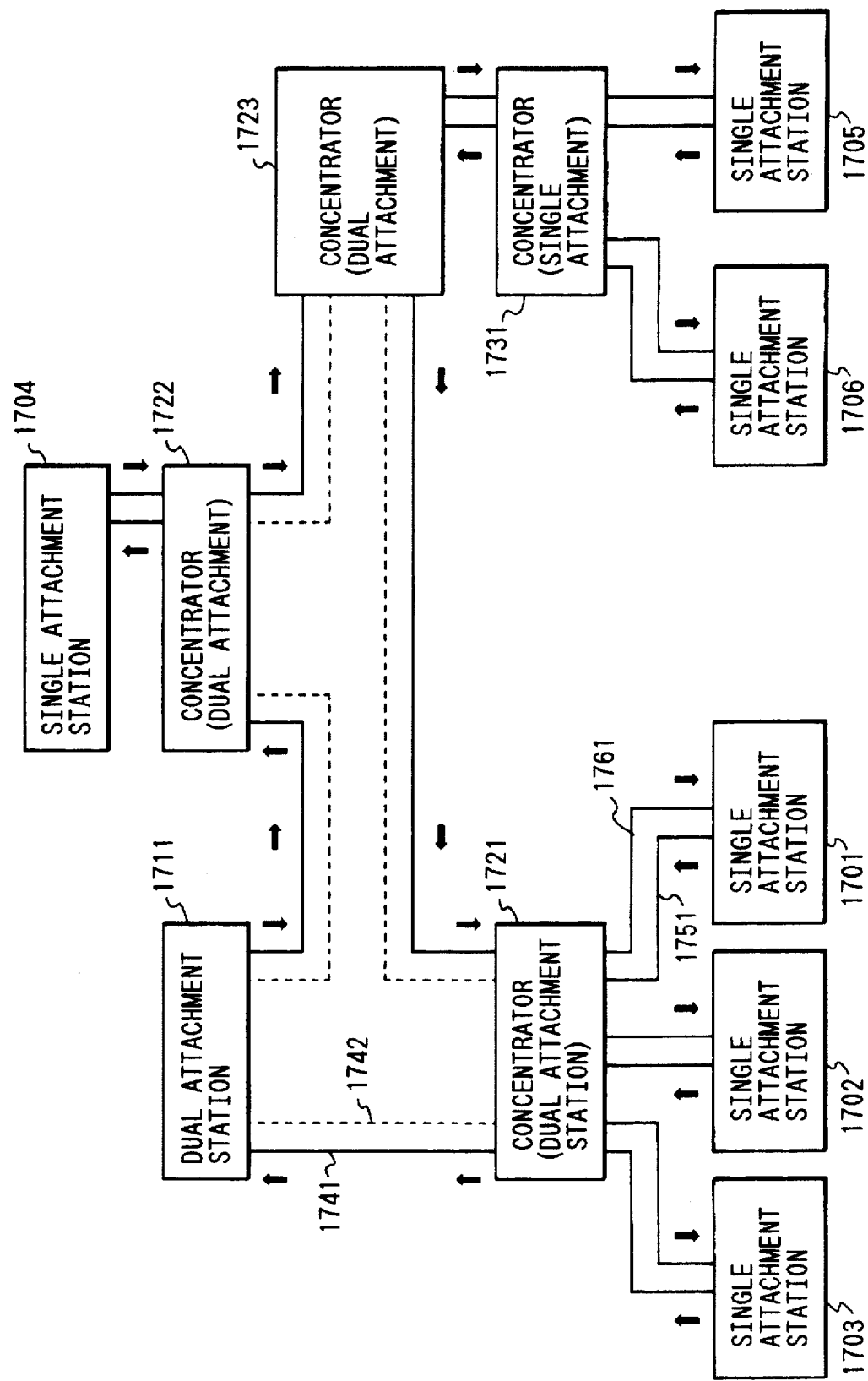
FIG. 1 is a block diagram showing the arrangement of a conventional optical communication network.
Figure 2:
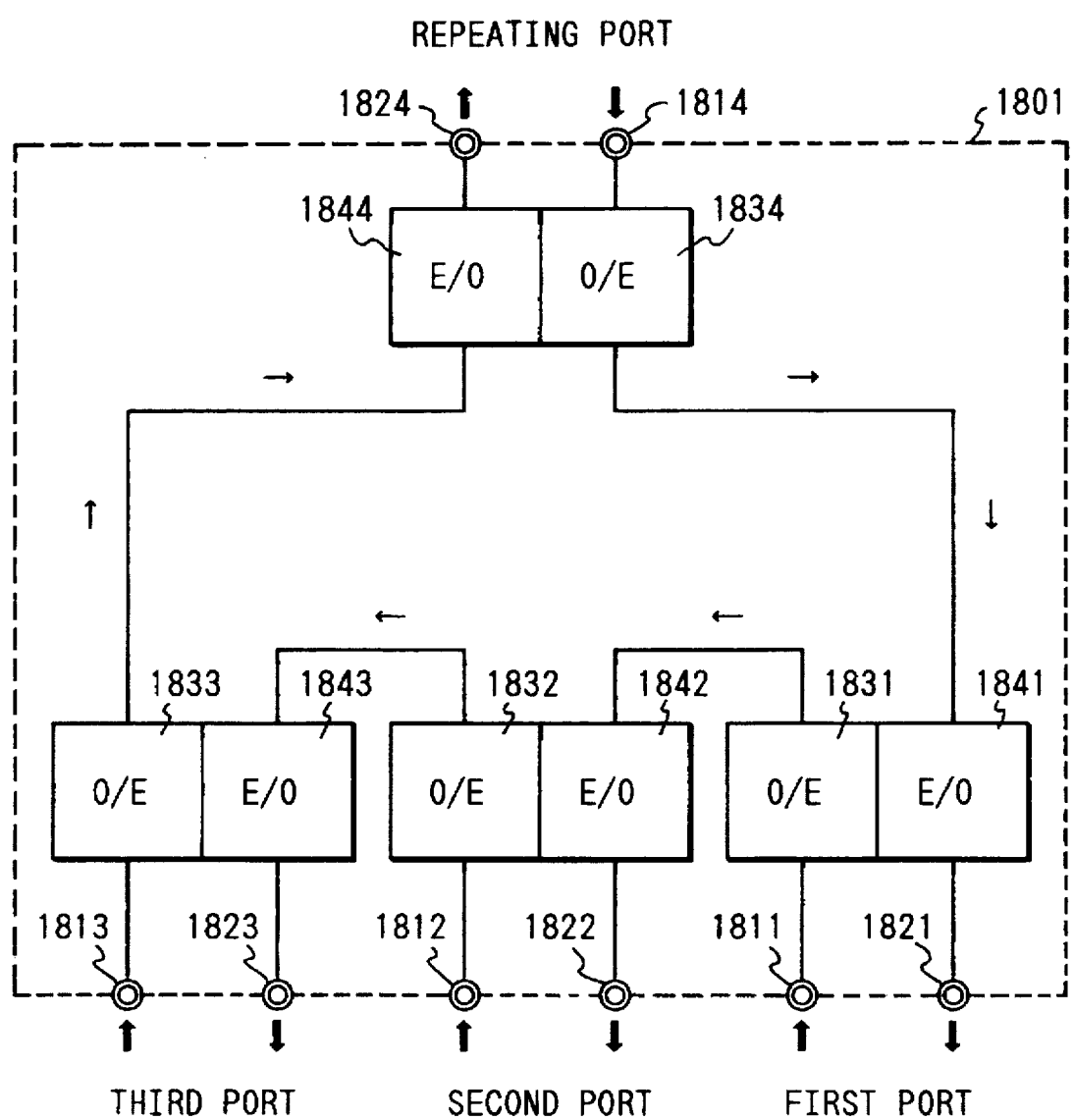
FIG. 2 is a block diagram showing the arrangement of a conventional optical concentrator.
Figure 3:
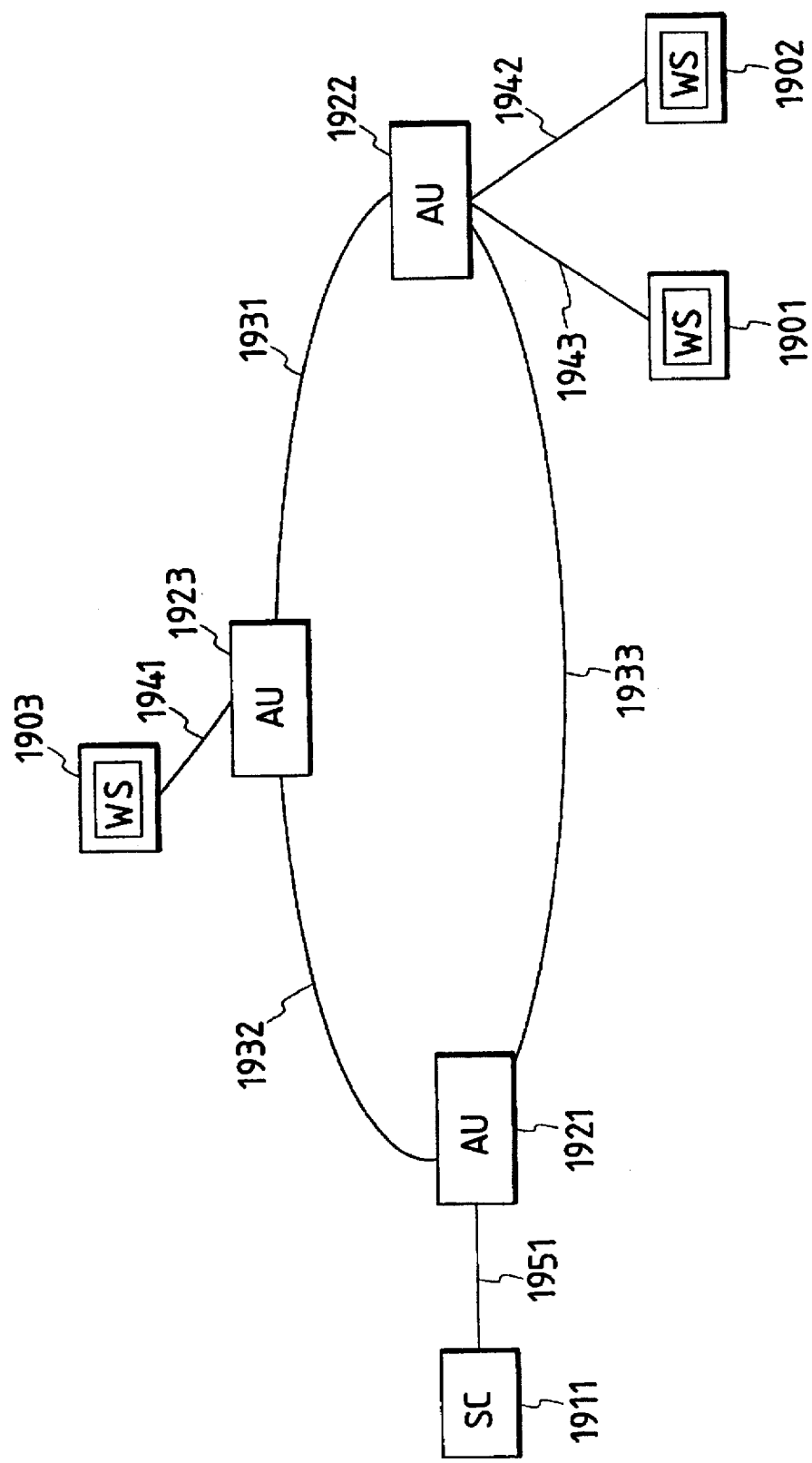
FIG. 3 is a schematic view showing the arrangement of a conventional loop type communication network.
Figure 4:
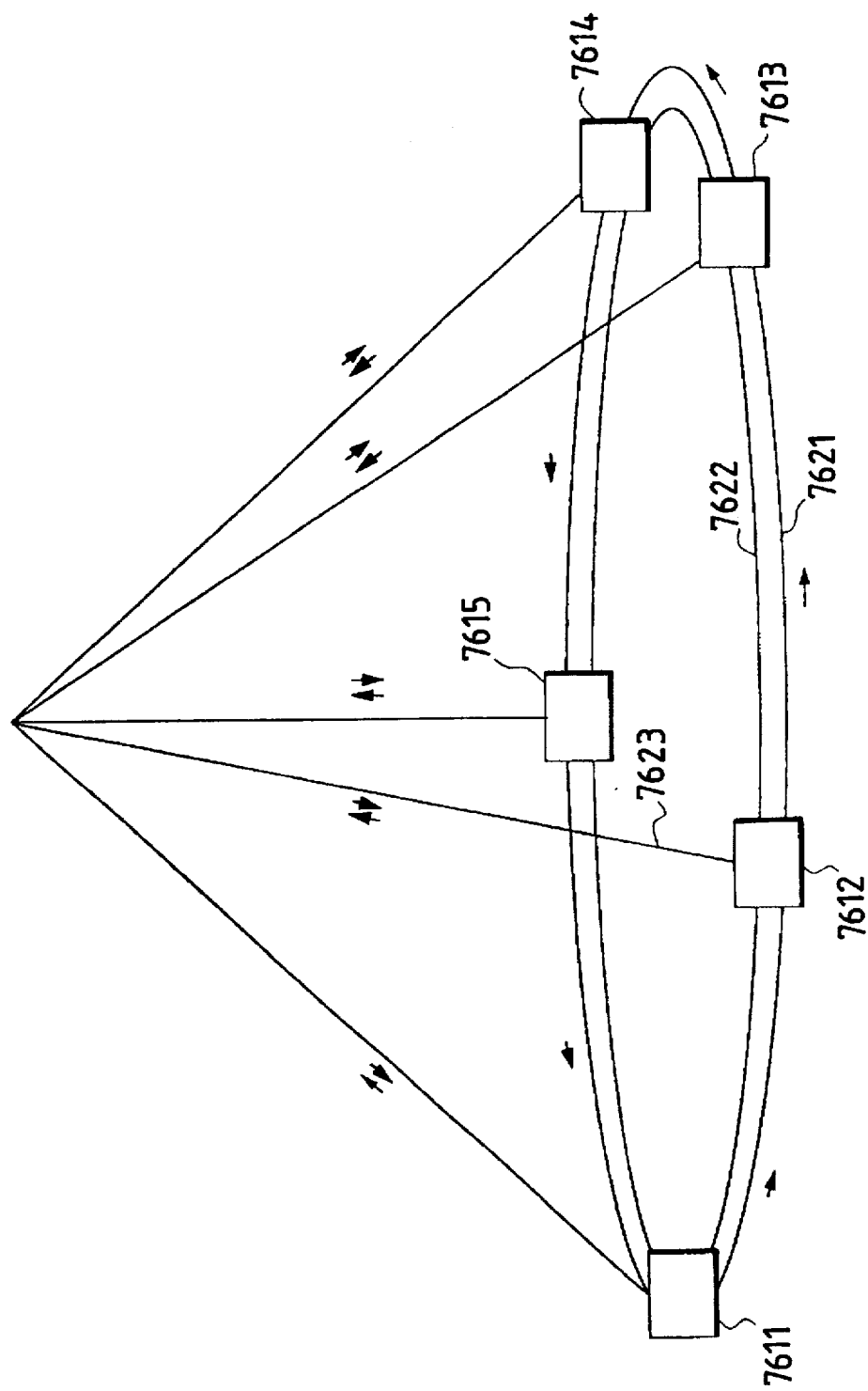
FIG. 4 is a schematic view showing the arrangements of conventional loop and star type communication networks.

Referring to FIG. 11, a concentrator 10 has the same arrangement as in the first embodiment. A concentrator 610 is used in this embodiment for increasing the number of nodes. The concentrators 10 and 610 are connected to each other through upstream optical fibers 711 and 71N and downstream optical fibers 721 and 72N. An optical signal output from the output port 651 of the repeating port of the concentrator 610 is transmitted to another concentrator or node (node not denoted by any reference numeral) through the concentrator 10. Nodes 731, 732, ... 73N can be constituted by nodes each having the arrangement shown in FIG. 3.

The operations of the concentrator of this embodiment and an optical communication network using this concentrator will be described with reference to FIGS. 10 and 11. Optical signals of the first wavelength region are sequentially transmitted to nodes connected to the respective ports as in the optical signals of the first wavelength region in the concentrator 10 of the first embodiment, thereby performing loop type optical communication. Note that an optical signal of the first wavelength region output from the output port 651 of the repeating port in this embodiment is input to the input port 641 through a loop-like route on the connected concentrator 10 side.

For example, if an optical signal of the second wavelength region is input to the input port 161 of the first port, it is demultiplexed by the wavelength division demultiplexer 141 and input to the second tree coupler 612 from the input terminal 661. This signal is coupled by the tree coupler 612 to a wavelength-multiplexed optical signal having a wavelength different from the second wavelength region (as in the first embodiment, wavelength-multiplexed optical signals having different wavelengths in the second wavelength region are output from the respective node in this embodiment). The multiplexed signal is output from the output terminal 691 and is multiplexed with an optical signal of the first wavelength region by the wavelength division multiplexer 631. The resultant signal is input from the output port 651 of the repeating port to the concentrator 10 through the upstream optical fibers 711 and 71N. This optical signal of the second wavelength region is demultiplexed from the optical signal of the first wavelength region by the wavelength division demultiplexer 621 and is input to the input terminal 681 of the first tree coupler 611. This optical signal is divided to the output terminals 671, 672, ... 67N in the first tree coupler 611. The divided components are multiplexed with the optical signals of the first wavelength region by the wavelength division multiplexers 151, 152, ... 15N, and the resultant signals are output from the output ports 171, 172, ... 17N.

As described above, the concentrator 610 of this embodiment is connected to the input/output ports of the concentrator 10 of the first embodiment to increase the number of nodes connected to the wavelength-multiplexed optical communication network in which loop type optical communication and star type optical communication are integrated.

In the expansion arrangement of the optical communication network shown in FIG. 11, the input/output ports of the concentrator 610 of this embodiment are connected to only nodes, but concentrators of this embodiment may be connected in place of the nodes, thereby further increasing the number of nodes connected to the network.

Assume that the number of nodes is to be increased using the concentrator of this embodiment. When the number N of terminals of the tree coupler is increased, the optical loss is also increased, and the intensity of the optical signal of the second wavelength region input to the optical receiver of each node is decreased. In this case, a means for repeating and amplifying the optical signal of the second wavelength region may be arranged in the concentrator or outside the repeating port. For example, this means may be arranged between the wavelength division demultiplexer 621 and the input terminal 681 of the first tree coupler 611 or between the wavelength division multiplexer 631 and the output terminal 691 of the second tree coupler 612. If the optical loss of the optical signal of the first wavelength region poses a problem, a means for repeating and amplifying the optical signal of the first wavelength region may be arranged at an appropriate position.

Figure 12:
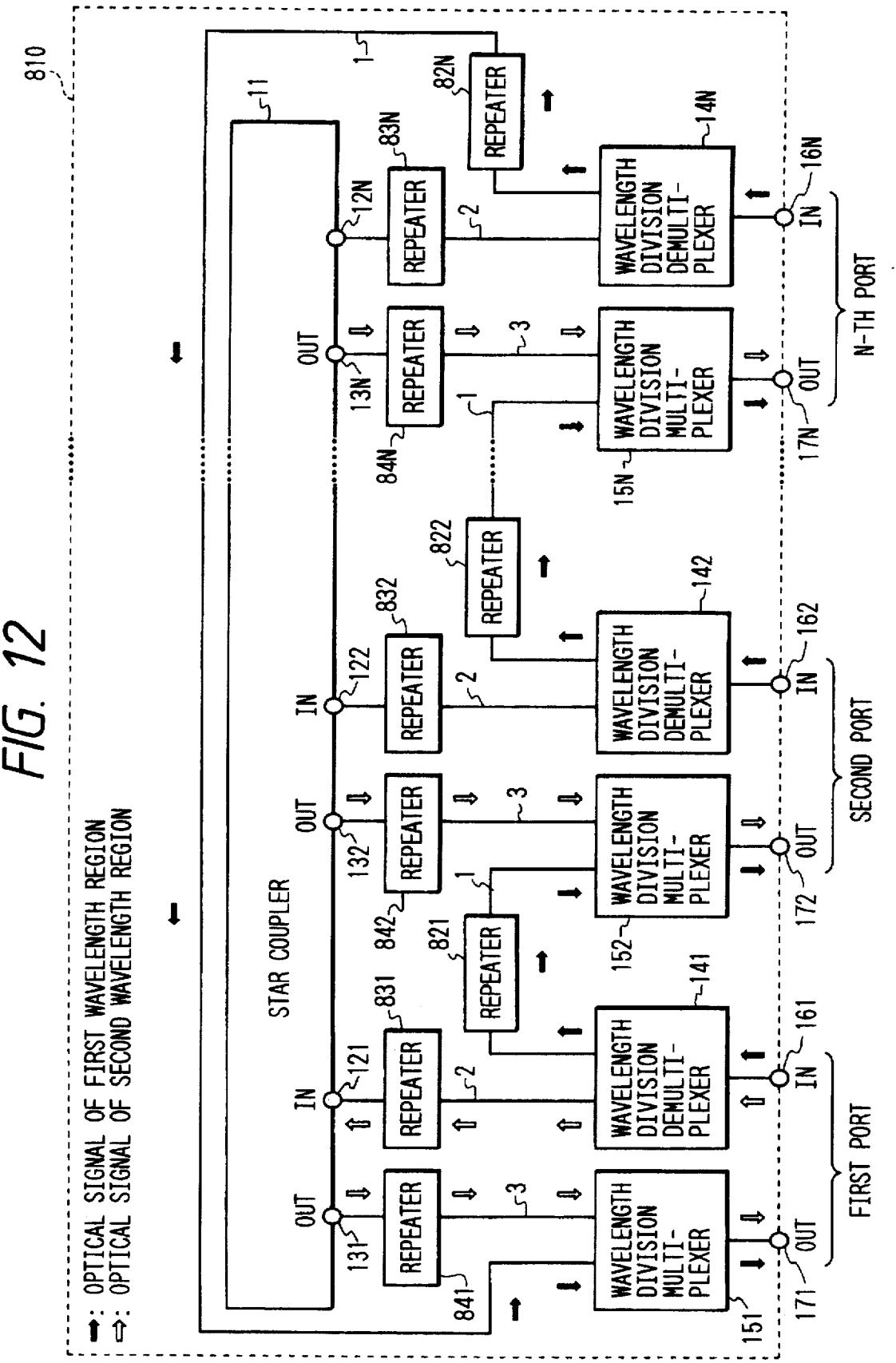
FIG. 12 is a block diagram showing the fifth embodiment of an optical concentrator according to the present invention.

The fifth embodiment of the present invention will be described with reference to FIG. 12. FIG. 12 shows the arrangement of the fifth embodiment of a concentrator according to the present invention.

The basic arrangement of a concentrator 810 is substantially the same as that of the concentrator 10 of the first embodiment shown in FIG. 5, and the same reference numerals as in the first embodiment denote the same parts in the fifth embodiment. The fifth embodiment is different from the first embodiment in that first repeaters 821, 822, ... 82N for repeating and amplifying optical signals of a first wavelength region are arranged between the output terminals of the first wavelength region of wavelength division demultiplexers of the respective ports and the input terminals of the first wavelength region of wavelength division multiplexers of the next ports (e.g., 152 for 141 and 151 for 14N), and that second repeaters 831, 832, . . . 83N for repeating and amplifying optical signals of a second wavelength region are arranged between input terminals 121, 122, . . . 12N of a star coupler 11 and the output terminals of the second wavelength region of wavelength division demultiplexers 141, 142, . . . 14N connected to the input terminals 121, 122, . . . 12N, and that third repeaters 841, 842, . . . 84N for repeating and amplifying the optical signals of the second wavelength region are arranged between output terminals 131, 132, . . . 13N of the star coupler 11 and wavelength division multiplexers 151, 152, . . . 153 connected to the output terminals 131, 132, . . . 13N. The first, second, and third repeaters are preferably constituted by optical amplifiers for directly amplifying and repeating optical signals. In particular, optical signals are wavelength-multiplexed in the wavelength regions, it is preferable to use the optical amplifier as the repeater. However, when optical signals are not wavelength-multiplexed in the predetermined wavelength regions, electrical regenerative repeaters for temporarily converting signals into electrical signals and converting the electrical signals into optical signals again can be used.

Of the operations of the concentrator 810 of this embodiment, the only points different from the first embodiment will be described below. The optical losses of the optical signals of the first wavelength region input to the input ports 161, 162, . . . 16N of the concentrator 810, which are caused by the wavelength division demultiplexers 141, 142, . . . 14N and the wavelength division multiplexers 151, 152, . . . 15N, can be compensated due to the presence of the first repeaters 821, 822, . . . 82N. The intensity of an optical signal input to the optical receiver of the first wavelength region of the node connected to the network can be increased. The optical losses of the optical signals of the second wavelength region input to the input ports 161, 162, . . . 16N of the concentrator 810, which are caused by the wavelength division demultiplexers 141, 142, . . . 14N, the wavelength division multiplexers 151, 152, . . . 15N, and the star coupler 11, can be compensated due to the presence of the second repeaters 831, 832, . . . 83N and the third repeaters 841, 842, . . . 84N. The intensity of an optical signal input to the optical receiver of the second wavelength region of the node connected to the network can be increased. In particular, this arrangement is effective when the number of input/output terminals of the star coupler 11 is increased because this increase causes an increase in optical loss.

Assume that the intensity of the optical signal output from the optical transmitter is sufficiently high, that the reception sensitivity of the optical receiver is sufficiently high, and that the optical losses of the wavelength division demultiplexers 141, 142, . . . 14N, the wavelength division multiplexers 151, 152, . . . 15N, and the star coupler 11 are sufficiently small. In this case, all of the first, second, and third repeaters need not be arranged, and some of them can be omitted. In addition, the repeaters need not be arranged at all the ports, and some of them may be omitted, as needed.

The concentrator 810 of this embodiment can be suitably used in the optical communication networks shown in FIGS. 6 and 11, thereby providing a wavelength-multiplexed optical communication network having a sufficiently large margin of the intensities of optical signals.

Figure 13:
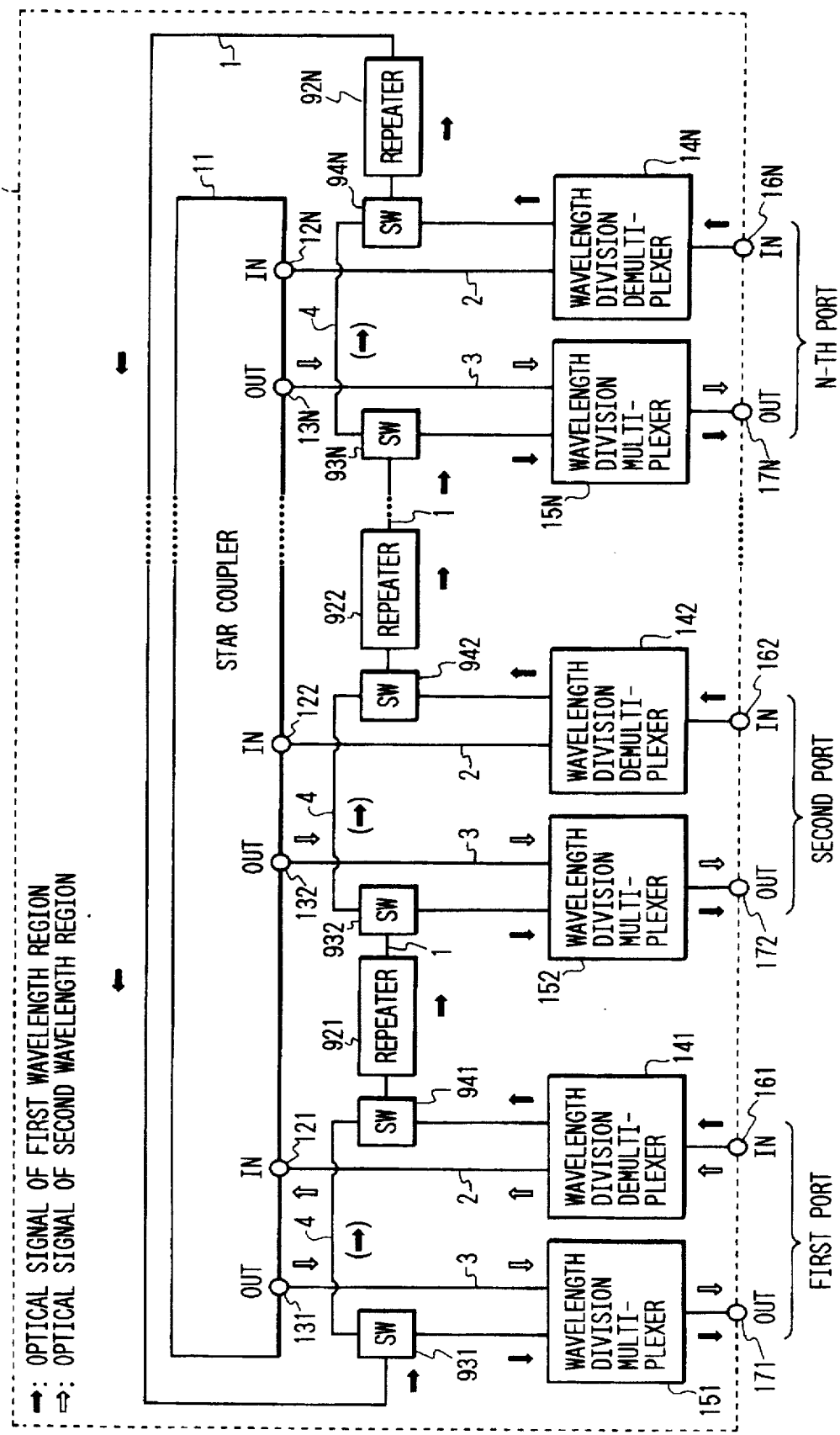
FIG. 13 is a block diagram showing the sixth embodiment of an optical concentrator according to the present invention.

The sixth embodiment of the present invention will be described with reference to FIG. 13. FIG. 13 shows the arrangement of the sixth embodiment of a concentrator according to the present invention.

The basic arrangement of a concentrator 910 of this embodiment is substantially the same as that of the concentrator 10 of the first embodiment shown in FIG. 5, and the same reference numerals as in the first embodiment denote the same parts in the sixth embodiment. The sixth embodiment is different from the first embodiment in that a countermeasure means is arranged in the concentrator 910 when optical signals of a first wavelength region output from output ports 171, 172, . . . 17N of the concentrator 910 are not input to the concentrator 910 from input ports 161, 162, . . . 16N which constitute pairs with the output ports 171, 172, . . . 17N due to the failure of a node connected to the input/output port and disconnections of optical fibers for connecting the concentrator 910 and the nodes, or when signal degradation occurs even if the signals are input to the input ports 161, 162, . . . 16N.

The arrangement of the concentrator 910 having a failure countermeasure means of this loop type optical communication is shown in FIG. 13. More specifically, when a failure has occurred, an optical signal of the first wavelength region is not supplied to this port. For this purpose, first optical switches 931, 932, . . . 93N are connected to the input terminals of the first wavelength region of wavelength division multiplexers 151, 152, . . . 15N of the respective ports, and second optical switches 941, 942, . . . 94N and repeaters 921, 922, . . . 92N for repeating and amplifying the optical signals of the first wavelength region are connected to the output terminals of the first wavelength region of wavelength division demultiplexers 141, 142, . . . 14N. The first switches 931, 932, . . . 93N and the second optical switches 941, 942, . . . 94N (i.e., the first switch of a given port is connected to the second switch of the given port) are connected to each other when a failure has occurred. The repeaters 921, 922, . . . 92N are arranged for compensation of losses of the optical signals and are constituted by optical amplifiers or electrical regenerative repeaters. If optical losses do not pose any problem, the repeaters may be omitted. The repeaters 921, 922, . . . 92N may be arranged between the first optical switches 931, 932, . . . 93N and the second optical switches 941, 942, . . . 94N.

The switches 931, 932, . . . 93N are connected to the switches 941, 942, . . . 94N through optical transmission channels 4 constituted by optical fibers.

Of the operations of the concentrator 910 of this embodiment, points different from the first embodiment will be described. Assume that a failure has not occurred. For example, an optical signal of the first wavelength region input from the input port 161 to the concentrator 910 is output from the wavelength division demultiplexer 141, passes through the second optical switch 941, is amplified by the repeater 921, input to the wavelength division multiplexer 152 through the first optical switch 932, and then output from the output port 172. This signal is received by the node connected to the output port 172 and the input port 162. After the signal is properly processed, the signal is output as an optical signal of the first wavelength region. This signal is then input from the input port 162 to the concentrator 910. The optical signal of the first wavelength region is output from the wavelength division demultiplexer 142, passes through the second optical switch 942, and is then input to the repeater 922. Optical signals of the first wavelength region from the remaining ports are similarly transmitted.

On the other hand, assume that a failure has occurred in the node connected to the Output port 172 and the input port 162 or disconnections have occurred in optical fibers, so the optical signal of the first wavelength region is not input to the input port 162. In this case, the first optical switch 932 and the second optical switch 942 are operated to be directly connected to each other. The optical signal of the first wavelength region input to the first optical switch 942 is directly output from the second optical switch 942 and is then input to the repeater 922. In this manner, the interruption of the optical signal upon occurrence of the failure can be prevented. This also applies to the remaining ports.

This embodiment exemplifies one failure countermeasure means. Any other arrangement may be employed if the optical signal of the first wavelength region input from the input port of a port immediately preceding the failed port is output to the output port of a port succeeding the failed port.

If the means for preventing interruption of the optical signal of the first wavelength region is arranged outside the concentrator 910 or a node or optical fiber whose reliability is assured is connected to the network, the port failure countermeasure means may be omitted.

Although a failure detecting means is not illustrated in FIG. 13, a means for monitoring the optical signal and detecting the failure may be arranged on the passing route of the optical signal of the first wavelength region input from the input port may be arranged, as needed.

The seventh embodiment of an optical concentrator according to the present invention will be described with reference to FIG. 14. In this embodiment, switches are arranged to bypass a desired one of the ports including a repeating port so as to overcome a failure such as the disconnection of a transmission channel in the fourth embodiment. The optical concentrator of the seventh embodiment can be suitably used as the optical concentrator of the communication network shown in FIG. 6 or 11.

Figure 14:
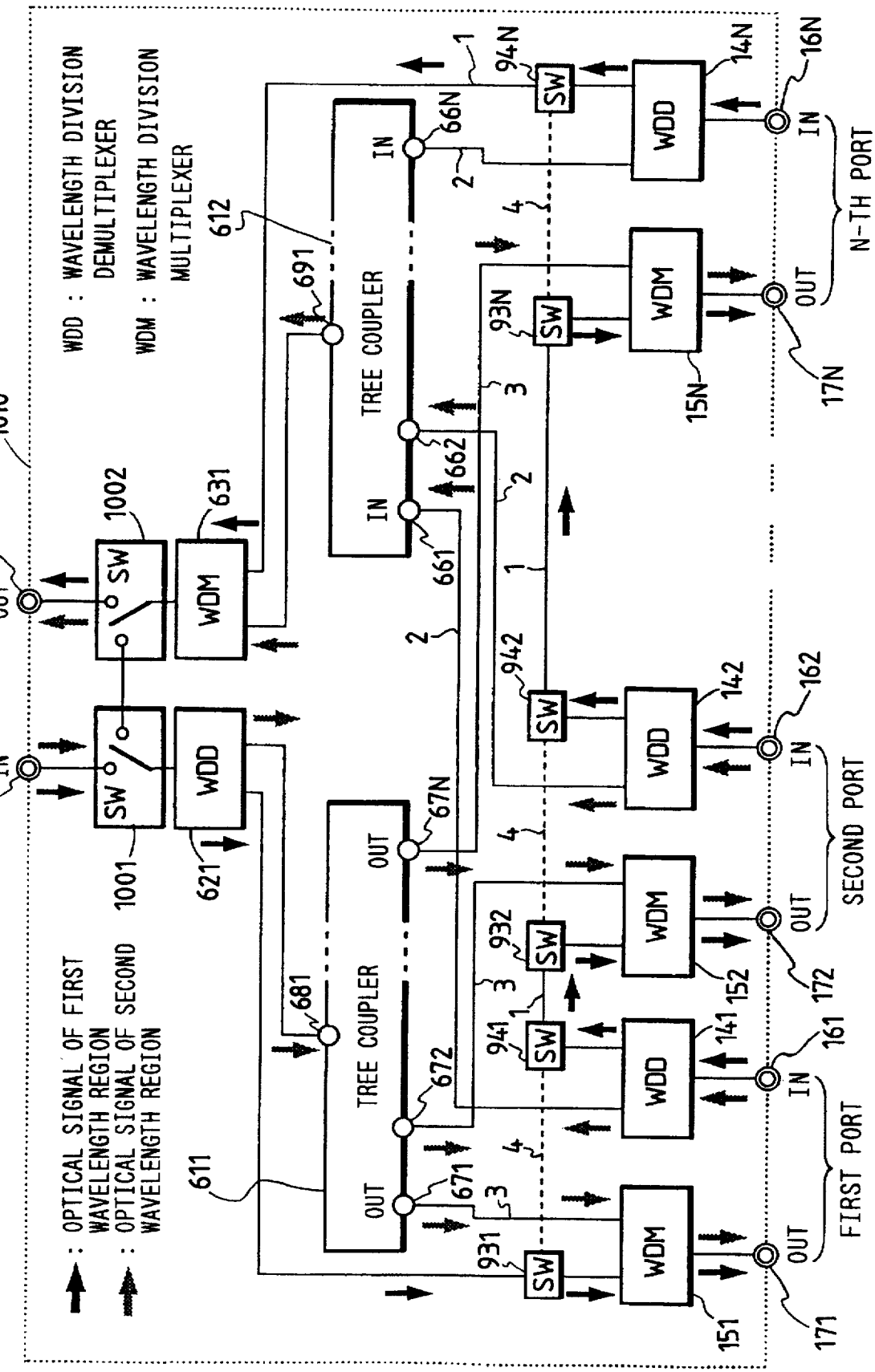
FIG. 14 is a block diagram showing the seventh embodiment of an optical concentrator according to the present invention.

Referring to FIG. 14, an optical concentrator 1010 has input and output ports 641 and 651 of an expansion repeating port and is connected to another concentrator through optical fibers. The concentrator 1010 also has input ports 161, 162, . . . 16N and output ports 171, 172, . . . 17N which are connected to nodes. In this embodiment, a repeating concentrator may be connected in place of a node, as will be described later. Wavelength division demultiplexers 141, 142, . . . 14N demultiplex input signals into optical signals of first and second wavelength regions. The input terminals of the wavelength division demultiplexers 141, 142, . . . 14N are connected to the input ports of the concentrator 1010. The input terminal of a wavelength division demultiplexer 621 having the same arrangement as in the above wavelength division demultiplexers is connected to the output terminal of an optical switch 1001. Wavelength division multiplexers 151, 152, . . . 15N multiplex the optical signals of the first and second wavelength regions. The output terminals of the wavelength division multiplexers 151, 152, . . . 15N are connected to the output ports of the concentrator 1010. A wavelength division multiplexer 631 having the same arrangement as in above wavelength division multiplexers is connected to an optical switch 1002.

The output terminals of the first wavelength region of the wavelength division demultiplexers are connected such that optical signals output from the output terminals can be input to the input terminals of the first wavelength region of the wavelength division multiplexers of next ones of ports arranged in a predetermined order. More specifically, referring to FIG. 14, the optical signal of the first wavelength region output from the wavelength division demultiplexer 141 is input to the input terminal of the first wavelength region of the wavelength division multiplexer 152 through optical switches 941 and 932, and the optical signal of the first wavelength region output from the wavelength division demultiplexer 142 is input to the input terminal of the first wavelength region of the wavelength division multiplexer 153 (not shown in FIG. 14). Similarly, the optical signal of the first wavelength region output from the wavelength division demultiplexer 14(N-1) of the (N-1)-th port is input to the input terminal of the first wavelength region of the wavelength division multiplexer 15N of the N-th port.

The optical switch 932, an optical switch 931, optical switches 933, . . . 93N, the optical switch 941, and optical switches 942, . . . 94N constitute a failure countermeasure means when an optical signal of the first wavelength region output from a given output port of the concentrator is not input to the concentrator from an input port paired with the given output port due to the failure of a node connected to the input and output ports or disconnections of optical fibers for connecting the concentrator and the nodes, or when signal degradation occurs even if the signals are input. More specifically, as a means for inhibiting to supply an optical signal of the first wavelength region to a failed port, the first optical switches 931, 932, . . . 93N are connected to the input terminals of the first wavelength region of the wavelength division multiplexers of the respective ports, and the second optical switches 941, 942, . . . 94N are connected to the output terminals of the first wavelength region of the wavelength division demultiplexers. When a failure has occurred, the first switch is directly connected to the corresponding second optical switch. Optical signals of the first wavelength region can be sequentially supplied to the ports arranged in the predetermined order except for the failed port.

A 1×N first tree coupler 611 has one input terminal 681 and N output terminals 671, 672, . . . 67N, and an N×1 second tree coupler 612 has N input terminals 661, 662, . . . 66N and one output terminal 691. The output terminals 671, 672, . . . 67N of the first tree coupler 611 are connected to the input terminals of the second wavelength region of the wavelength division multiplexers 151, 152, . . . 15N, respectively. The input terminals 661, 662, . . . 66N of the second tree coupler 612 are connected to the output terminals of the second wavelength region of the wavelength division demultiplexers 141, 142, . . . 14N, respectively. The output terminal 691 is connected to the input terminal of the second wavelength region of the wavelength division multiplexer 631. The optical switch 1002 supplies the multiplexed optical signal of the optical signals of the first and second wavelength regions as output light from the wavelength division multiplexer 631 to the input terminal of the optical switch 1001 or the output port 651 in accordance with a control signal. The optical switch 1001 receives a multiplexed signal of the optical signals of the first and second wavelength regions from the input port 641 of the repeating port or a multiplexed signal of the optical signals of the first and second wavelength regions from the optical switch 1002.

The operation of this embodiment will be described below.

First of all, an arrangement in which the concentrator of this embodiment is used in the optical communication network in FIG. 6 will be described below. In this case, the optical switches 1002 and 1001 in the concentrator in FIG. 14 are directly connected to each other to perform the same operation as in the concentrator of the first embodiment, so that the same effect as in the first embodiment can be obtained.

An arrangement in which the concentrator of this embodiment is used in the optical communication network in FIG.

11 will be described below. The concentrator of this embodiment can be used as one of the three concentrators in FIG. 11. When the concentrator of this embodiment is used as the optical concentrator 10, the optical switches 1001 and 1002 in FIG. 14 are normally closed. When the concentrator of this embodiment is used as the optical concentrator 610, the optical switches 1002 and 1001 are connected to the repeating ports 651 and 641 in the normal operation. If communication with the concentrator 10 cannot be performed due to any failure, the optical switches 1001 and 1002 are directly connected to each other. The same operation as in the fourth embodiment is performed except for the operation upon occurrence of a failure. If any failure on the transmission channel except for a failure between the concentrators has occurred, the same operation as in the sixth embodiment is performed.

A countermeasure against a failure on a transmission channel between the concentrators, which is the characteristic feature of this embodiment, will be described below.

For example, when one of optical fibers 711 and 721 for connecting the concentrator 10 and the left concentrator 610 in FIG. 11 is disconnected, the optical switches 1002 and 1001 (FIG. 14) in the left concentrator 610 are directly connected in accordance with a failure countermeasure control signal to reconstruct star and loop type transmission channels in an optical network constituted by the left concentrator 610 and terminals connected thereto. At the same time, the optical switches 931 and 941 (FIG. 14) located at the first port of the concentrator 10 are directly connected to reconstruct a loop type transmission channel in an optical network constituted by the concentrator 10, the left concentrator 610, and the terminals connected to either concentrator. Therefore, two independent networks are constructed so as to have a boundary as a disconnected point. For example, when the optical fiber 721 is disconnected, the optical switches 1002 and 1001 are directly connected in the left concentrator 610 in accordance with a failure countermeasure control signal. An optical signal of the first wavelength region on the loop circuit, which is output from the wavelength division multiplexer 631, is demultiplexed from an optical signal of the second wavelength region by the wavelength division demultiplexer 621 and is supplied to the wavelength division multiplexer 151 of the first port. This optical signal of the first wavelength region is supplied in a predetermined order to each of the ports arranged in a predetermined order, thereby constructing a new loop type transmission channel. The optical signal of the second wavelength region on the star circuit, which is output from the repeating port 651, passes through the optical switches 1002 and 1001 and is demultiplexed from the optical signal of the first wavelength region. The resultant signal is input to the input terminal of the first tree coupler 611. The input optical signal is divided to the output terminals 671, 672, . . . 678 of the tree coupler 611, and the divided components are multiplexed with the optical signals of the first wavelength region by the wavelength division multiplexers 151, 152, . . . 158 and are output from the output ports 171, 172, . . . 17N.

In the concentrator 10, the optical switches 931 and 941 located at the first port of this concentrator are directly connected to each other to cause the optical signal of the first wavelength region output from the wavelength division demultiplexer 621 located at the repeating port to bypass the failed first port, thereby inputting the optical signal of the first wavelength region to the wavelength division multiplexer 152 of the second port. A new loop type route can be constructed such that the optical signal input to the wavelength division multiplexer 152 is transferred to the concentrator 10 again through a loop-like route of the concentrator 10 and the right concentrator 610. Communication in the star type transmission channel in the optical network constituted by the concentrator 10, the right concentrator 610, and the terminals connected to either concentrator can be performed without implementing any failure countermeasure.

Any other arrangement may be employed if the optical signal of the first wavelength region input from the input port of a port immediately preceding the failed port is output to the output port of a port succeeding the failed port and the optical signal of the second wavelength region supplied to the failed repeating port can be supplied to the output ports except for the repeating port.

If the means for preventing interruption of the optical signal of the first wavelength region is arranged outside the concentrator or a node or optical fiber whose reliability is assured is connected to the network, the port failure countermeasure means may be omitted.

Although a failure detecting means is not illustrated in FIG. 14, a means for monitoring the optical signal and detecting the failure may be arranged.

In addition, in this embodiment, an optical switch is used as a means for bypassing a specific port. However, the optical switch 1001 may be replaced with a coupler to obtain the same effect as described above. That is, if a means for supplying wavelength-multiplexed light components on the star circuit, which are input from the ports except for the specific port, is provided, any other arrangement of the means or any other component may be used.

Figure 15:
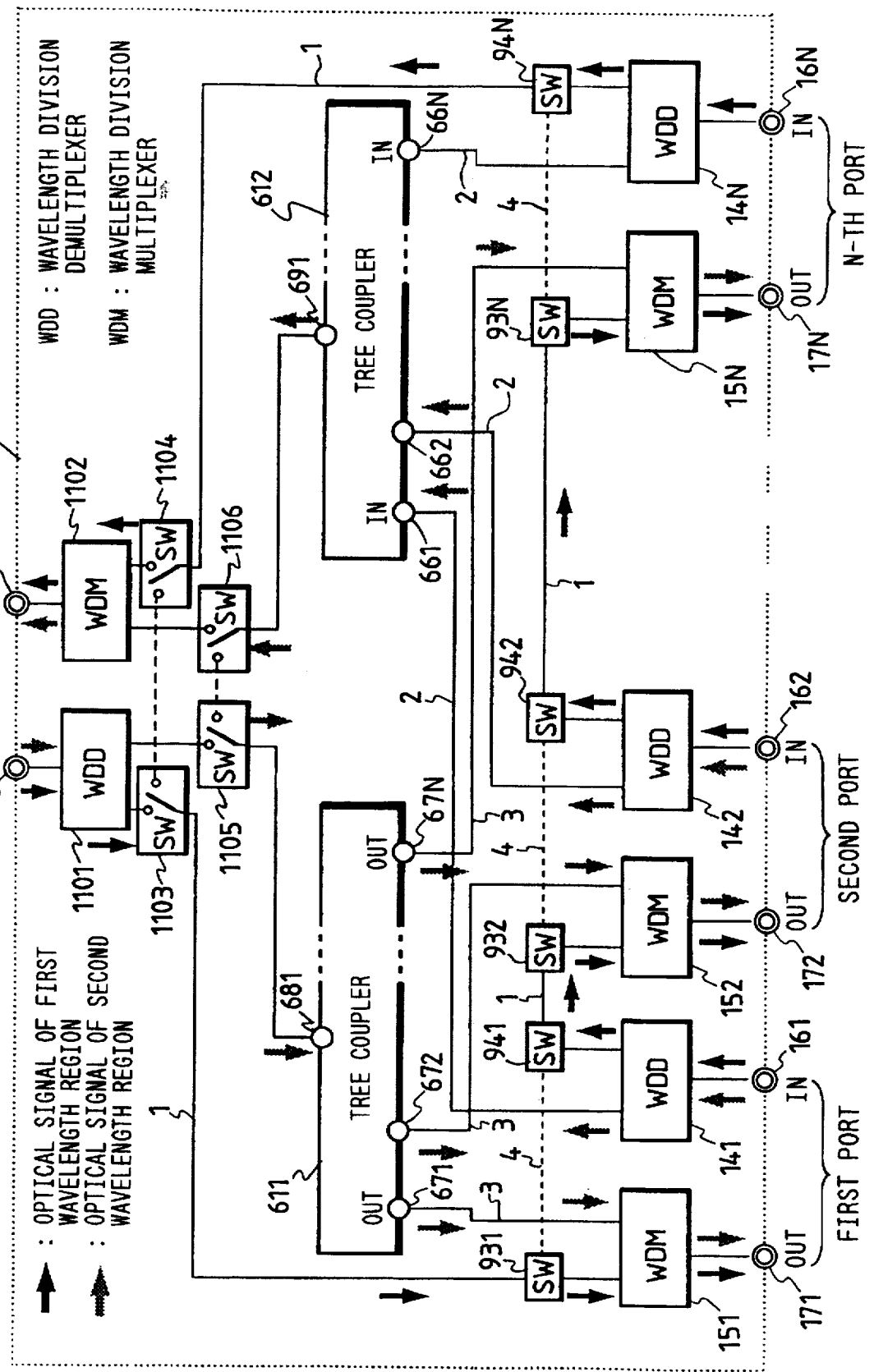
FIG. 15 is a block diagram showing the eighth embodiment of an optical concentrator according to the present invention.

The eighth embodiment according to the present invention will be described with reference to FIG. 15. FIG. 15 shows the arrangement of the eighth embodiment of a concentrator according to the present invention.

The basic arrangement of a concentrator 1110 of this embodiment shown in FIG. 15 is substantially the same as that of the concentrator 1010 of the seventh embodiment shown in FIG. 14. The eighth embodiment is different from the seventh embodiment in that optical switches 1104, 1103, 1106, and 1105 are used in place of the optical switches 1002 and 1001 in FIG. 14.

The operation of an arrangement in which optical concentrators of this embodiment are used as the optical concentrators 10 and 610 in the optical communication network in FIG. 11 will be described below. Note that the optical switches 1104 and 1103 and the optical switches 1106 and 1105 in the optical concentrator 10 are normally directly connected to each other.

Optical signals of the first wavelength region are sequentially transmitted to nodes connected to the respective ports to perform loop type optical communication, as described above. For example, the optical signal of the first wavelength region transmitted from a node 73N is input to an input port 16N of the N-th port of the left concentrator 610. The optical signal passing through this input port is demultiplexed by a wavelength division demultiplexer 14N, passes through the optical switch 1104 at an output port 651 of the repeating port, and is multiplexed with the optical signal of the second wavelength region by a wavelength division multiplexer 1102. The resultant signal is output from the output port 651 of the repeating port.

The optical signal of the first wavelength region output from an output port is input to an input port 641 of the left concentrator 610 through a loop-like route constituted by the concentrator 10 and the left concentrator 610, passes through the first to (N-1)-th ports of the left concentrator 610 in a predetermined order, and then repeated to the node 73N. Note that the optical signal of the first wavelength region input from the N-th port of the left concentrator 610 is demultiplexed by the wavelength division demultiplexer 14N and passes through the optical switches 1104 and 1103 directly connected to each other. The optical signals of the second wavelength region are supplied to all the terminals connected to the respective ports or the concentrator.

For example, the optical signal of the second wavelength region transmitted from a node 731 is input to an input port 161 of the first port of the left concentrator 610, demultiplexed by a wavelength division demultiplexer 141, and then input from an input terminal 661 to a second tree coupler 612. The optical signal of the second wavelength region input to the tree coupler 612 is coupled to an optical signal of the second wavelength region input from any other input port (wavelength-multiplexed optical signals having different wavelengths in the second wavelength region are also output from the respective nodes in this embodiment). The resultant signal is output from an output terminal 691, passes through the optical switch 1106, and is multiplexed with the optical signal of the first wavelength region by the wavelength division multiplexer 1102. The resultant signal is output to the output port 651, transmitted through the upstream optical fiber, and input to the input port 161 of the concentrator 10.

The input optical signal is demultiplexed from the optical signal of the first wavelength region by the wavelength division demultiplexer 141 in the concentrator 10 and is coupled to the optical signal of the second wavelength region input from each port by a tree coupler 612. The resultant signal is output from the output terminal 691. The output optical signal is supplied from the optical switch 1106 to the optical switch 1105 and input to an input terminal 681 of the tree coupler 611. The input optical signal of the second wavelength region is divided to output terminals 671, 672, ... 67N of the tree coupler 611. The divided components are multiplexed with the optical signal of the first wavelength region by the wavelength division multiplexers 151, 152, ... 15N. The resultant signals are supplied to the ports of the concentrator 10. Some of the optical signals supplied to the respective ports are transferred to the nodes connected to the concentrator 10. Some optical signals are transferred to the left concentrator 610, and the remaining optical signals are transferred to the right concentrator 610. The optical signals transferred to the respective concentrators are supplied to the output terminals in the corresponding concentrators and to the nodes, as described above.

A countermeasure against a failure having occurred when an optical fiber between the concentrators is disconnected will be described below. For example, when one of optical fibers 711 and 712 for connecting the concentrator 10 and the left concentrator 610 is disconnected, the optical switches 1106 and 1105 and the optical switches 1104 and 1103 in the left concentrator 610 are directly connected in accordance with a failure countermeasure control signal to reconstruct star and loop type transmission channels in an optical network constituted by the left concentrator 610 and the terminals connected thereto. The optical switches 931 and 941 located at the first port of the concentrator 10 are directly connected to reconstruct a loop type transmission channel in an optical network constituted by the concentrator 10, the right concentrator 610, and the terminal connected to either concentrator. Therefore, two independent networks are constructed to have a boundary as the disconnected point.

For example, when the optical fiber 721 is disconnected, the optical switches 1104 and 1103 are directly connected in the left concentrator 610 in accordance with a failure countermeasure control signal. The optical signal of the first wavelength region on the loop circuit, which is output from the wavelength division demultiplexer 14N, is supplied a wavelength division multiplexer 151 of the first port through the optical switches 1104, 1103, and 931.

This optical signal of the first wavelength region is supplied in a predetermined order to the ports arranged in a predetermined order to construct a new loop type transmission channel. The optical switches 1106 and 1105 are also directly connected in accordance with a failure countermeasure control signal, and the optical signal of the second wavelength region on the star circuit, which is output from the output terminal 691 of the tree coupler 612, passes through the optical switches 1106 and 1105 and is input to the input terminal of the tree coupler 611. This input optical signal is divided to the output terminals 671, 672, ... 67N of the tree coupler 611, and the divided components are multiplexed with the optical signal of the first wavelength region by the connected wavelength division multiplexers 151, 152, ... 15N and are output from the output ports 171, 172, ... 17N.

In the concentrator 10, the optical switches 931 and 941 located at the first port of the concentrator 10 are directly connected to cause the optical signal of the first wavelength region to bypass the failed first port. The signal is therefore input to the wavelength division multiplexer 152 of the second port. The optical signal input to the wavelength division multiplexer 152 passes through each port of the concentrator 10 and is then transmitted to the concentrator 10 again through a loop-like route of the left concentrator 610, thereby constructing a new loop type transmission channel.

Note that communication in the star type transmission channel in the optical network constituted by the concentrator 10, the right concentrator 610, and the terminals connected to either concentrator can be performed without implementing any failure countermeasure.

Each of the first, second, fifth, and sixth embodiments exemplifies a star coupler in which an optical signal input to an input terminal is output from an output terminal paired with this input terminal. However, a star coupler in which an input optical signal is not output to the paired output terminal may be used. In this case, a star type communication optical signal input from the input port of each port to the concentrator is not divided to the output ports. The concentrators may be connected through a set of input and output optical fibers. Even in this case, the star type optical communication optical signal is not repeatedly transferred between the concentrators. A plurality of concentrators of this type are used to constitute an optical communication network having a multi-stage star arrangement or a tree arrangement. In this case, the star type optical communication optical signal input from each node to the concentrator does not return to this node. A monitor means must be arranged in a node if monitoring of this node is required.

In each embodiment described above, a wavelength division multiplexer is used to multiplex optical signals of the different wavelength regions. However, an optical coupler may be used in place of the wavelength division multiplexer. In this case, when a coupling ratio of the optical coupler is set asymmetrical, optical signals of a specific wavelength region which pass through the concentrator can have small optical losses.

Each embodiment exemplifies a wavelength division demultiplexer and a wavelength division multiplexer as single elements. However, a plurality of constituent elements may be combined to constitute the wavelength division demultiplexer or wavelength division multiplexer.

The number of optical signals of a wavelength region for performing loop type optical communication is not limited to one. That is, the concentrator according to the present invention can be efficiently used for a plurality of wavelength signals wavelength-multiplexed within a predetermined wavelength region, such as a multiplexed signal of a wavelength region for performing star type optical communication in each embodiment described above. In this case, a means for transmitting optical signals wavelength-multiplexed within a wavelength region for performing loop type optical communication and a means for receiving and demultiplexing the multiplexed signal and selecting a desired wavelength signal can be arranged in a node connected to the concentrator.

In each embodiment described above, an FDDI is used as a loop type optical communication system. However, even if any other loop type optical communication system such as a token ring or a time division multiplex communication system is used, the concentrator of the present invention can be efficiently used. In addition, a plurality of circuits for performing loop type optical communication are provided by wavelength multiplexing, and a plurality of loop type circuits as a combination of an FDDI, a token ring, and a time division multiplex communication system may be configured.

The repeating means of the fifth embodiment and the failure countermeasure means of the sixth embodiment may be arranged in the concentrators of the second, third, and fourth embodiments, as needed.

When a wavelength-multiplexed optical communication network using the concentrator described with reference to each embodiment described above is to be configured, a node connected to the concentrator must have means for transmitting and receiving optical signals of a wavelength region for performing loop type optical communication. The node need not have means for transmitting and receiving the optical signals of the wavelength region for performing star type optical communication. When a node for performing only loop type optical communication is connected to a concentrator, a means for interrupting a wavelength signal for performing star type optical communication is arranged in the concentrator, between the concentrator and a node, or in the node. In this case, for example, a wavelength filter for transmitting not a wavelength for performing star type optical communication but a wavelength for performing loop type optical communication may be used.

Of all the input and output ports of the concentrator described in each embodiment, if unused ports are available, means for receiving an optical signal for performing loop type optical communication may be arranged at the input and output ports so as not to interrupt this optical signal output from the output port. This means is exemplified by a method of arranging a wavelength filter for transmitting only the optical signal for performing loop type optical communication between the input and output ports or a method of arranging a repeater for regenerating and repeating only an optical signal for performing loop type optical communication between the input and output port. Note that the bypassing means using the optical switch as described with reference to the sixth embodiment may be arranged in the concentrator.

In each embodiment described above, a set of upstream and downstream optical fibers are used to connect a concentrator to a node or between concentrators. However, the upstream and downstream optical fibers may be integrated. For example, the input and output ports of the concentrator can be integrated using a coupler or the like, and an optical isolator or the like is used not to input an upstream optical signal in the downstream transmission system. In this case, a similar means may also be arranged in a node.

Figure 16A:
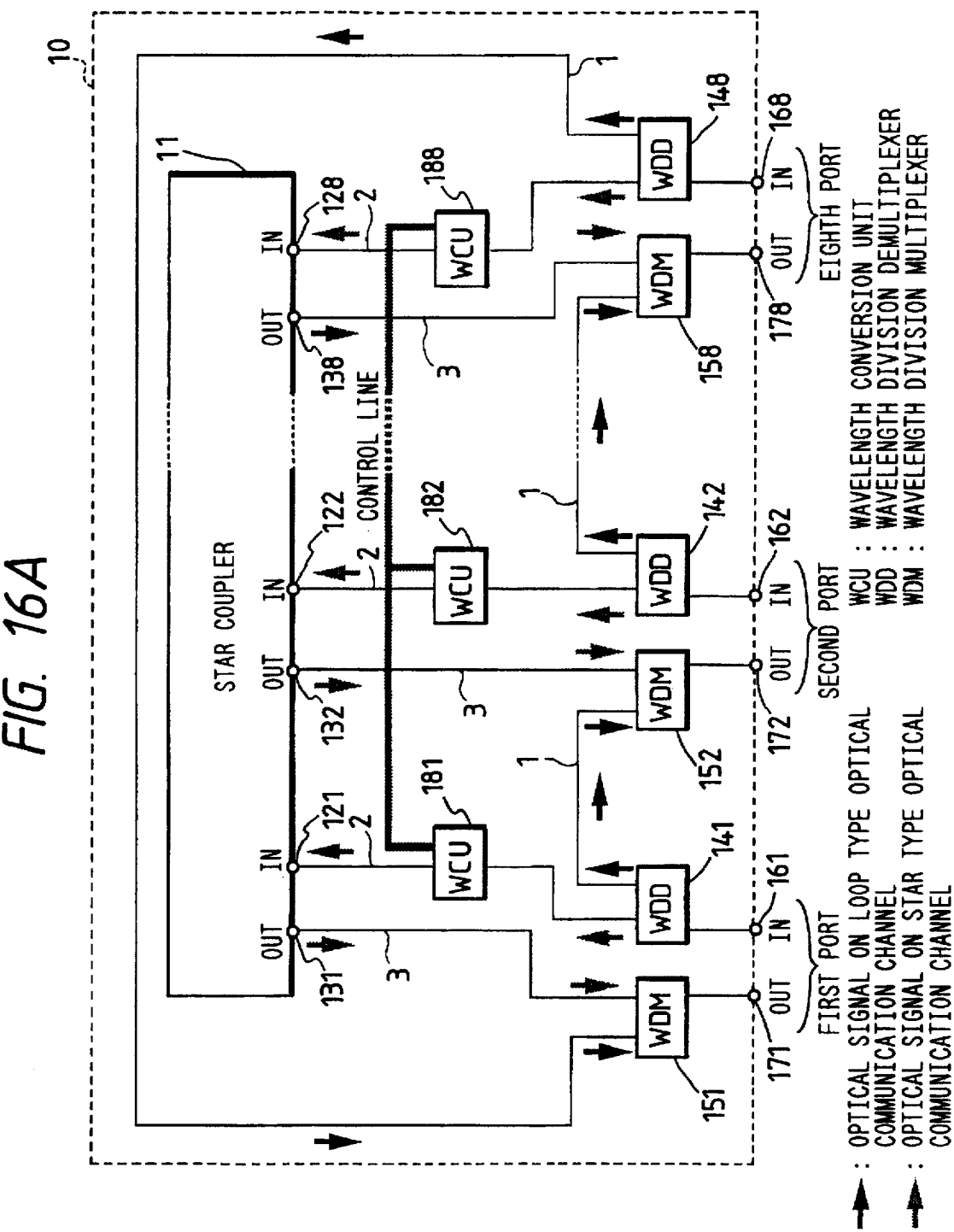
FIG. 16A is a block diagram showing the ninth embodiment of an optical concentrator according to the present invention.
Figure 16B:
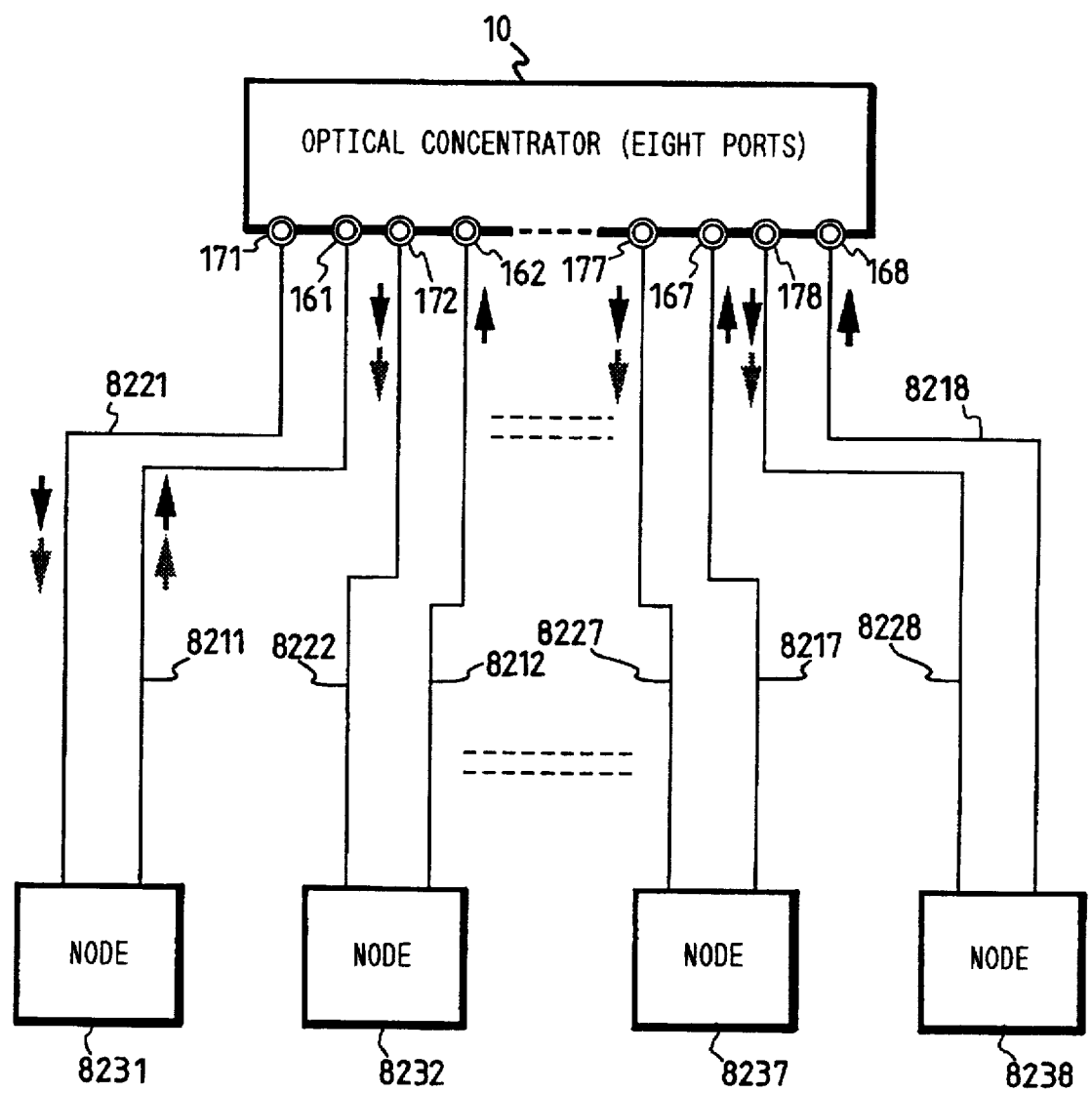
FIG. 16B is a block diagram showing the third embodiment of an optical communication network using the optical concentrator shown in FIG. 16A.
Figure 17A:
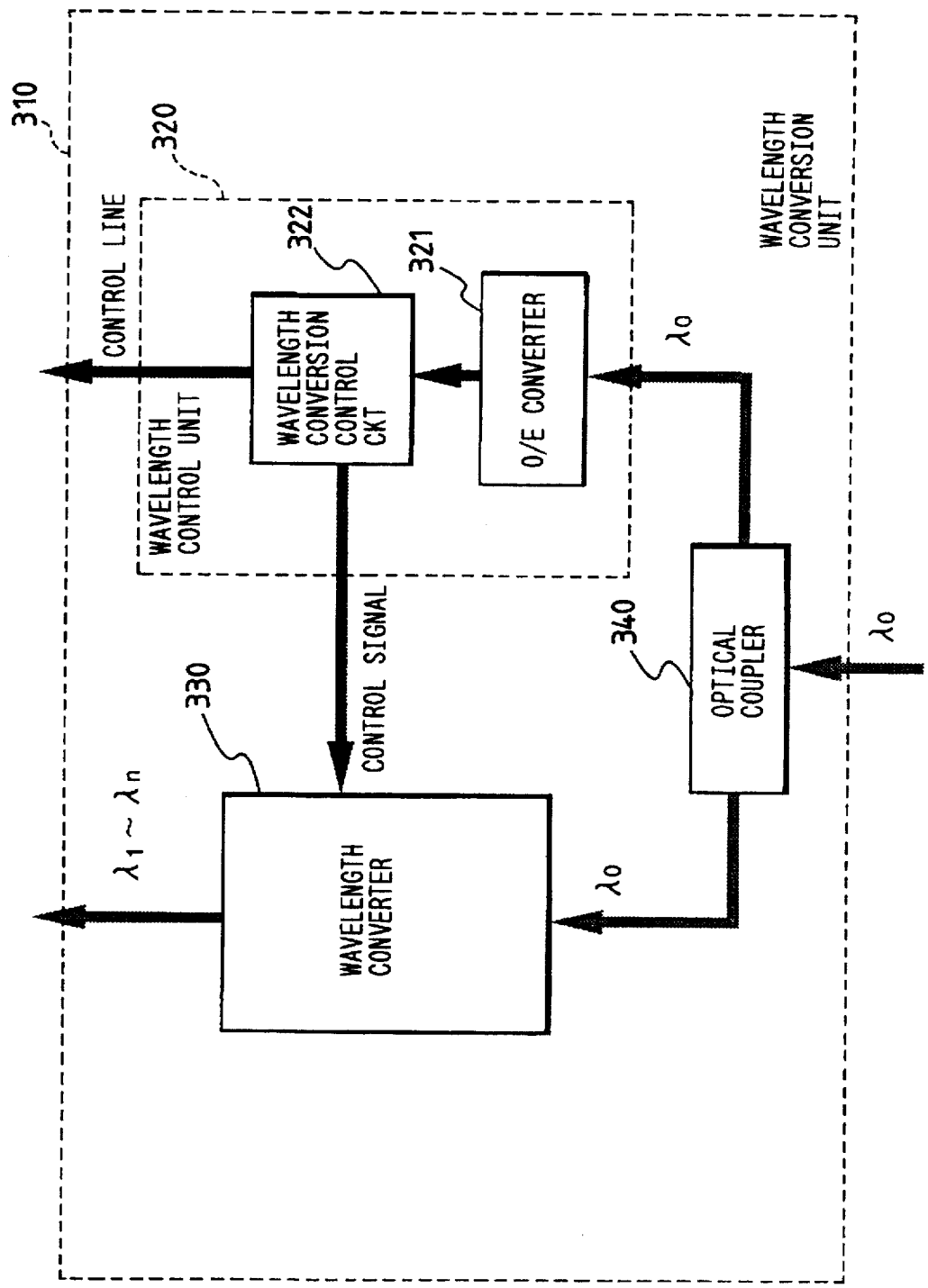
FIG. 17A is a block diagram showing the arrangement of a wavelength conversion unit in FIG. 16A.
Figure 17B:
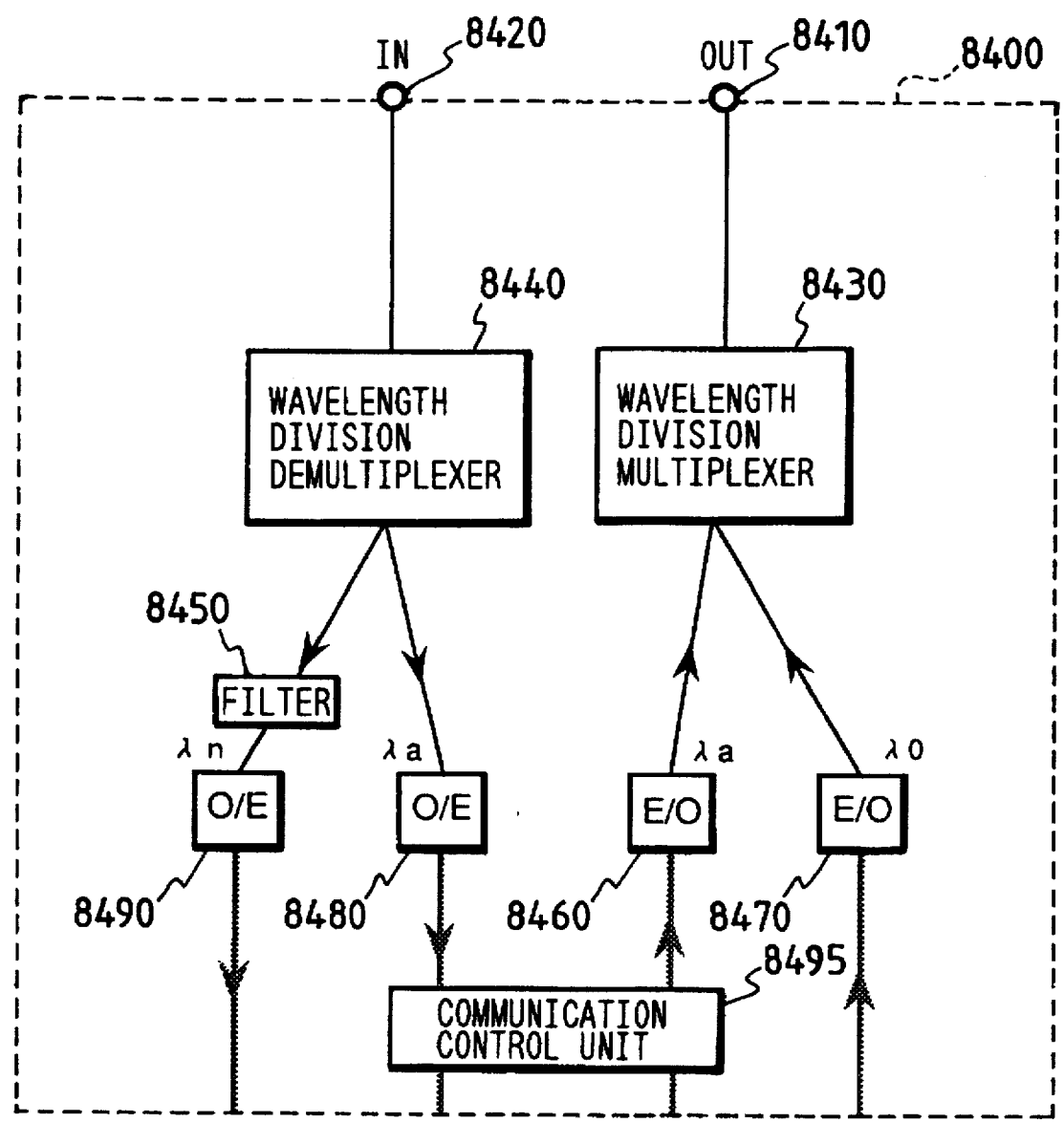
FIG. 17B is a block diagram showing the arrangement of an optical node connected to the optical concentrator shown in FIG. 16A.

FIGS. 16A and 16B and FIGS. 17A and 17B are views showing the ninth embodiment of the present invention. FIG. 16A shows the arrangement of a concentrator of this embodiment, and FIG. 16B shows the arrangement of an optical communication network using this concentrator. FIG. 17A shows the arrangement of a wavelength conversion unit used in the concentrator, and FIG. 17B shows the arrangement of a node suitably used in the above optical communication network. The arrangements of the concentrator, the optical communication network, the wavelength conversion unit, and the node will be described with reference to FIGS. 16A to 17B.

Referring to FIG. 16A, an 8×8 star coupler 11 has eight input terminals 121, 122, . . . 128 and eight output terminals 131, 132, . . . 138. The input terminals 121, 122, . . . 128 are paired with the output terminals 131, 132, . . . 138, respectively to constitute input/output terminal pairs. Wavelength division demultiplexers 141, 142, . . . 148 demultiplex wavelength-multiplexed light input from input ports 161, 162, . . . 168 of the concentrator of this embodiment into optical signals having wavelengths $\lambda a$ and $\lambda 0$. The demultiplexed loop-circuit optical signals (wavelength $\lambda a$) are supplied to wavelength division multiplexers (e.g., a wavelength division multiplexer 152 corresponds to the wavelength division demultiplexer 141) of the adjacent ports. Star-circuit optical signals (wavelength $\lambda 0$) are output to wavelength conversion units 181, 182, . . . 188, respectively. The wavelength conversion units 181, 182, . . . 188 convert the optical signals from the wavelength division demultiplexers 141, 142, . . . 148 into optical signals having an arbitrary wavelength. The wavelength division multiplexer 151 and wavelength division multiplexers 152, . . . 158 multiplex optical signals from the star coupler 11 and the wavelength division demultiplexers (e.g., the wavelength division demultiplexer 141 corresponds to the wavelength division multiplexer 152). The output terminals of the wavelength division multiplexers are respectively used as output ports 171, 172, . . . 178 of the concentrator 10 of this embodiment.

Referring to FIG. 16B, the concentrator 10 has the arrangement described with reference to FIG. 16A. The number of input/output ports is eight. Optical fibers (upstream optical fibers) 8211, 8212, . . . 8217, and 8218 transmit the optical signals sent from nodes 8231, 8232, . . . 8237, and 8238 to the concentrator 10, and are connected to the input ports 161, 162, . . . 167, and 168, respectively. Optical fibers (downstream optical fibers) 8221, 8222, . . . 8227, and 8228 transmit the output optical signals from the concentrator 10 to the respective nodes and are connected to the output ports 171, 172, . . . 177, and 178, respectively.

Referring to FIG. 17A, an optical coupler 340 divides the optical signal of the wavelength $\lambda 0$ from the wavelength division demultiplexer in the concentrator into two optical signals. A wavelength converter 330 converts one of the optical signals of the wavelength $\lambda 0$ which is divided by the optical coupler 340 into an arbitrary wavelength selected from wavelengths $\lambda 1$ to $\lambda N$. An optical/electric (O/E) converter 321 converts the other divided optical signal from the optical coupler 340 into an electrical signal. A wavelength conversion control circuit 322 analyzes information associated with wavelength conversion of the electrical signal sent from the O/E converter 321 to control the wavelength converter 330, or controls wavelength conversion control circuits arranged at the respective ports so as to prevent radio interference in the star circuit. A wavelength control unit 320 comprises the O/E converter 321 and the wavelength conversion control circuit 322.

Referring to FIG. 17B, output and input terminals 8410 and 8420 are arranged to output and receive an optical signal of a node and are connected to the input and output ports of the concentrator 10 through an optical fiber transmission channel. A wavelength division multiplexer 8430 multiplexes optical signals having wavelengths output from the respective optical transmitters. The output terminal of the wavelength division multiplexer 8430 is connected to an output terminal 8410 of a node and outputs wavelength-multiplexed light of a loop circuit (wavelength $\lambda a$) and a star circuit (wavelengths $\lambda 1$ to $\lambda 8$). A wavelength division demultiplexer 8440 demultiplexes wavelength-multiplexed light into optical signals of the loop circuit (wavelength $\lambda a$) and the star circuit (wavelengths $\lambda 1$ to $\lambda 8$). The input terminal of the wavelength division demultiplexer 8440 is connected to an input terminal 8420 of the node. An optical transmitter 8470 has an oscillation wavelength $\lambda 0$ and converts video information into an optical signal. An optical transmitter 8460 has an oscillation wavelength $\lambda a$ and converts computer information into an optical signal. A fixed wavelength filter 8450 transmits only optical signals of fixed wavelengths $\lambda n$ (in this case, the wavelength $\lambda 1$ is assigned to the node 8231; $\lambda 2$, to 8232; and $\lambda 3$, to 8233; . . . $\lambda 8$, to 8238) assigned to the respective nodes. An optical receiver 8490 converts the optical signal passing through the fixed wavelength filter 8450 into an electrical signal. The node also has an optical receiver 8480 and a communication control unit 8495 for controlling time division multiplex communication of the loop circuit.

The concentrator of this embodiment and an optical communication network using this concentrator will be generally described with reference to FIGS. 16A and 16B and FIGS. 17A and 17B. A network of this embodiment is a communication system in which a concentrator to which eight nodes can be connected and the nodes are arranged in a star shape, and multimedia information such as computer information and video information are exchanged between the nodes. This network constitute a system in which a loop circuit and a star circuit are multiplexed in one optical fiber in accordance with wavelength multiplex technique. The loop circuit is defined as a circuit in which a signal output from a given node is repeated and transferred in a predetermined order to the nodes arranged in a predetermined order. The loop circuit is used mainly for transmission of computer information (character information). The star circuit is defined as a circuit in which an optical signal sent from a node is divided to all nodes by the star coupler 11 in the concentrator 10 to perform broadcast communication. The star circuit is used for transmission of video information. As for a star circuit communicating means, each node has an optical transmitter having the oscillation wavelength $\lambda 0$, the fixed wavelength filter 8450 for transmitting and receiving only an optical signal (a star-circuit optical signal) having a wavelength different from those of the remaining nodes, and an optical receiver. The wavelength converter in the concentrator converts the optical signal of the wavelength $\lambda 0$ for the star circuit sent from the transmission node into a wavelength assigned to the destination node. The destination node causes the fixed wavelength filter 8450 to transmit light having a wavelength assigned to this node and receives video information. According to star-circuit communication method, transmission of the video information using a star circuit can be performed without performing preliminary communication between the transmission and reception terminals.

The operations of the concentrator of this embodiment and the optical communication network using this concentrator will be described with reference to FIGS. 16A and 16B and FIGS. 17A and 17B. First of all, the communication operation of the star circuit will be described. Assume that video information must be transmitted from the node 8231 to the node 8232 using the star circuit. The node 8231 causes the optical transmitter 8470 to convert the address information (information associated with wavelength conversion) of the destination node and video information into an optical signal of the wavelength $\lambda 0$. The optical signal of the wavelength $\lambda 0$ is multiplexed with the optical signal of the wavelength $\lambda a$ of the loop circuit by the wavelength division multiplexer 8430. The resultant signal is output from the output terminal 8410 to the optical fiber 8211. The optical signal of the wavelength $\lambda 0$ input to the input port 161 of the concentrator 10 is demultiplexed from the optical signal of the wavelength $\lambda a$ by the wavelength division demultiplexer 141 and input to the wavelength conversion unit 181. The input optical signal of the wavelength $\lambda 0$ is divided into two signals by the optical coupler 340. One divided light is input to the O/E converter 321 in the wavelength control unit 320. The other divided light is input to the wavelength converter 330. The optical signal input to the O/E converter 321 is converted into an electrical signal, and the electrical signal is input to the wavelength conversion control circuit 322. The wavelength conversion control circuit 322 analyzes the address of the reception terminal which is written in the header portion of the input electrical signal and controls the wavelength converter 330 to convert the optical signal of the wavelength $\lambda 0$ input to the wavelength converter 330 into a wavelength assigned to the reception terminal. In this case, the address of the node 8232 is written in the header portion, and the reception wavelength assigned to the node 8232 is the wavelength $\lambda 2$. The wavelength converter 330 is controlled by the wavelength conversion control circuit 322 to convert the optical signal of the wavelength $\lambda 0$ into an optical signal of the wavelength $\lambda 2$. The header portion and the video information portion of the optical signal (optical signal of the star circuit) of the wavelength $\lambda 0$ sent from the transmission node are converted into an optical signal of a wavelength assigned to a node as the destination node. The wavelength-converted optical signal of the wavelength $\lambda 2$ is input to the input terminal 121 of the star coupler 11. The input optical signal of the wavelength $\lambda 2$ is coupled to the optical signal input from another input terminal of the star coupler 11 and is divided to the respective output terminals. The optical signal of the wavelength $\lambda 2$ divided to the output terminal 132 of the star coupler 11 is multiplexed with the optical signal of the wavelength $\lambda a$ by the wavelength division multiplexer 152, and the resultant signal is output from the output port 172 to the downstream optical fiber 8222. The optical signal of the wavelength $\lambda 2$ input to the node 8232 is demultiplexed from the optical signal of the wavelength $\lambda a$ by the wavelength division demultiplexer 8440 and input to the fixed wavelength filter 8450. The fixed wavelength filter 8450 transmits only the optical signal of the wavelength $\lambda 2$ (i.e., the optical signal of the wavelength assigned to the node 8232) from the optical signals of the wavelengths $\lambda 1$, $\lambda 2$, . . . $\lambda 8$ used in the star circuit. The transmitted optical signal of the wavelength $\lambda 2$ is converted into an electrical signal by the optical receiver 8490. The node 8232 receives a video signal from the node 8231.

The communication operation of the loop circuit will be described below. Communication using the loop circuit is to exchange computer information using a time division multiplex communication scheme. Assume that computer information must be transmitted from the node 8231 to the node 8238. The node 8231 causes the optical transmitter 8460 to convert the computer information into an optical signal of the wavelength $\lambda a$. The converted optical signal of the wavelength $\lambda a$ is multiplexed with the optical signal of the wavelength $\lambda 0$ of the star circuit by the wavelength division multiplexer 8430, and the resultant signal is output from the output terminal 8410. The optical signal of the wavelength $\lambda a$ transmitted through the upstream optical fiber 8211 and input to the input port 161 of the concentrator 10 is demultiplexed from the optical signal of the wavelength $\lambda 0$ by the wavelength division demultiplexer 141 and input to the wavelength division multiplexer 152. The wavelength division multiplexer 152 multiplexes the wavelength-multiplexed light of the star circuit output from the output terminal 132 of the star coupler 11 with the optical signal of the wavelength $\lambda a$. The multiplexed optical signal of the wavelength $\lambda a$ is transmitted through the downstream optical fiber 8222 and input to the node 8232. The input optical signal of the wavelength $\lambda a$ is demultiplexed from the wavelength-multiplexed light of the star circuit by the wavelength division demultiplexer 8440 and converted into an electrical signal by the optical receiver 8480. The communication control unit 8495 analyzes whether the received information requires transfer. Since the received information is information transmitted to the node 8238, it is input from the communication control unit 8495 to the optical transmitter 8460 and converted into the optical signal of the wavelength $\lambda a$. The converted optical signal of the wavelength $\lambda a$ passes through the wavelength division demultiplexer 8430 and is output to the upstream optical fiber 8212. Similarly, the optical signal of the wavelength $\lambda a$ is sequentially transferred through the nodes 8233, 8234, . . . 8237 and input to the node 8238. The node 8238 receives the computer information from the node 8231 and converts an empty frame of the time division multiplex communication scheme into an optical signal of the wavelength $\lambda a$. This optical signal is sent through the upstream optical fiber 8218. The sent optical signal is input to the node 8231 through the concentrator 10. Therefore, the optical signal of the wavelength $\lambda a$ is sequentially transferred to all the nodes connected to the concentrator 10, thereby forming a loop-like transmission channel.

As described above, the common upstream and downstream optical fibers are used to connect the node to the concentrator of this embodiment to obtain wavelength-multiplexed optical communication in which the loop type optical communication system and the star type optical communication system are integrated. Unlike the protocol using the conventional concentrator, preliminary communication for establishing a star circuit using a loop circuit need not be performed in communication (communication of video information) of the star circuit. Therefore, a new optical network capable of performing high-speed communication as of video information can be realized.

In the star circuit of this embodiment, when video information is transmitted from a plurality of nodes to one node, the optical signals of the respective pieces of video information are controlled by the respective wavelength conversion control circuits so as not to couple the optical signals (video information) transmitted from the plurality of nodes in the star coupler 11 in the concentrator 10.

The video data is transmitted through the star circuit, and the computer information (character information) is transmitted through the loop circuit. However, the types of data transmitted through these circuits are not limited to specific ones.

Communication using the loop circuit is exemplified using the time division multiplex scheme. However, an FDDI protocol or the like may be used as the communication protocol of the loop circuit.

This embodiment exemplifies the optical network in which a plurality of nodes are connected to one concentrator. However, the concentrator of the present invention can be suitably used in an optical network system in which a plurality of concentrators are connected.

Figure 18:
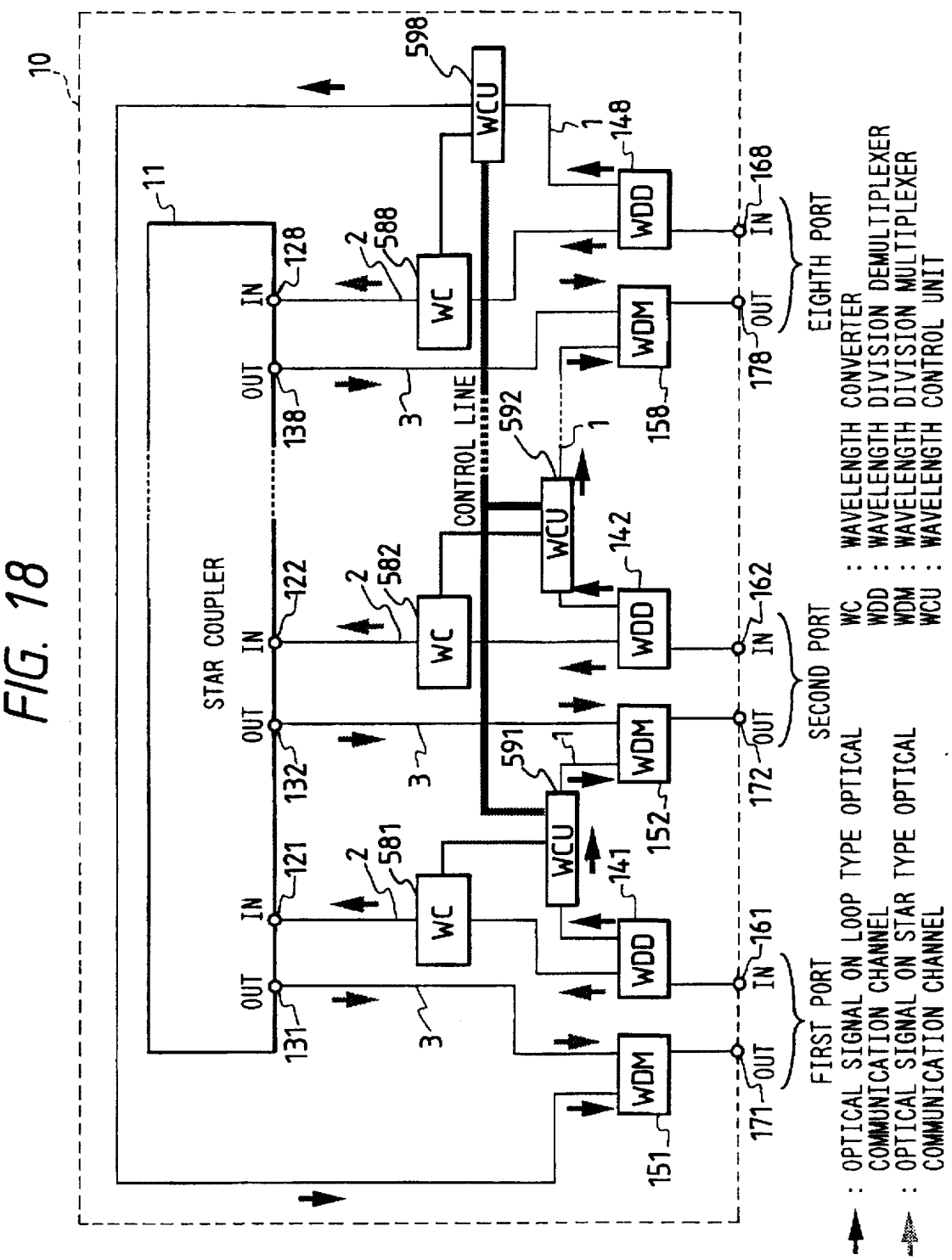
FIG. 18 is a block diagram showing the tenth embodiment of an optical concentrator according to the present invention.

FIG. 18 is a view showing the tenth embodiment of the present invention. FIG. 18 shows the arrangement of a concentrator of this embodiment. The arrangements of a network, a wavelength conversion unit, and a node of this embodiment are the same as those of the ninth embodiment, as shown in FIGS. 16B, 17A, and 17B. The arrangement of the concentrator according to the tenth embodiment will be described with reference to FIG. 18.

Referring to FIG. 18, wavelength converters 581, 582, . . . . 588 convert the wavelengths of optical signals on the star circuit, which are output from wavelength division demultiplexers 141, 142, . . . . 148, and have the same arrangement as that of the wavelength converter 330 in the wavelength conversion unit 310 described with reference to FIG. 17A. Wavelength control units 591, 592, . . . 598 convert the optical signals on the loop circuit, which represent information associated with wavelength conversion and are output from the wavelength division demultiplexers 141, 142, . . . . 148, into electrical signals and perform wavelength conversion control of the wavelength converters 581, 582, . . . 588 on the basis of this information. The wavelength control units 591, 592, . . . 598 have the same arrangement as that of the wavelength control unit 320 in the wavelength conversion unit 310 described with reference to FIG. 17A.

The star-circuit communication operations of the concentrator of this embodiment and an optical communication network using this concentrator will be described with reference to FIGS. 16B, 17A, 17B, and 18. Assume that video information must be transmitted from a node 8231 to a node 8232. The node 8231 transmits information associated with wavelength conversion of an optical signal of a wavelength $\lambda 0$ to a wavelength control unit 591 using the time division multiplex circuit of the loop circuit. The information associated with wavelength conversion is an address to the reception terminal as a destination. Upon reception of this information, the wavelength control unit 591 recognizes that video information is to be transmitted from the node 8231 to the node 8232 through a star circuit. The wavelength control unit 591 controls a wavelength converter 581 such that the optical signal of the wavelength $\lambda 0$ output from the node 8231 is converted into a wavelength $\lambda 2$ assigned to the reception node 8232. Wavelength conversion of the wavelength converter 581 under the control of the wavelength control unit 591 is the same as in the ninth embodiment. After the node 8231 transmits information associated with wavelength conversion to the wavelength control unit 591, an optical transmitter 8470 in the node 8231 converts video signal into the optical signal of the wavelength $\lambda 0$. The converted optical signal of the wavelength $\lambda 0$ is multiplexed with an optical signal of a wavelength $\lambda a$ on a loop circuit by a wavelength division multiplexer 8430, and the multiplexed signal is output from an output terminal 8410 to an optical fiber 8211. The optical signal of the wavelength $\lambda 0$ input to a concentrator 10 is demultiplexed from the optical signal of the wavelength λ0 by a wavelength division demultiplexer 141 and input to the wavelength converter 581. The input optical signal of the wavelength λ0 is converted into the optical signal of the wavelength λ2 under the control of the wavelength control unit 591. The optical signal of the wavelength λ2 input to a star coupler is coupled to an optical signal on the star circuit input from another input terminal of the star coupler 11. The resultant signal is divided to the respective output terminals. The optical signal of the wavelength λ2 output from an output terminal 132 of the star coupler 11 is multiplexed with the optical signal of the wavelength λa by a wavelength division multiplexer 152, and the resultant signal is output from an output port 172 to a downstream optical fiber 8222. The optical signal of the wavelength λ2 input to the node 8232 is demultiplexed from the optical signal of the wavelength λa by a wavelength division demultiplexer 8440 and input to a fixed wavelength filter 8450. The fixed wavelength filter 8450 transmits only the optical signal of the wavelength λ2 (i.e., the optical signal of the wavelength assigned to the node 8232) of all optical signals of the wavelengths λ1, λ2, ... λ8 used on the star circuit. The transmitted optical signal of the wavelength λ2 is converted into an electrical signal by an optical receiver 8490, and the node 8232 receives the video signal from the node 8231.

In the ninth and tenth embodiments, a wavelength division demultiplexer and a wavelength division multiplexer are exemplified as single elements. However, the wavelength division demultiplexer or wavelength division multiplexer may be arranged as a combination of a plurality of constituent elements. For example, a wavelength division demultiplexer can be arranged as a combination of an optical coupler and an optical wavelength filter.

A plurality of wavelengths may be used on the loop circuit. When the plurality of wavelengths are assigned to the loop circuit, an FDDI, a token ring, or a time division multiplex communication may be assigned to each wavelength to constitute a plurality of loop circuits. This can be practiced without any problem in the present invention.

When a wavelength-multiplexed communication network using a concentrator described in each embodiment is to be configured, and a node for performing only loop type optical communication is to be connected to the concentrator, a means for interrupting only a wavelength signal for performing star circuit type optical communication may be arranged in the concentrator, between the concentrator and a node, or in the node. In this case, for example, a wavelength filter for transmitting not a wavelength for performing star type optical communication but only the wavelength for loop type optical communication can be used.

Of all the input and output ports of the concentrator described in each embodiment, if unused ports are available, means for receiving optical signals for performing loop type optical communication may be arranged at the input and output ports so as not to interrupt this optical signal output from the output port. This means is exemplified by a method of arranging a wavelength filter for transmitting only the optical signal for performing loop type optical communication between the input and output ports or a method of arranging a repeater for regenerating and repeating only an optical signal for performing loop type optical communication between the input and output port.

In each embodiment described above, a set of upstream and downstream optical fibers are used to connect a concentrator to a node or between concentrators. However, the upstream and downstream optical fibers may be integrated.

For example, the input and output ports of the concentrator can be integrated using a coupler or the like, and an optical isolator or the like is used not to input an upstream optical signal in the downstream transmission system. In this case, a similar means may also be arranged in a node.

Figure 19:
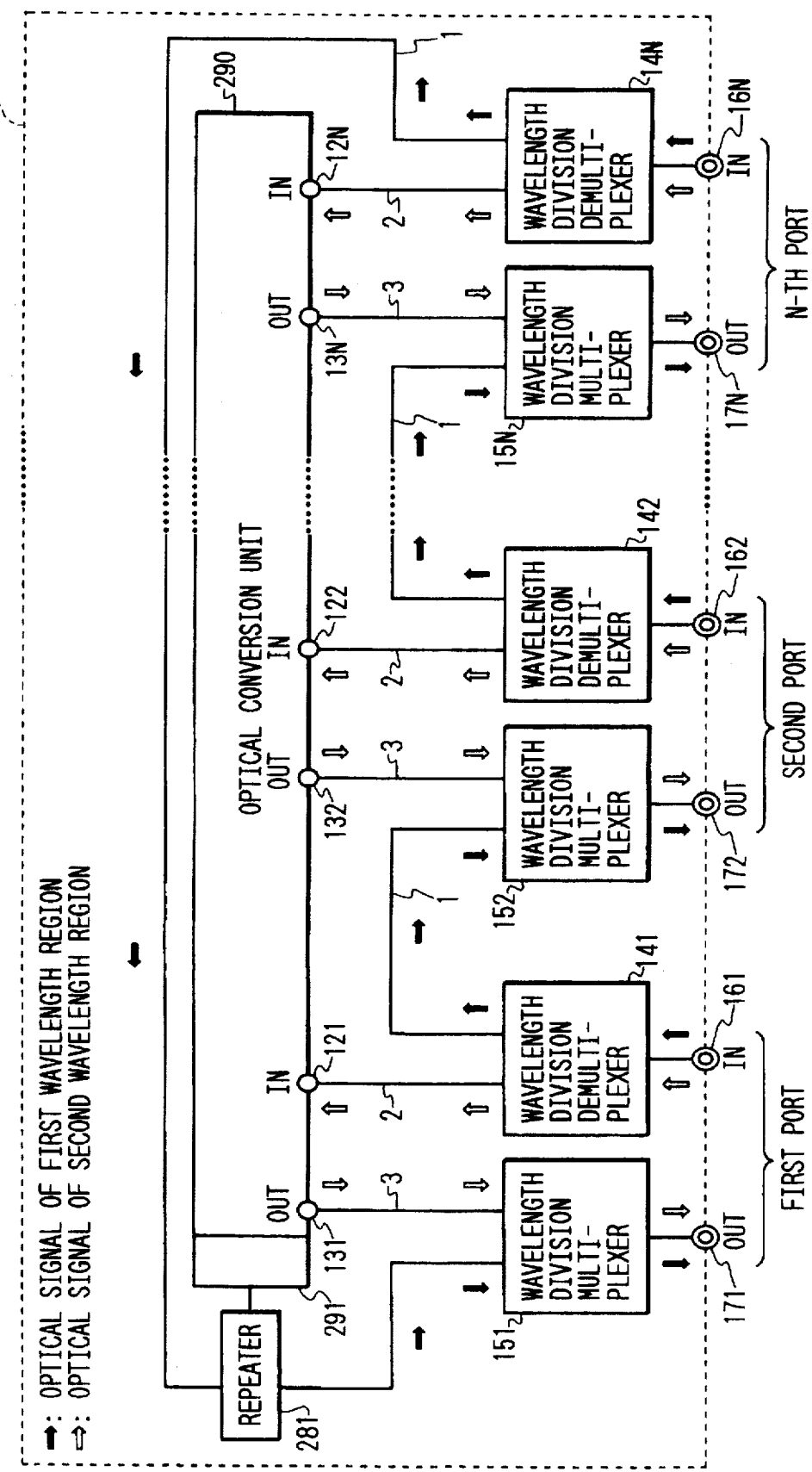
FIG. 19 is a block diagram showing the eleventh embodiment of an optical concentrator according to the present invention.
Figure 20:
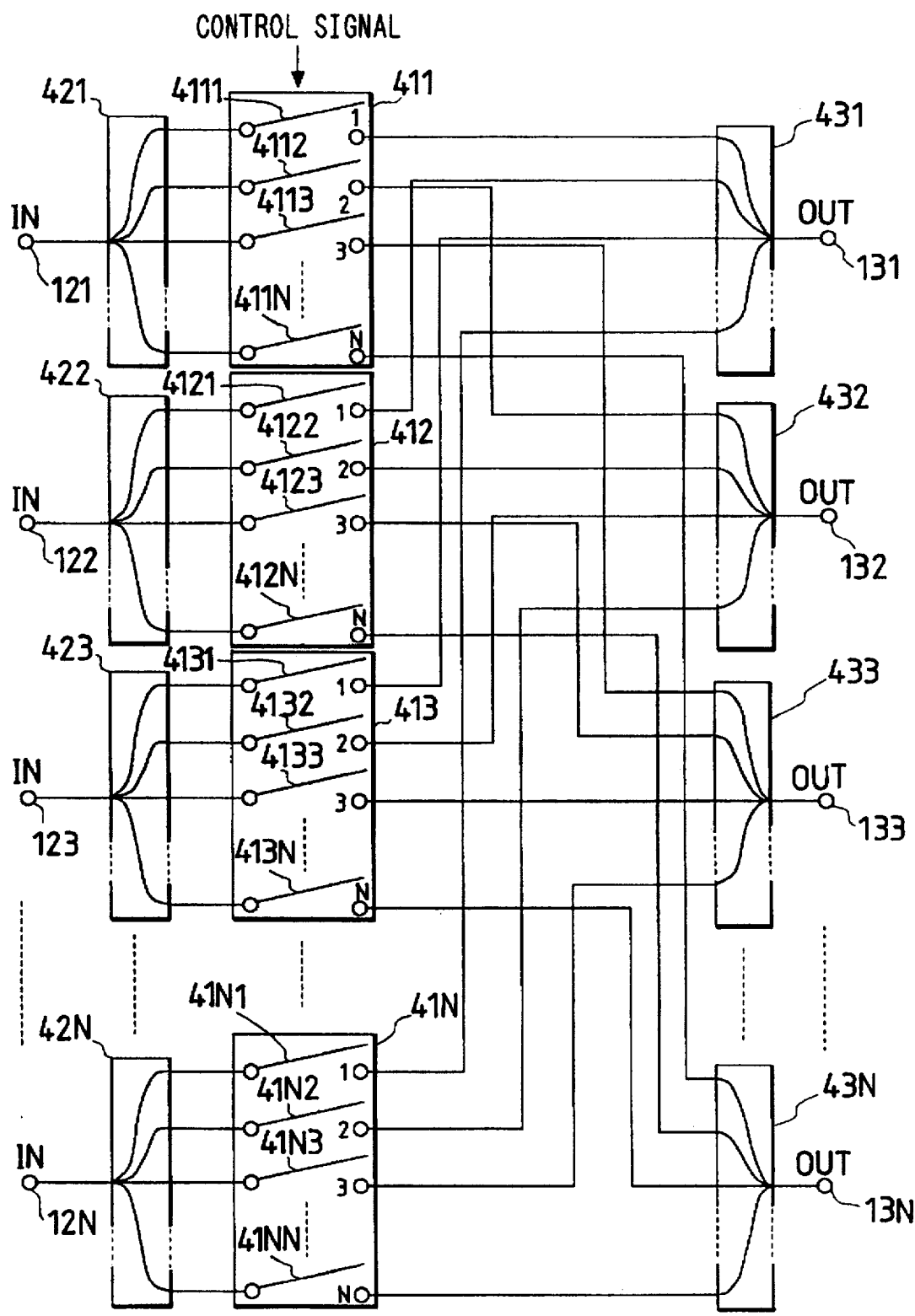
FIG. 20 is a block diagram showing the arrangement of an optical exchanger shown in FIG. 19.
Figure 21:
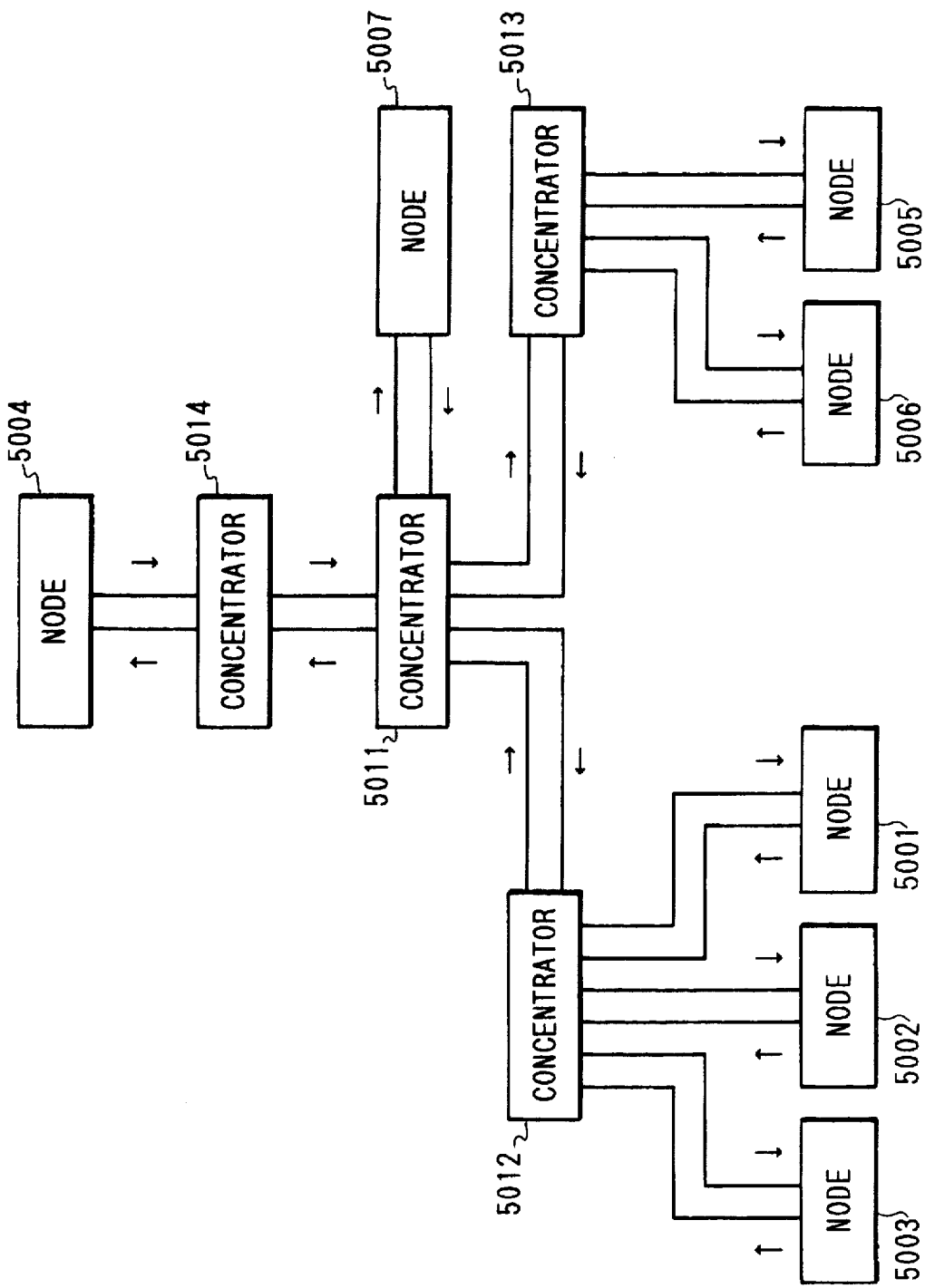
FIG. 21 is a block diagram showing the fourth embodiment of an optical communication network using the optical concentrator shown in FIG. 19.

FIGS. 19, 20, and 21 are views showing the eleventh embodiment of the present invention. Embodiments from the eleventh embodiment to the sixteenth embodiment exemplify arrangements in which concentrators according to the present invention are used in wavelength-multiplexed optical communication. FIG. 19 shows the arrangement of the concentrator of the eleventh embodiment, and FIG. 21 shows the arrangement of an optical communication network using this concentrator. This embodiment can also be used in the optical communication network shown in FIG. 6. The node shown in FIG. 7 can be suitably used in this embodiment. FIG. 20 shows the arrangement of an optical conversion unit used in this concentrator. The concentrator, the optical communication network, the node, and the optical conversion unit will be described with reference to these drawings.

Referring to FIG. 19, an N×N optical conversion unit 290 has N input terminals 121, 122, ... 12N and N output terminals 131, 132, ... 13N. The input and output terminals 121 and 131, 122 and 132, ... constitute input/output terminal pairs. The optical conversion unit 290 comprises 1×N star couplers 421, 422, ... 42N, optical switch groups 411, 412, ... 41N, and N×1 star couplers 431, 432, ... 43N. The optical switch groups 411, 412, ... 41N are controlled by external control signals to supply an optical signal to at least one arbitrary output terminal. Wavelength division demultiplexers 141, 142, ... 14N demultiplex input light into optical signals of first and second wavelength regions. The output terminals of the second wavelength region of the wavelength division demultiplexers are connected to the input terminals of the optical conversion unit 290. The input terminals of the wavelength division demultiplexers are used as input ports 161, 162, ... 16N of a concentrator 10. Wavelength division multiplexers 151, 152, ... 15N multiplex the optical signals of the first and second wavelength regions. The input terminals of the second wavelength region of the wavelength division multiplexers are connected to the output terminals of the concentrator 10 of this embodiment. The output terminals of the wavelength division multiplexers are used as output ports 171, 172, ... 17N of the concentrator 10 of this embodiment. The output terminals of the first wavelength region of the wavelength division demultiplexers 141, 142, ... 14N are connected to the input terminals of the first wavelength region of the wavelength division multiplexers of the next ones of the ports arranged in a predetermined order. Referring to FIG. 19, the output terminal of the first wavelength region of the wavelength division demultiplexer 141 is connected to the input terminal of the first wavelength region of the wavelength division multiplexer 152, and the output terminal of the first wavelength region of the wavelength division demultiplexer 142 is connected to the input terminal of the first wavelength region of the wavelength division multiplexer 153 (not shown in FIG. 19). Similarly, the output terminal of the first wavelength region of the wavelength division demultiplexer 14N of the N-th port is connected to the input terminal of the first wavelength region of the wavelength division multiplexer 151 of the first port.

FIG. 21 is a view showing the arrangement of the optical communication network using the concentrator of this embodiment. This network has concentrators 5011, 5012, 5013, and 5014 of this embodiment and nodes 5001 to 5007.

Referring to FIG. 20, the optical conversion unit 290 has the input terminals 121, 122, . . . 12N and the output terminals 131, 132, . . . 13N. The star couplers 421, 422, . . . 42N divide optical signals input from the input terminals in the N direction. Optical switch groups 411, 412, . . . 41N transmit or interrupt the optical signals from the star couplers. The star couplers 431, 432, . . . 43N couple the optical signals from the optical switch groups. The first output from each optical switch group is input to the input port of the star coupler 431, the second output from each optical switch group is input to the input port of the star coupler 432, and the N-th output from each optical switch group is input to the input port of the star coupler 43N. The optical conversion unit 290 of this embodiment controls the optical switch groups 411, 412, . . . 41N in accordance with control signals to divide an optical signal input from one input terminal to at least one arbitrary output terminal. In this embodiment, as shown in FIG. 19, a control signal on the FDDI is extracted by a repeater 281 having a function of extracting the control signal in the concentrator. The extracted control signal is supplied to a control signal analysis unit 291, thereby controlling and analyzing the control signal. A plurality of optical signals input from different input terminals can be simultaneously supplied to one output terminal. In this case, nodes connected to these input terminals output optical wavelength signals having different wavelengths in the second wavelength region, and a target wavelength signal can be selected from a wavelength-multiplexed optical signal by a variable wavelength filter. This designation of the transmission wavelength can also be performed on the FDDI.

The operations of the concentrator of this embodiment and the optical communication network using this concentrator will be described with reference to FIGS. 6, 7, 19, 20, and 21. Assume that an optical signal is output from a node 231 connected through upstream and downstream optical fibers 211 and 221 to the input and output ports 161 and 171 of the concentrator 10. A signal output from an FDDI control unit 40 is converted into the optical signal of the first wavelength region by an optical transmitter 36, passes through a wavelength division multiplexer 33, and output to the upstream optical fiber 211 from an output terminal 31. The optical signal transmitted through the optical fiber 211 and input to the input port 161 of the first port of the concentrator 10 is demultiplexed by the wavelength division demultiplexer 141 and input to the wavelength division multiplexer 152 of the second port as the adjacent port. The optical signal output from the wavelength division multiplexer 152 is transmitted to a node 232 through the downstream optical fiber 222 connected to the output port 172. In the node 232, the input signal is demultiplexed by a wavelength division demultiplexer 34, converted into an electrical signal by an optical receiver 37, and sent to the FDDI control unit 40. The FDDI control unit analyzes the contents of the received signal and sends a necessary signal to the optical transmitter 36. This signal is converted into the optical signal of the first wavelength region by the optical transmitter 36 and is output from the output terminal 31 to the upstream optical fiber 211 through the wavelength division multiplexer 33. The optical signal of the first wavelength region, which is output from the node 232 connected to the second port, is input to the input port 162 of the second port of the concentrator 10. This signal is then demultiplexed by the wavelength division demultiplexer 142 and is input to a wavelength division multiplexer (not shown in FIG. 19) of the third port as the next port. Similarly, the optical signals of the first wavelength region are sequentially supplied to a plurality of ports arranged in a predetermined order. The optical signals of the first wavelength region are sequentially transmitted to the nodes connected to the concentrator 10 to form a loop transmission circuit, thereby performing loop type optical communication between the nodes. On the other hand, the optical signal of the second wavelength region output from an optical transmitter 35 of the node 231 is multiplexed with the optical signal of the first wavelength region by the wavelength division multiplexer 33 and output from the output terminal 31 to the optical fiber 211. This signal is input to the input port 161 of the first port of the concentrator 10. The input signal is demultiplexed into the optical signals of the first and second wavelength regions by the wavelength division demultiplexer 141, and only the optical signal of the second wavelength region is input to the input terminal 121 of the optical conversion unit 290 and is divided to at least arbitrary one of the output terminals 131, 132, . . . 13N. Assume that an optical signal from the input terminal 121 is divided to the output terminals 131 and 133. A control signal representing this is sent on the FDDI, and the control signal analysis unit in the conversion unit analyzes this signal, and switches 4111 and 4113 in the optical switch group 411 in the conversion unit are turned to connect the input terminal 121 to the output terminals 131 and 133, thereby dividing the signal to the output terminals 131 and 133. The optical signal output from the output terminal 131 is multiplexed with the optical signal of the first wavelength region by the wavelength division multiplexer 151, and the multiplexed signal is output from the output port 171 to the downstream optical fiber 221. This signal is then input to the node 231. In the node 231, the optical signal of the second wavelength region is demultiplexed from the optical signal of the first wavelength region by the wavelength division demultiplexer 34. Only the optical signal of the second wavelength region is input to a variable wavelength filter 39. The variable wavelength filter 39 sets the transmission wavelength to the wavelength of the optical signal sent from the node 231, and an optical receiver 38 receives the signal of the transmission wavelength. The optical signal divided to the output terminal 133 of the optical conversion unit 290 can also be received by the node 233. When a request for transmission from a plurality of nodes to the node 233 is sent during the above communication, these nodes output optical wavelength signals having wavelengths different from the communication wavelength in the second wavelength region. The concentrator controls the switches so that these signals can be connected to the node 233. The node 233 causes the variable wavelength filter 39 to select a target wavelength signal and can receive the signal without causing radio interference. In this manner, the optical signal of the second wavelength region can be divided to an arbitrary port of the concentrator, thereby performing transmission in the circuit switching or exchange optical communication form. Wavelength multiplexing can be performed in the second wavelength region, and a large number of high-speed signals can be simultaneously transmitted. A control signal representing such information can be formed by causing each node to access the FDDI.

Communication performed by connecting a plurality of concentrators of this embodiment will be described with reference to FIG. 21. A plurality of nodes or concentrators are connected to constitute a radial (star) network. Assume that communication is performed from the node 5006 to the node 5003. When the optical signal of the first wavelength region is used, it is sequentially supplied in a loop circuit of 5006→5013→5011→5012→5001→5012→5002→5012→

5003. When the optical signal of the second wavelength region is used, it is supplied in the route of 5006→5013→5011→5012→5003. In this case, the concentrator 5013 connects the optical signal from the node 5006 in the direction of the node 5011. The concentrator 5012 connects the optical signal in the direction of the node 503, and the concentrator 5012 connects the signal in the direction of the node 5003, so optical signals are set not to be supplied to other nodes. Control signals of this control are transmitted on the FDDI. Communication from other nodes can be performed in the same manner as described above.

As described above, nodes are connected to the concentrator of this embodiment using upstream and downstream common optical fibers to constitute a wavelength-multiplexed optical communication network in which the loop type optical communication system and the circuit switching type optical communication system are integrated.

According to this embodiment, the node has loop and circuit switching type optical transmitter and receiver. However, the network can be operated even if the node does not have one or both of the circuit switching optical transmitter and receiver. The variable wavelength light source and the variable wavelength filter are used as the light source of the second wavelength region and the filter. However, a plurality of fixed wavelength light sources and a plurality of fixed filters in the second wavelength region can be used.

Figure 22:
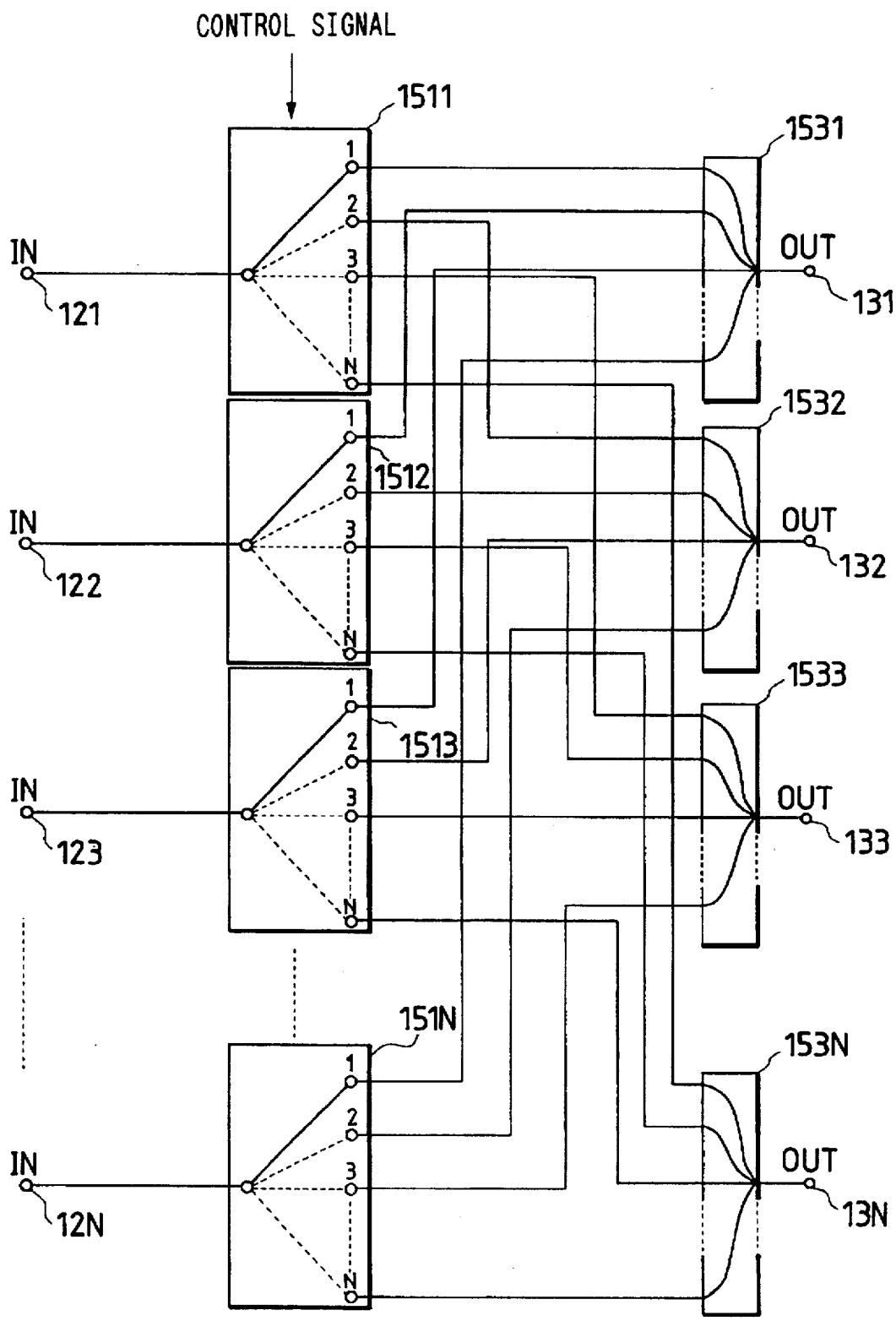
FIG. 22 is a block diagram showing another arrangement of the optical exchanges.

The first modification of the eleventh embodiment will be described with reference to FIG. 22. This modification has an arrangement in which the optical conversion unit in the concentrator has an arrangement shown in FIG. 22, and the remaining portion of this modification is the same as that of the eleventh embodiment. In the eleventh embodiment, the optical conversion unit can divide an input optical signal to a plurality of arbitrary output ports. However, in this modification, the optical conversion unit has an arrangement in which an input optical signal is supplied to one arbitrary output port.

The arrangement of the optical conversion unit of this modification will be described below. Referring. to FIG. 22, the optical conversion unit 290 has the input terminals 121, 122, . . . 12N and output terminals 131, 132, . . . 13N. 1×N optical switches 1511, 1512, . . . 151N connect optical signals from the input terminals to the arbitrary output ports. Star couplers 1531, 1532, . . . 153N couple the optical signals from the 1×N optical switches. The first output from each optical switch is input to the input port of the star coupler 1531, the second output from each optical switch is input to the star coupler 1532, and the N-th output from each optical switch is input to the input port of the star coupler 153N.

The operation of the concentrator of this modification will be described below. The optical signal of the first wavelength region is operated in the same manner as in the eleventh embodiment, and a detailed description thereof will be omitted. For example, the optical signal of the second wavelength region is input from the input port 161 of the first port, it is demultiplexed from the optical signal of the first wavelength region by the wavelength division demultiplexer 141, and only the optical signal of the second wavelength region is input to the input terminal 121 of the optical conversion unit 290 and divided to arbitrary output terminals 131, 132, . . . 13N. Assume that an optical signal is to be sent from the input terminal 121 to the output terminal 133. When the optical switch 1511 is connected to the output port of the third port, the optical signal is supplied to the output terminal 133 through the star coupler 1533. The optical signal output from the terminal 133 is multiplexed with the optical signal of the first wavelength region by the wavelength division multiplexer 153 and is output from the output port 173. An optical signal input from another port is similarly supplied to one arbitrary output port. In this modification as in the eleventh embodiment, signals input from different input ports can be connected to the corresponding output ports. In this case, nodes connected to these input ports output optical wavelength signals having different wavelengths in the second wavelength region, and a target wavelength signal is selected by the variable wavelength filter from the wavelength-multiplexed optical signal at the reception node.

Figure 23:
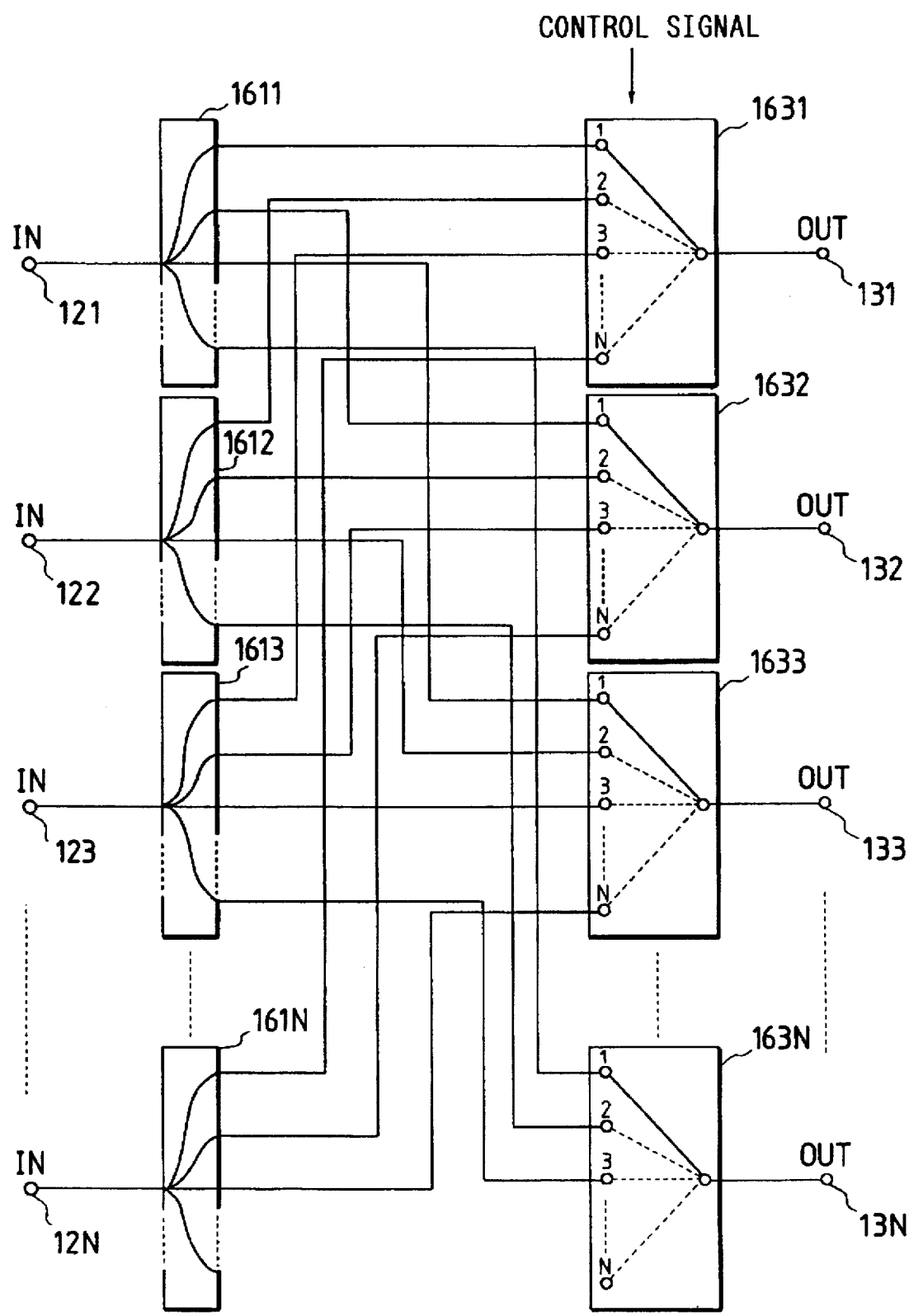
FIG. 23 is a block diagram showing still another arrangement of the optical exchanger.

The second modification of the eleventh embodiment according to the present invention will be described below. This modification has an arrangement in which the optical conversion unit in the concentrator has an arrangement shown in FIG. 23, and the remaining portion of this modification is the same as that of the eleventh embodiment. In this modification, an optical conversion unit for connecting an input port to at least one arbitrary output port and an output port to one input port is used.

The arrangement of the optical conversion unit of this modification will be described below. The optical conversion unit 290 has the input terminals 121, 122, . . . 12N and output terminals 131, 132, . . . 13N. Star couplers 1611, 1612, . . . 161N divide optical signals from the input terminals in the N direction. Each of N×1 optical switches 1631, 1632, . . . 163N selects one of the N input signals and connects it to an output port. The first output from each star coupler is input to the input port of the N×1 optical switch 631, the second output from each star coupler is input to the N×1 optical switch 1632, and the N-th output from each star coupler is input to the input port of the N×1 optical switch 63N. The operation of the concentrator of this modification will be described below. The optical signal of the first wavelength region is operated in the same manner as in the eleventh embodiment, and a detailed description thereof will be omitted. For example, when the optical signal of the second wavelength region is input from the input port 161 of the first port, it is demultiplexed from the optical signal of the first wavelength region by the wavelength division demultiplexer 141, and only the optical signal of the second wavelength region is input to the input terminal 121 of the optical conversion unit 11 and divided to arbitrary ones of output terminals 131, 132, . . . 13N. Assume that an optical signal is divided from the input terminal 121 to the output terminals 131 and 133. When the optical switches 1631 and 1633 are connected to the input port of the first port, the optical signal passes through the star coupler 1611 and is divided to the output terminals 131 and 133. The optical signal output from the output terminal 131 is multiplexed with the optical signal of the first wavelength region by the wavelength division multiplexer 151 and is output from the output port 171. The optical signal output from the output terminal 133 is similarly output from the output port 173. An optical signal input from another port is similarly connected to at least one arbitrary output port. In this modification, signals input from different input ports cannot be connected to the corresponding ports.

Figure 24:
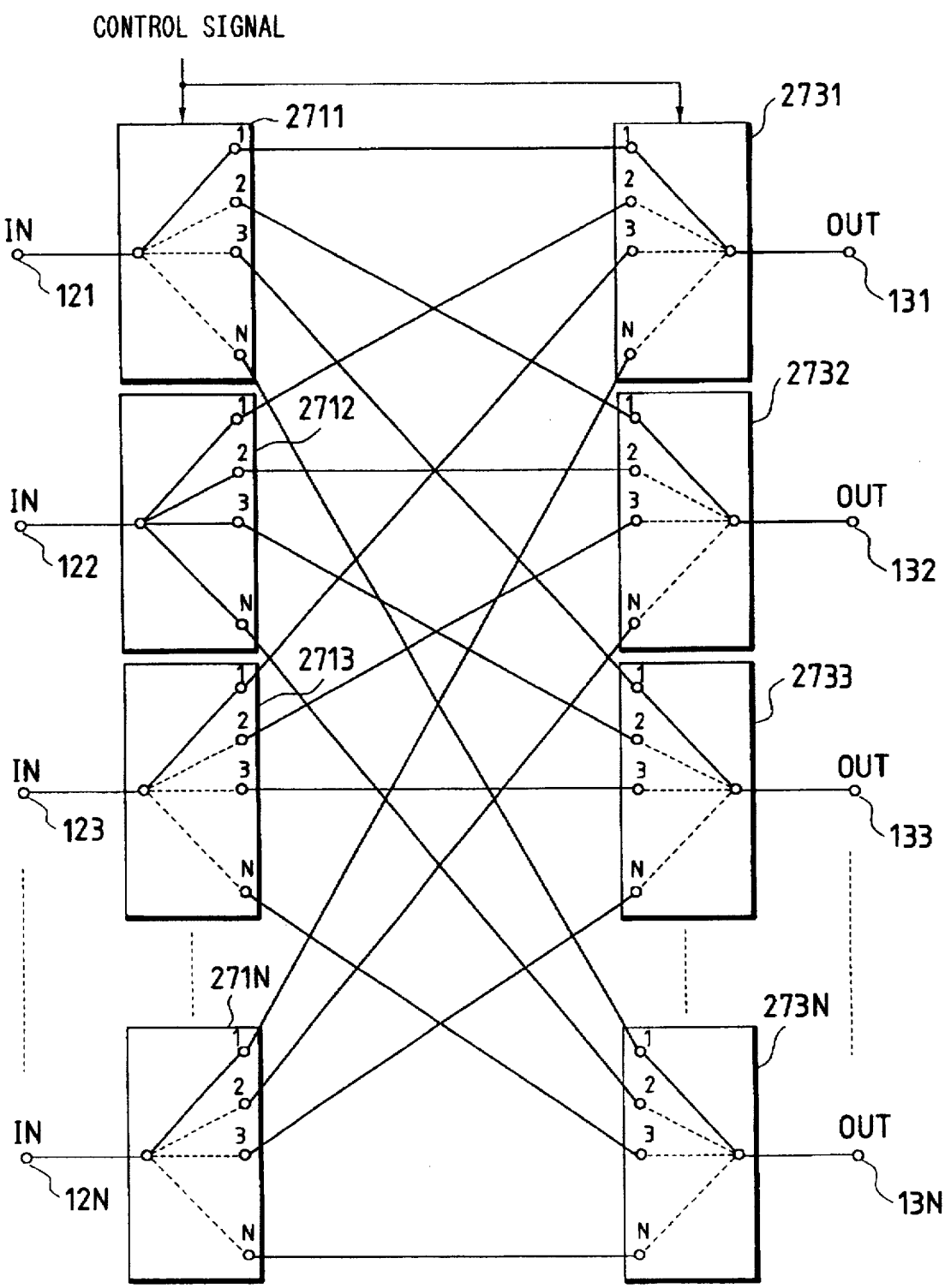
FIG. 24 is a block diagram showing still another arrangement of the optical exchanger.

The third modification of the eleventh embodiment according to the present invention will be described with reference to FIG. 24. This modification has an arrangement in which the optical conversion unit in the concentrator has an arrangement shown in FIG. 24, and the remaining portion of this modification is the same as that of the eleventh embodiment. In this modification, an optical conversion unit for connecting the input and output terminals in a one-to-one correspondence is used.

The arrangement of the optical conversion unit of this modification will be described below. Referring to FIG. 24, the optical conversion unit 290 has the input terminals 121, 122, ... 12N and output terminals 131, 132, ... 13N. 1×N optical switches 2711, 2712, ... 271N connect optical signals from the input terminals to the arbitrary output ports. N×1 optical switches 2731, 2732, ... 273N connect the above optical switches to the output terminals. The first output from each 1×N optical switch is input to the input terminal of the N×1 optical switch 2731, the second output from each 1×N optical switch is input to the input terminal of the N×1 optical switch 2732, and the N-th output from each 1×N optical switch is input to the input terminal of the N×1 optical switch 273N.

The operation of the concentrator of this modification will be described below. The optical signal of the first wavelength region is operated in the same manner as in the eleventh embodiment, and a detailed description thereof will be omitted. For example, the optical signal of the second wavelength region is input from the input port 161 of the first port, it is demultiplexed from the optical signal of the first wavelength region by the wavelength division demultiplexer 141, and only the optical signal of the second wavelength region is input to the input terminal 121 of the optical conversion unit 290 and divided to arbitrary ones of output terminals 131, 132, ... 13N. Assume that an optical signal is to be sent from the input terminal 121 to the output terminal 133. The optical switch 2711 is connected to the output port of the third port, and the optical switch 2733 is connected to the input port of the first port. The optical signal output from the output terminal 133 is multiplexed with the optical signal of the first wavelength region by the wavelength division multiplexer 153 and output from the output port 173. An optical signal input from another port is similarly connected to one arbitrary output port. In this modification, signals input from different input ports cannot be connected to the corresponding output ports. Therefore, communication can be performed without any radio interference.

The concentrators of the first to third modifications can be suitably used in the optical communication networks shown in FIGS. 6 and 21 as in the eleventh embodiment. At this time, the node shown in FIG. 7 can be used as a node of each of these modifications.

Figure 25:
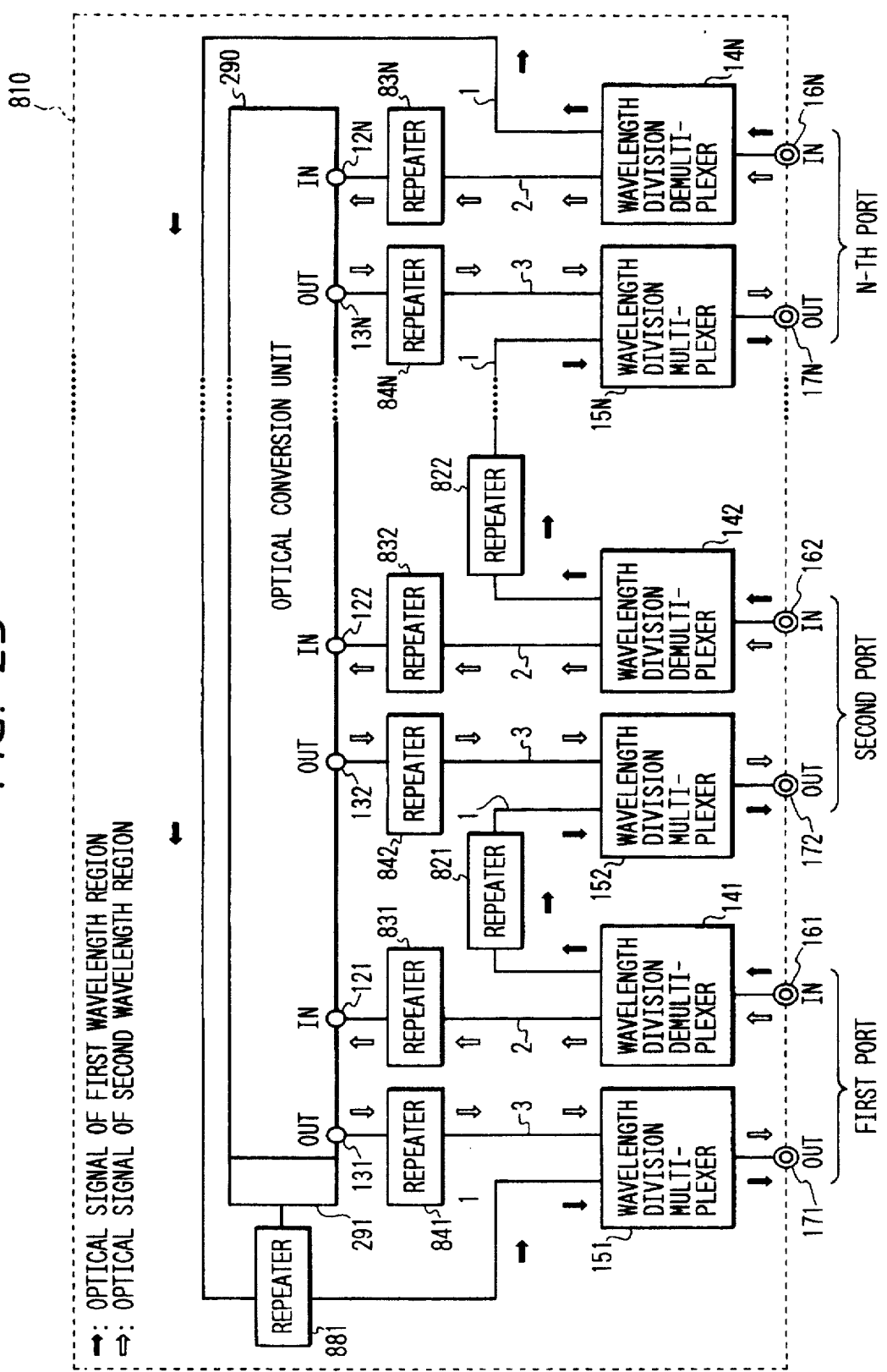
FIG. 25 is a block diagram showing the twelfth embodiment of an optical concentrator according to the present invention.

The twelfth embodiment of the present invention will be described with reference to FIG. 25. FIG. 25 shows the arrangement of the twelfth embodiment of a concentrator according to the present invention. The basic arrangement of a concentrator 810 is substantially the same as that of the concentrator 10 of the eleventh embodiment shown in FIG. 19, and the same reference numerals as in the eleventh embodiment denote the same parts in the twelfth embodiment. The twelfth embodiment is different from the eleventh embodiment in that first repeaters 821, 822, ... 82N for repeating and amplifying optical signals of a first wavelength region are arranged between the output terminals of the first wavelength region of wavelength division demultiplexers of the respective ports and the input terminals of the first wavelength region of wavelength division multiplexers of the next ports (e.g., 152 for 141 and 151 for 14N), and that second repeaters 831, 832, ... 83N for repeating and amplifying optical signals of a second wavelength region are arranged between input terminals 121, 122, ... 12N of an optical conversion unit 290 and the output terminals of the second wavelength region of wavelength division demultiplexers 141, 142, ... 14N connected to the input terminals 121, 122, ... 12N, that third repeaters 841, 842, ... 84N for repeating and amplifying the optical signals of the second wavelength region are arranged between output terminals 131, 132, ... 13N of the optical conversion unit 290 and the input terminals of the second wavelength region of wavelength division multiplexers 151, 152, ... 153 connected to the output terminals 131, 132, ... 13N, and that a repeater 881 having the same function as that of the repeater 181 of the first embodiment is arranged. The first, second, and third repeaters are preferably constituted by optical amplifiers for directly amplifying and repeating optical signals. In particular, optical signals are wavelength-multiplexed in the wavelength regions, it is preferable to use the optical amplifier as the repeater. However, when optical signals are not wavelength-multiplexed in the predetermined wavelength regions, electrical regenerative repeaters for temporarily converting signals into electrical signals and converting the electrical signals into optical signals again can be used.

Of the operations of the concentrator 810 of this embodiment, only points different from the eleventh embodiment will be described below. The optical losses of the optical signals of the first wavelength region input to the input ports of the concentrator 810, which are caused by the wavelength division demultiplexers and the wavelength division multiplexers, can be compensated due to the presence of the first repeaters. The intensity of an optical signal input to the optical receiver of the first wavelength region of the node connected to the network can be increased. The optical losses of the optical signals of the second wavelength region input to the input ports of the concentrator 810, which are caused by the wavelength division demultiplexers, the wavelength division multiplexers, and the optical conversion unit 290, can be compensated due to the presence of the second and third repeaters. The intensity of an optical signal input to the optical receiver of the second wavelength region of the node connected to the network can be increased. In particular, this arrangement is effective when the number of input/output terminals of the optical conversion unit 290 is increased because this increase causes an increase in optical loss.

Assume that the intensity of the optical signal output from the optical transmitter is sufficiently high, that the reception sensitivity of the optical receiver is sufficiently high, and that the optical losses of the wavelength division demultiplexers, the wavelength division multiplexers, and the optical conversion unit are sufficiently small. In this case, all the first, second, and third repeaters need not be arranged, and some of them can be omitted. In addition, the repeaters need not be arranged at all the ports, and some of them may be omitted, as needed.

The concentrator 810 of this embodiment can be suitably used in the optical communication network shown in FIG. 6, thereby providing a wavelength-multiplexed optical communication network having a sufficiently large margin of the intensities of optical signals.

Figure 26:
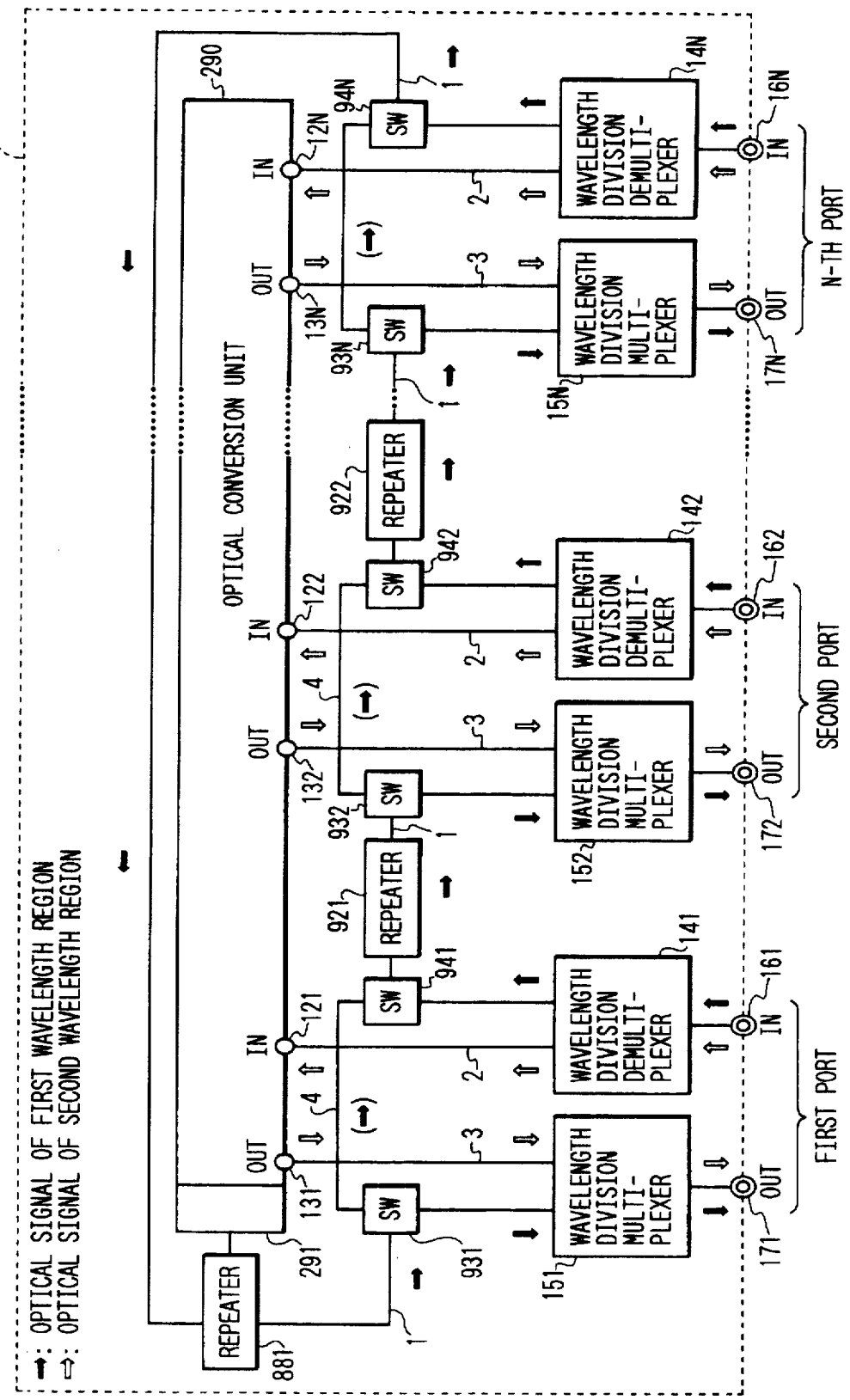
FIG. 26 is a block diagram showing the thirteenth embodiment of an optical concentrator according to the present invention.

The thirteenth embodiment of the present invention will be described with reference to FIG. 26. FIG. 26 shows the arrangement of the thirteenth embodiment of a concentrator according to the present invention.

The basic arrangement of a concentrator 910 of this embodiment is substantially the same as that of the concentrator 10 of the eleventh embodiment shown in FIG. 19, and the same reference numerals as in the eleventh embodiment denote the same parts in the thirteenth embodiment. The thirteenth embodiment is different from the eleventh embodiment in that a countermeasure means is arranged in the concentrator when optical signals of a first wavelength region output from output ports of the concentrator are not input to the concentrator from input ports which constitute pairs with the output ports due to the failure of a node connected to the input/output port and disconnections of optical fibers for connecting the concentrator and the nodes, or when signal degradation occurs even if the signals are input to the input ports. The arrangement of the concentrator having a failure countermeasure means of this loop type optical communication is shown in FIG. 26. More specifically, when a failure has occurred, an optical signal of the first wavelength region is not supplied to this port. For this purpose, first optical switches 931, 932, . . . 93N are connected to the input terminals of the first wavelength region of wavelength division multiplexers of the respective ports, and second optical switches 941, 942, . . . 94N and repeaters 921, 922, . . . 92N for repeating and amplifying the optical signals of the first wavelength region are connected to the output terminals of the first wavelength region of wavelength division demultiplexers. The first switches and the second optical switches 941, 942, . . . 94N are connected to each other when a failure has occurred. The repeaters are arranged for compensation of losses of the optical signals and are constituted by optical amplifiers or electrical regenerative repeaters. If optical losses do not pose any problem, the repeaters may be omitted. The repeaters may be arranged between the first optical switches and the second optical switches.

Of the operations of the concentrator 910 of this embodiment, points different from the eleventh embodiment will be described. Assume that a failure does not have occurred. For example, an optical signal of the first wavelength region input from the input port 161 to the concentrator 910 is output from the wavelength division demultiplexer 141, passes through the second optical switch 941, is amplified by the repeater 921, input to the wavelength division multiplexer 152 through the first optical switch 932, and then output from the output port 172. This signal is received by the node connected to the output port 172 and the input port 162. After the signal is properly processed, the signal is output as an optical signal of the first wavelength region. This signal is then input from the input port 162 to the concentrator 910. The optical signal of the first wavelength region is output from the wavelength division demultiplexer 142, passes through the second optical switch 942, and is then input to the repeater 922. Optical signals of the first wavelength region from the remaining ports are similarly transmitted. For example, assume that a failure has occurred in the node connected to the output port 172 and the input port 162 or disconnections have occurred in optical fibers, so the optical signal of the first wavelength region is not input to the input port 162. In this case, the first optical switch 932 and the second optical switch 942 are operated to be directly connected to each other. The optical signal of the first wavelength region input to the first optical switch 942 is directly output from the second optical switch 942 and is then input to the repeater 922. In this manner, the interruption of the optical signal upon occurrence of the failure can be prevented. This also applies to the remaining ports.

This embodiment exemplifies one failure countermeasure means. Any other arrangement may be employed if the optical signal of the first wavelength region input from the input port of a port immediately preceding the failed port is output to the output port of a port succeeding the failed port.

If the means for preventing interruption of the optical signal of the first wavelength region is arranged outside the concentrator or a node or optical fiber whose reliability is assured is connected to the network, the port failure countermeasure means may be omitted.

Although a failure detecting means is not illustrated in FIG. 26, a means for monitoring the optical signal and detecting the failure may be arranged on the passing route of the optical signal of the first wavelength region input from the input port may be arranged, as needed.

Figure 27A:
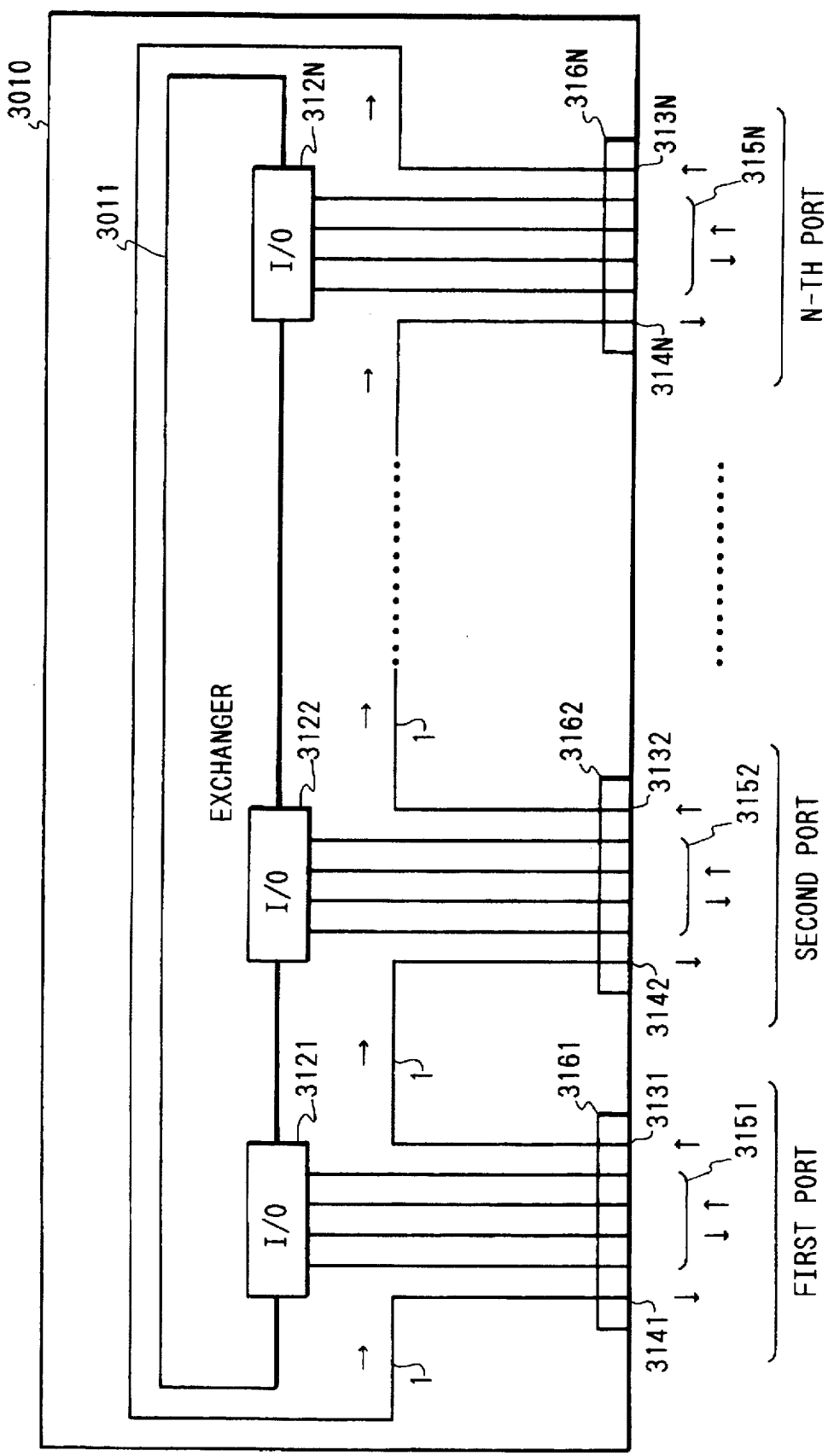
FIG. 27A is a block diagram showing the fourteenth embodiment of an optical concentrator according to the present invention.
Figure 27B:
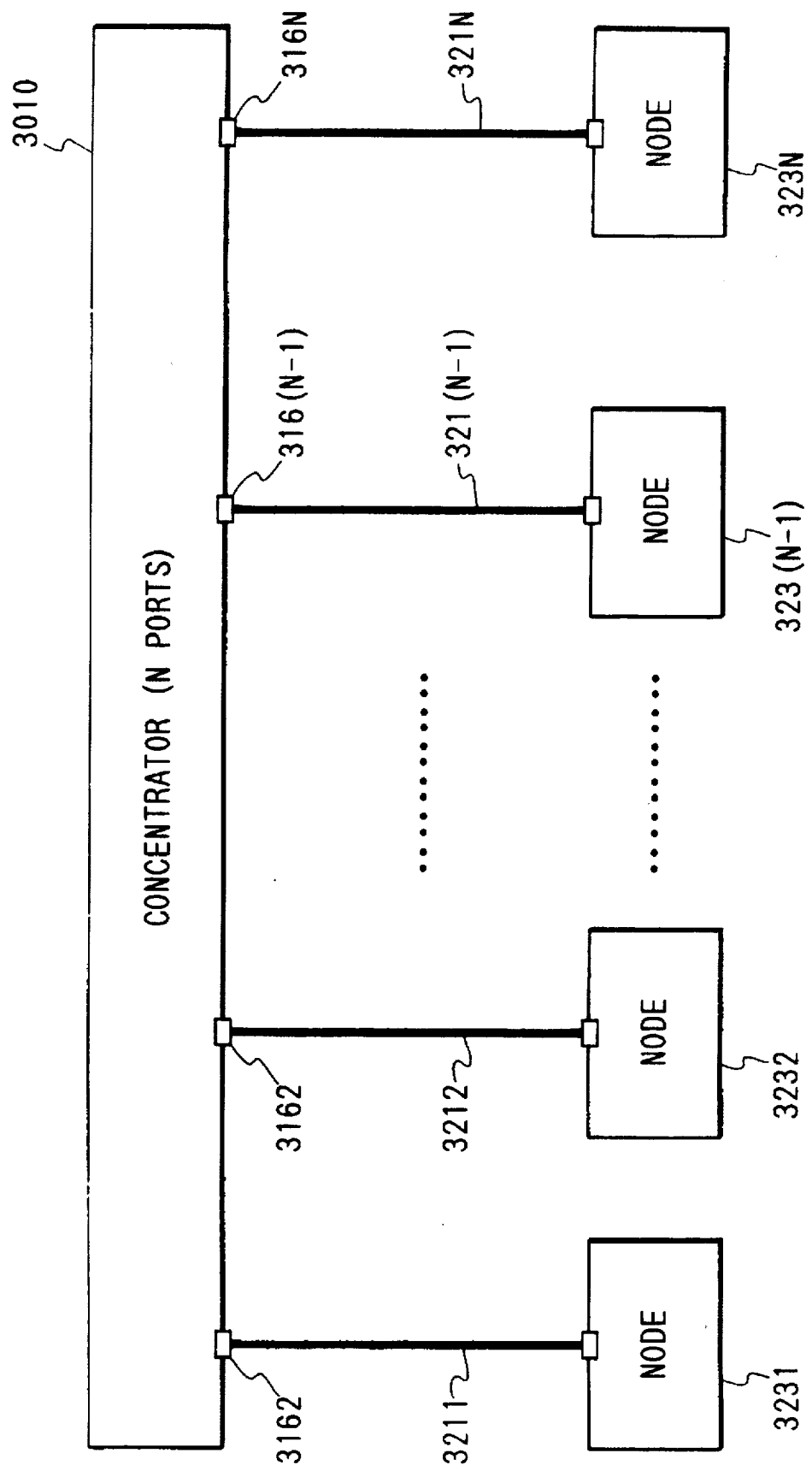
FIG. 27B is a block diagram showing the fifth embodiment of an optical communication network using the optical concentrator shown in FIG. 27A.
Figure 28A:
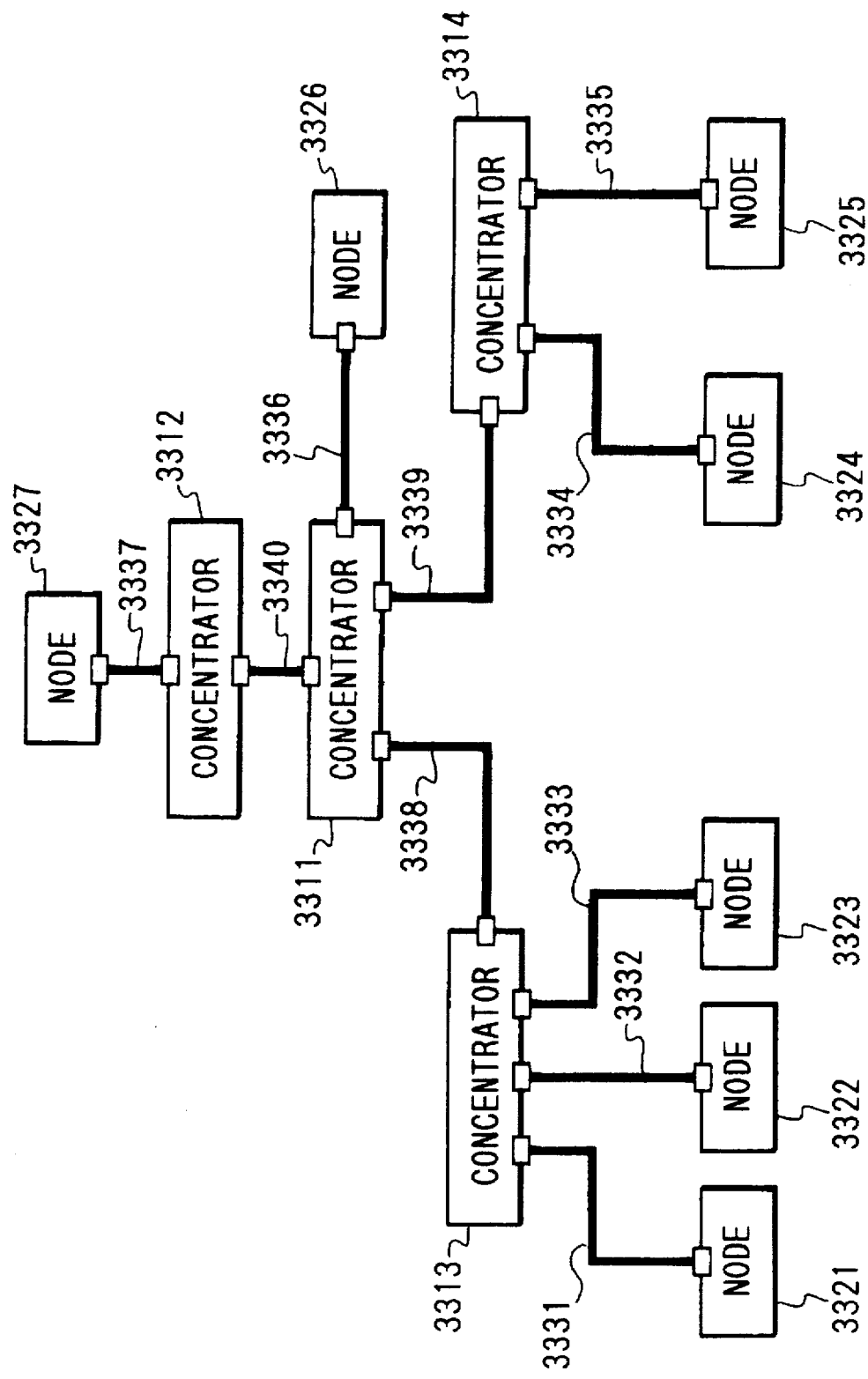
FIG. 28A is a block diagram showing the sixth embodiment of an optical communication network using the optical concentrator shown in FIG. 27A.
Figure 28B:
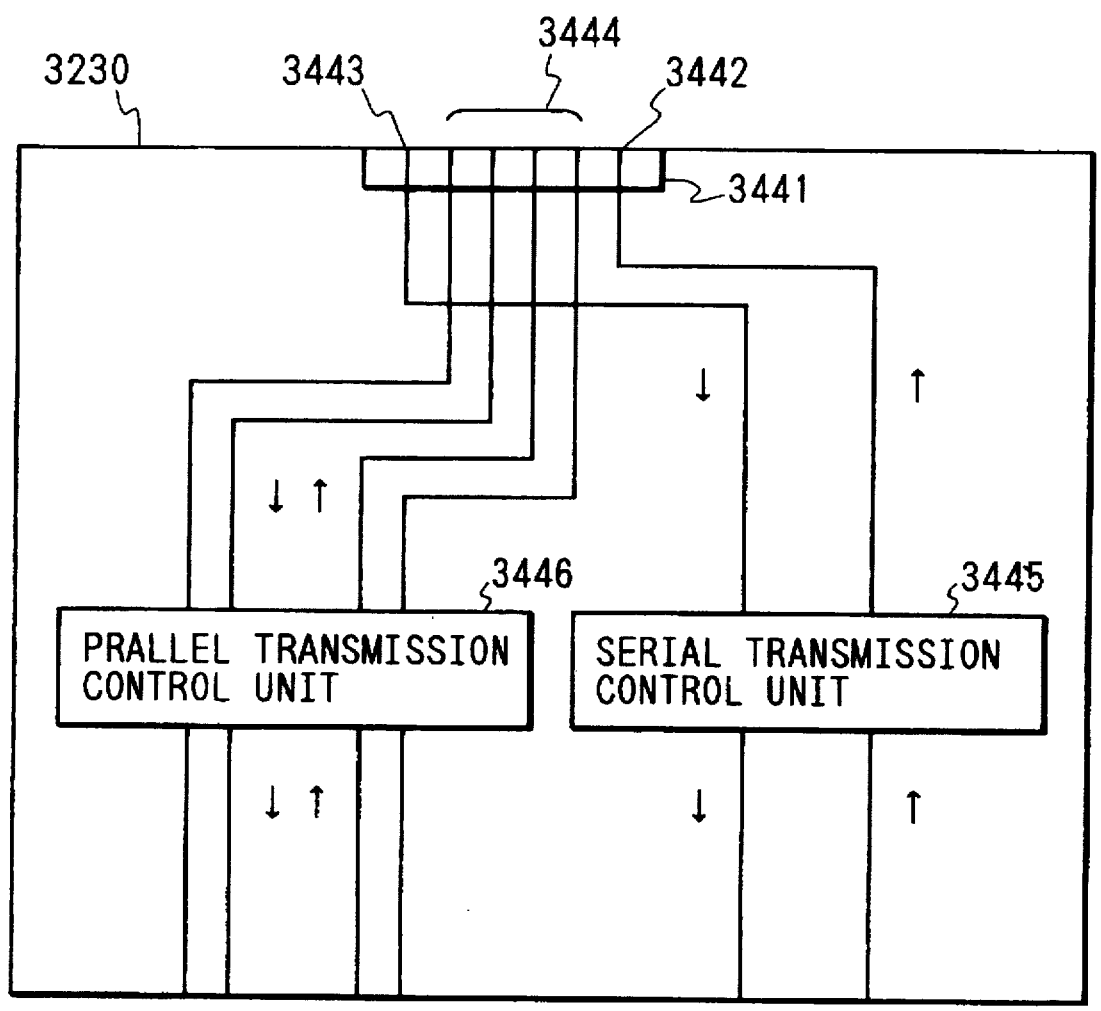
FIG. 28B is a block diagram showing another arrangement of an optical node used in the optical communication network according to the present invention.

FIGS. 27A, 27B, 28A, and 28B are views showing the fourteenth embodiment of the present invention. Embodiments from this embodiment exemplify arrangements in which concentrators according to the present invention are applied to spatial multiplex signal communication using a plurality of cables. FIG. 27A shows the fourteenth embodiment of the concentrator according to the present invention. FIGS. 27B and 28A show arrangements of communication networks each using this concentrator, and FIG. 28B shows the arrangement of a node suitably used in these communication networks. The arrangements of these components will be described with reference to FIGS. 27A to 28B.

Referring to FIG. 27A, an N×N exchanger 3011 has N input/output (I/O) terminals 3121, 3122, . . . 312N. Each input/output terminal is connected through m transmission channels (in this embodiment, four transmission lines are used). The exchanger 3011 is constituted by switches or star couplers and can connect an input signal to at least one arbitrary output terminal.

Input units 3131, 3132, . . . 313N constitute some (in this embodiment, one transmission channel) of input/output ports 3161, 3162, . . . 316N of a concentrator 3010 of this embodiment. Output units 3141, 3142, . . . 314N constitute some of input/output ports of the concentrator 3010. The input units are connected to the output units of next ones of ports arranged in a predetermined order. More specifically, as shown in FIG. 27A, the input unit 3131 of the first port 3161 is connected to the output unit 3142 of the second port 3162, and the input unit 3132 of the second port 3162 is connected to the output port 3143 (not shown in FIG. 27A) of the third port 3163. Similarly, the input unit 313N of the N-th port 316N is connected to the output unit 3141 of the first port 3131. Input/output units 3151, 3152, . . . 315N constitute the remaining input/output ports (in this embodiment, four transmission channels) and are connected to the input/output terminals of the exchanger 3011.

Referring to FIG. 27B, the concentrator 3010 has the arrangement described with reference to FIG. 27. The concentrator 3010 has N input/output ports. Transmission channels (each consisting of a plurality of lines) 3211, 3212, . . . . 321(N-1), and 321N transmit signals between nodes 3231, 3232, . . . 323(N-1), and 323N and the concentrator 3010. For example, the transmission channel 3211 has transmission channels 3131, 3141, and 3151 and is connected to the corresponding node and the input/output ports 3161, 3162, . . . 316(N-1), and 316N.

FIG. 28A is a view showing the arrangement of a communication network using the concentrators of this embodiment. The communication network has concentrators 3311, 3312, 3313, and 3314 of this embodiment, nodes 3321 to 3327, and transmission channels (each consisting of a plurality of lines) 3331 to 3340 for connecting the concentrators and the nodes.

Referring to FIG. 28B, the node 3230 has an input/output terminal 3441 which is connected to the corresponding input/output port of the concentrator 3010 through six transmission channels. Transmission channels 3442 and 3443 at the two ends of the input/output terminal 3441 are connected to a serial transmission control unit 3445 to exchange signals with a computer (not shown in FIG. 28B). Remaining four transmission channels 3444 of the transmission channel 3441 are connected to a parallel transmission control unit 3446 and the bus line of a computer (not shown). A signal transmission control means in the node is illustrated in FIG. 28, and other components are not illustrated.

The operations of the concentrator of this embodiment and the communication network using this concentrator will be described with reference to FIGS. 27A, 27B, 28A, and 28B. Assume that a signal is output from the node 3231 connected to the transmission channel 3211 to the input/output port 3161 of the concentrator 3010. Also assume that a computer is connected to the node and that the computer processes large-capacity real-time data (data to be exchanged with another node at high speed) and small-capacity non-real-time data. The small-capacity data from the computer is converted into serial data such as FDDI (Fiber Distributed Data Interface) data by the serial transmission control unit 3445. This serial data is output to the transmission channel 3211 through the output unit 3442 of the input/output terminal 3441. The signal transmitted through the transmission channel 3211 and input to the input unit 3131 of the first port 3161 of the concentrator 3010 is connected to the output unit 3142 of the second port 3162. This signal is then transmitted to the node 3232 through the transmission channel 3212. The contents of the signal input to the input unit 3443 of the input/output terminal 3441 in the node 3232 are analyzed by the serial transmission control unit 3445. Data for the node 3232 is sent to the computer, and the remaining data is output to the transmission channel 3212 through the output unit 3441. The signal output from the node 3232 is input to the input unit 3132 of the second port 3162 of the concentrator 3010 and then the output unit 3143 (not shown in FIG. 27A) of the third port 3163 as the next port. Similarly, this signal is sequentially supplied to a plurality of ports arranged in a predetermined order.

The above signal is sequentially transmitted to the nodes connected to the concentrator 3010 to form a loop-like transmission circuit, thereby performing loop type communication between the nodes.

On the other hand, the large-capacity real-time signal is connected to the parallel transmission control unit 3446. The parallel transmission control unit 3446 may have a certain communication protocol or may be directly connected to the bus line of the computer without such a control function. The circuit for the parallel transmission control unit 3446 is assured without depending on the traffic of the network and has a lower transmission rate by parallel transmission.

For example, an HIPPI can be used in this parallel transmission. The signal from the computer is converted into a parallel signal by the parallel transmission control unit 3446 in accordance with a simple protocol. The parallel signal is output to the transmission channel 3211 through the input/output unit 3444. The parallel signal transmitted through the transmission channel 3211 and input to the input/output unit 3151 of the first port 3161 of the concentrator 3010 is connected to the I/O port 3121 of the exchanger 3011 and divided to at least arbitrary one of the I/O ports 3122, 3123, . . . 312N.

Assume that a signal route is connected from the I/O port 3121 to the I/O ports 3122 and 3123. A signal from the I/O port 3122 passes through the input/output unit 3152 of the second port 3162 and is output to the transmission channel 3212. A signal from the I/O port 3123 passes through the input/output unit 3153 of the third port 3163 and is output to the transmission channel 3213. A signal transmitted through the transmission channel 3121 passes through the input/output unit 3444 of the node 3232 and is converted into a signal suitable for the computer interface by the parallel transmission control unit 3446. The resultant signal is then sent to the computer. Similarly, the signal having passed through the transmission line 3213 is sent to the computer connected to the node 3233. When this signal transmission from the node 3231 is completed, large-capacity signal transmission can be similarly performed from, e.g., the node 3232 to the node 3231 in accordance with procedures reverse to the above procedures. Therefore, if the parallel transmission control unit 3446 is directly connected to the bus line of the computer, the computer of each node is connected to the bus through the concentrator 3010, thereby providing a distributed environment such as direct access of the CPU of another node.

Communication performed when a plurality of concentrators of this embodiment are connected will be described with reference to FIG. 28B. A plurality of nodes or concentrators are connected to obtain a radial (star) network. Assume that communication is performed from a node 3325 to a node 3321. When a small-capacity signal is to be transmitted, it is sequentially supplied in a loop circuit route of 3325→3314→3311→3226→3311→3312→3327→ 3312→3311→3313→3321. When a large-capacity signal is to be transmitted, it is transmitted in the route of 3325→3314→3311→3313→3321. In this case, the concentrator 3314 connects the signal from 3325 in the direction of 3311, the concentrator 3311 connects the signal in the direction of 3313, and the concentrator 3313 connects the signal in the direction of 3321, thereby preventing signals from being supplied to other nodes. Communication from another node can be similarly performed.

As described above, when nodes are connected to the concentrators of this embodiment through a plurality of transmission channels, a communication network in which the loop type communication system and the circuit switching parallel transmission system are integrated can be obtained.

The exchanger of this embodiment can be controlled in the same manner as in the first embodiment, or such that a receiver is arranged in part of the parallel signal route, a control information portion is arranged in part of the parallel transmission signal, the control signal is read by the receiver, and the exchanger is controlled by the receiver.

In this embodiment, the node has both the serial transmission control unit and the parallel transmission control unit. However, the network can be operated even if the node does not have one or both of the serial and parallel transmission control units.

The parallel signal circuit is not limited to bidirectional transmission. Transmission and reception lines may be independently arranged. In addition, serial signals may be transmitted to part or all the parallel signal circuit.

The number of transmission channels of the parallel signal circuit and the loop type signal circuit may be arbitrarily selected.

Figure 29:
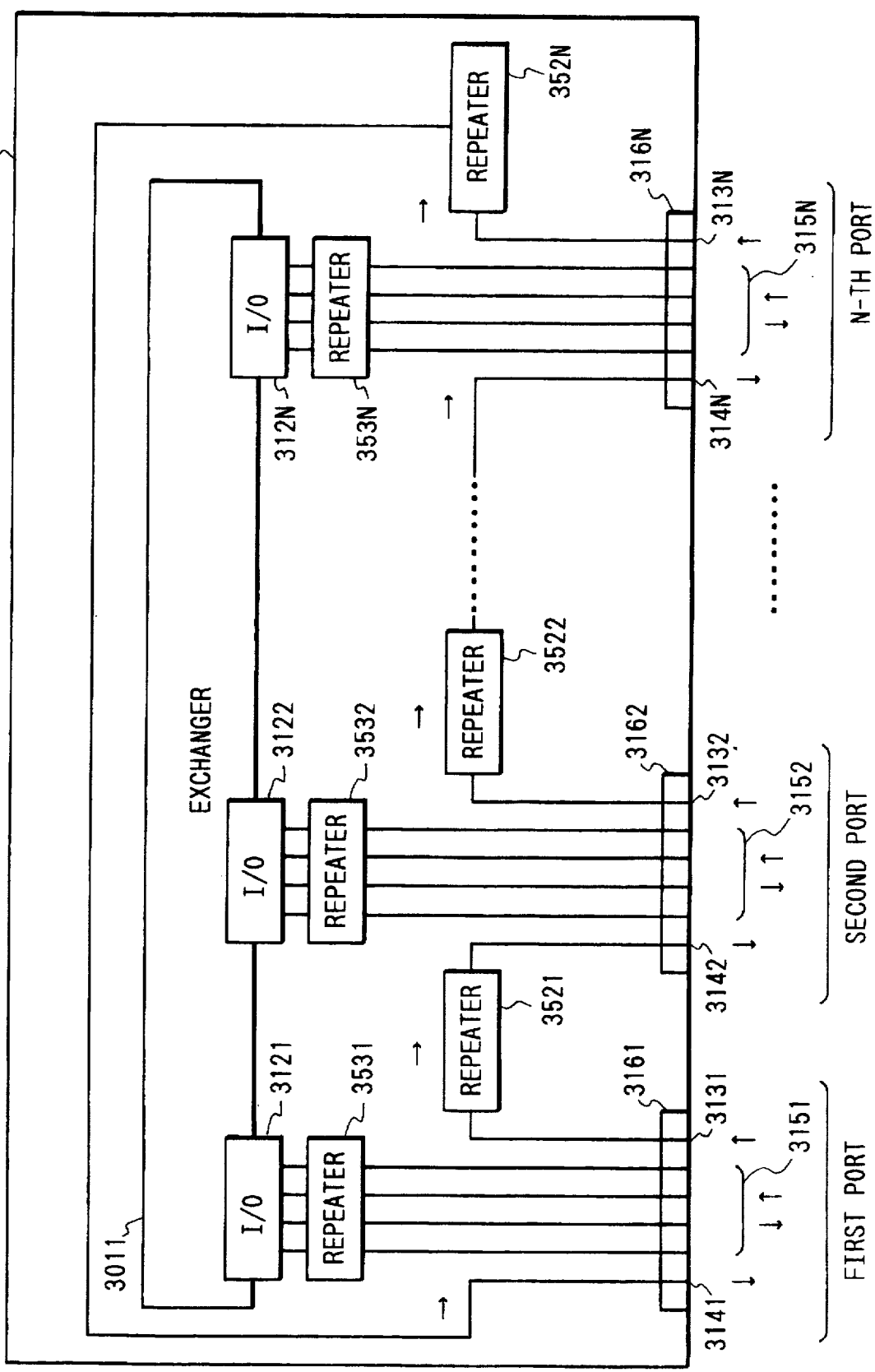
FIG. 29 is a block diagram showing the fifteenth embodiment of an optical concentrator according to the present invention.

The fifteenth embodiment of the present invention will be described with reference to FIG. 29. FIG. 29 shows the arrangement of the fifteenth embodiment of a concentrator according to the present invention.

The basic arrangement of a concentrator 3510 of this embodiment is substantially the same as that of the concentrator 3010 of the fourteenth embodiment shown in FIG. 27A, and the same reference numerals in the fourteenth embodiment denote the same parts in the fifteenth embodiment. The fifteenth embodiment is different from the fourteenth embodiment in that first repeaters 3521, 3522, ... 352N for repeating and amplifying signals are arranged between the input units of the respective ports and the output units of the next ports, and that second repeaters 3531, 3532, ... 353N for repeating and amplifying signals are arranged between input/output units 3151, 3152, ... 315N of the respective ports and I/O ports 3121, 3122, ... 312N of a switching unit 3011.

In this embodiment, when an optical signal is used as a transmission signal, optical amplifiers for directly amplifying and repeating optical signal are suitably used as the first and second repeaters. In particular, when the optical amplifier is used as the second repeater, the second repeater can serve as a bidirectional repeater of a parallel signal line because the optical amplifier has a function of bidirectionally amplifying the signal. If optical signals on a loop transmission channel are a plurality of wavelength-multiplexed signals, all the wavelength-multiplexed signals can be amplified by one optical amplifier under the condition that the optical amplifier is used as the first repeater. Note that if the transmission signal is an electrical signal or even an optical signal, an electrical regenerative repeater can be used.

Of the operations of the concentrator 3510 of this embodiment, only points different from the fourteenth embodiment will be described below. Since the repeaters are arranged, losses of the signals input/output to the input ports of the concentrator 3510, which are caused by the transmission lines and the switching unit, can be compensated for. The intensity of a signal input to a node connected to the concentrator can be increased. In particular, when the number of input/output terminals of the switching unit is increased, the effect can be enhanced because the signal losses are increased. If the intensity of a signal output from a node is sufficiently high and the reception sensitivity of a reception apparatus is sufficiently high, and if the loss in the switching unit is sufficiently small, all the first and second repeaters need not be arranged, but some of them can be omitted. If the intensity of a signal is excessively high, a repeater for attenuating and limiting the signal intensity may be used. The above repeaters need not be arranged at all the ports. Some of the repeaters may be omitted, as needed.

The concentrator 3510 of this embodiment can be suitably used in the communication networks in FIGS. 27B and 28A, thereby providing a communication network having a sufficiently large margin of signal intensities.

Figure 30:
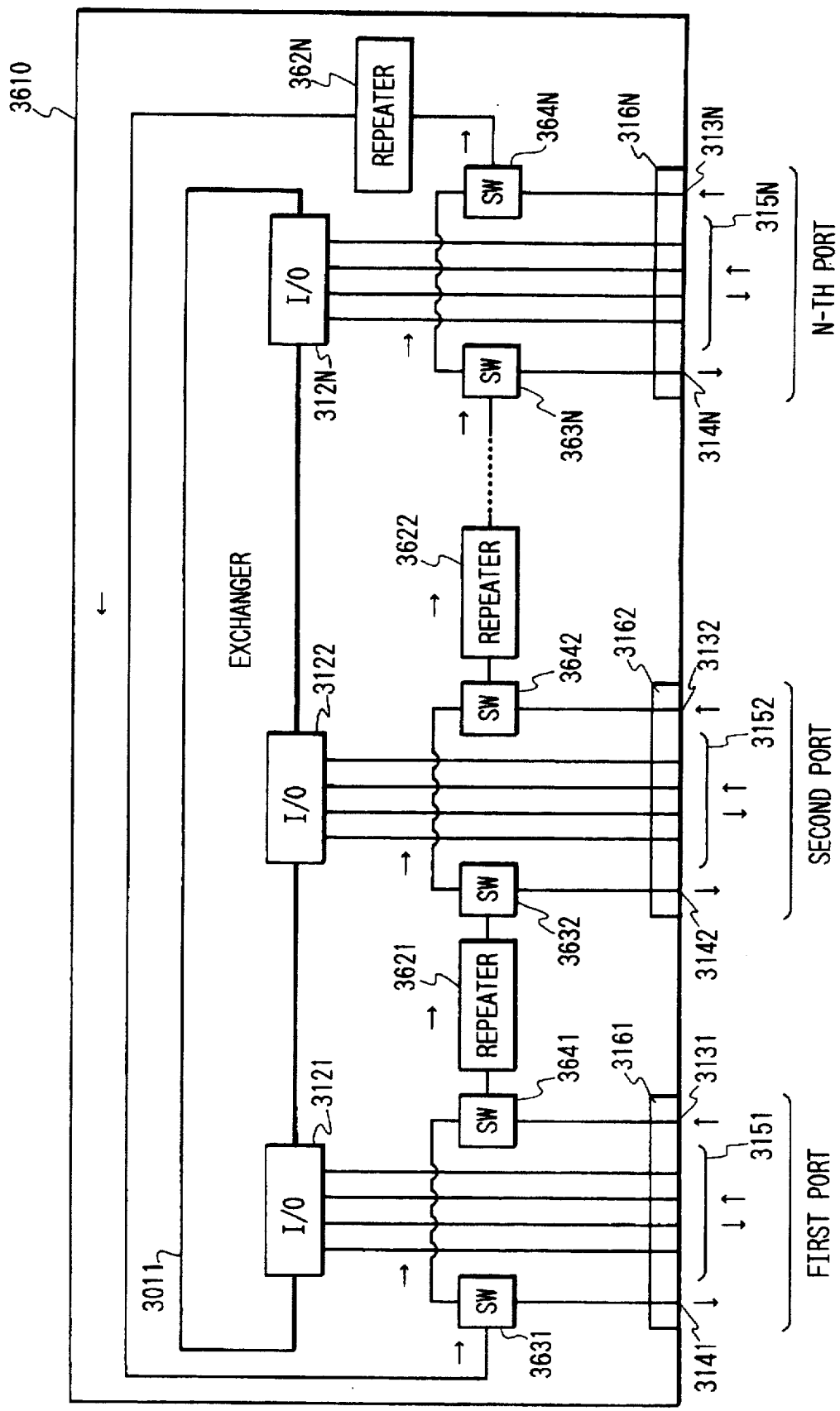
FIG. 30 is a block diagram showing the sixteenth embodiment of an optical concentrator according to the present invention.

The sixteenth embodiment of the present invention will be described with reference to FIG. 30. FIG. 30 shows the arrangement of the sixteenth embodiment of a concentrator according to the present invention.

The basic arrangement of a concentrator 3610 of this embodiment is substantially the same as that of the concentrator 3010 of the fourteenth embodiment shown in FIG. 27A, and the same reference numerals as in the fourteenth embodiment denote the same parts in the sixteenth embodiment. The sixteenth embodiment is different from the fourteenth embodiment in that a countermeasure means is arranged in the concentrator when optical signals of a first wavelength region output from output units of the concentrator are not input to the concentrator from input units which constitute pairs with the output units due to the failure of a node connected to the input/output unit and disconnections of transmission channels for connecting the concentrator and the nodes, or when signal degradation occurs even if the signals are input to the input units. The arrangement of the concentrator having this failure countermeasure means is shown in FIG. 30. More specifically, when a failure has occurred, a signal is not supplied to this port. For this purpose, first optical switches 3631, 3632, ... 363N are connected to the output units of the respective ports, and second optical switches 3641, 3642, ... 364N and repeaters/amplifiers 3621, 3622, ... 362N of the next ports are connected to the input units. The first switches and the second optical switches are directly connected to each other when a failure has occurred. The repeaters are arranged for compensation of losses of the optical signals and are constituted by optical amplifiers or electrical regenerative repeaters. If optical losses do not pose any problem, the repeaters may be omitted.

Of the operations of the concentrator 3610 of this embodiment, points different from the fourteenth embodiment will be described. Assume that a failure does not have occurred. For example, a signal input from an input unit 3131 of a first port 3161 to the concentrator 3610 passes through the second switch 3641, amplified by the repeater 3621, and output from the output unit 3142 of the second port 3162 through the first switch 3632. The signal is received by the node 3232 connected to the second port 3162 through a transmission channel 3212 and is properly processed. The processed signal is input from an input unit 3121 of a second port 3162 to the concentrator 3610 through the transmission channel 3212. This signal passes through the second switch 3642 and input to the repeater 3622. Signals for other ports can be similarly transmitted. For example, if the signal is not input to an input unit 3132 of the second port 3162 due to a failure in a node 3232 connected to the second port 3162 and the disconnection of the connected transmission channel 3212, the first and second switches 3632 and 3642 are operated to be directly connected to each other. The signal input from the repeater 3621 to the first switch 3632 is directly output from the second switch 3642 and input to the repeater 3622. In this manner, signal interruption upon occurrence of the failure can be prevented. Signal interruption upon occurrence of failures can be prevented for other ports in the same manner as described above.

This embodiment exemplifies one failure countermeasure means. However, any other arrangement may be employed if a signal input from the input unit of the port immediately preceding the failed port can be sent to the output unit of the port succeeding the failed port.

If the means for preventing interruption of the optical signal of the first wavelength region is arranged outside the concentrator or a node or transmission channel whose reliability is assured is connected to the network, the port failure countermeasure means may be omitted.

Although a failure detecting means is not illustrated in FIG. 30, a means for monitoring the optical signal and detecting the failure may be arranged on the passing route of the above optical signal input from the input unit may be arranged, as needed.

In each of the eleventh to sixteenth embodiments, a wavelength division demultiplexer and a wavelength division multiplexer are exemplified as single elements. However, the wavelength division demultiplexer or wavelength division multiplexer may be arranged as a combination of a plurality of constituent elements. For example, a wavelength division demultiplexer can be arranged as a combination of an optical coupler and an optical wavelength filter.

An optical signal in the wavelength region for performing loop type optical communication in each of the eleventh to sixteenth embodiments is not limited to one wavelength signal. That is, like a multiplexed signal for performing circuit switching type communication as in the eleventh to sixteenth embodiments, the concentrator of the present invention can be used for a plurality of wavelength signals wavelength-multiplexed in the wavelength region for performing loop type communication. Similarly, in spatial multiplexing, if an electrical signal is used, frequency multiplexing may be performed. If optical communication is performed, wavelength multiplexing in a predetermined wavelength region can be performed. In this case, a means for outputting a signal multiplexed in a channel for performing loop type communication and a means for receiving and demultiplexing the signal and selecting a desired wavelength signal may be arranged in a node connected to the concentrator.

In switch control in the exchanger of each of the eleventh to sixteenth embodiments, a control signal is sent on a loop circuit, and a signal extracted from the loop circuit is supplied to and read by the exchanger. However, the loop circuit may be connected to the exchanger, and the signal may be read by the exchanger. The loop circuits may be multiplexed, and one of the channels of the multiplexed loop circuit may be assigned to a control signal. A receiver may be arranged in part of the route of the circuit switching signal, a control signal may be sent from a node connected to the concentrator, the control signal may be received by the receiver, and the control signal may be supplied from the receiver to the exchanger. Alternatively, a control information portion may be arranged in part of a transmission signal, the control information may be read by a receiver in the same manner as described above, and the exchanger may be controlled by the receiver. Another method of controlling the exchanger is to directly supply a control signal from the outside of the concentrator to the exchanger.

In each of the eleventh to sixteenth embodiments, the FDDI is used as the loop type communication system. However, a concentrator according to the present invention can be effectively used even if another loop type communication system such as a token ring or a time division multiplex communication system is used. In addition, a plurality of circuits for loop type communication may be arranged and multiplexed, and a plurality of loop type circuits may be obtained by a combination of the FDDI, the token ring, the time division multiplex communication, and the like.

When a wavelength-multiplexed optical communication network is arranged using each concentrator described with reference to each of the eleventh to sixteenth embodiments, a node connected to the concentrator must have means for transmitting and receiving optical signals in the wavelength region for performing loop type optical communication. However, the node need not have means for transmitting and receiving optical signals of the wavelength region for performing circuit switching type optical communication. When a node for performing only the loop type optical communication is to be connected to the concentrator, a means for interrupting only the wavelength signal for performing circuit switching type optical communication is arranged in the concentrator, between the concentrator and the node, or in the node. At this time, for example, a wavelength filter for transmitting not a wavelength for performing circuit switching type optical communication, but only a wavelength for performing loop type optical communication is arranged.

Of all the input and output ports of the concentrator described in each of the eleventh to sixteenth embodiments, if unused ports are available, means for receiving optical signals for performing loop type optical communication may be arranged at the input and output ports so as not to interrupt this optical signal output from the output port. This means is exemplified by a method of arranging a wavelength filter for transmitting only the optical signal for performing loop type optical communication between the input and output ports or a method of arranging a repeater for regenerating and repeating only an optical signal for performing loop type optical communication between the input and output ports. A bypassing means using an optical switch, as described in the sixteenth embodiment, may be arranged in the concentrator.

In each of the eleventh to sixteenth embodiments described above, a set of upstream and downstream optical fibers are used to connect a concentrator to a node or between concentrators. However, the upstream and downstream optical fibers may be integrated. For example, the input and output ports of the concentrator can be integrated using a multiplexing/demultiplexing device or the like, and an optical isolator or the like is used not to input an upstream optical signal in the downstream transmission system. In this case, a similar means may also be arranged in a node.

In the eleventh to sixteenth embodiments, the arrangement positions, numbers, arrangements, and connecting relationships of the constituent elements can be arbitrarily and properly changed.

Figure 31:
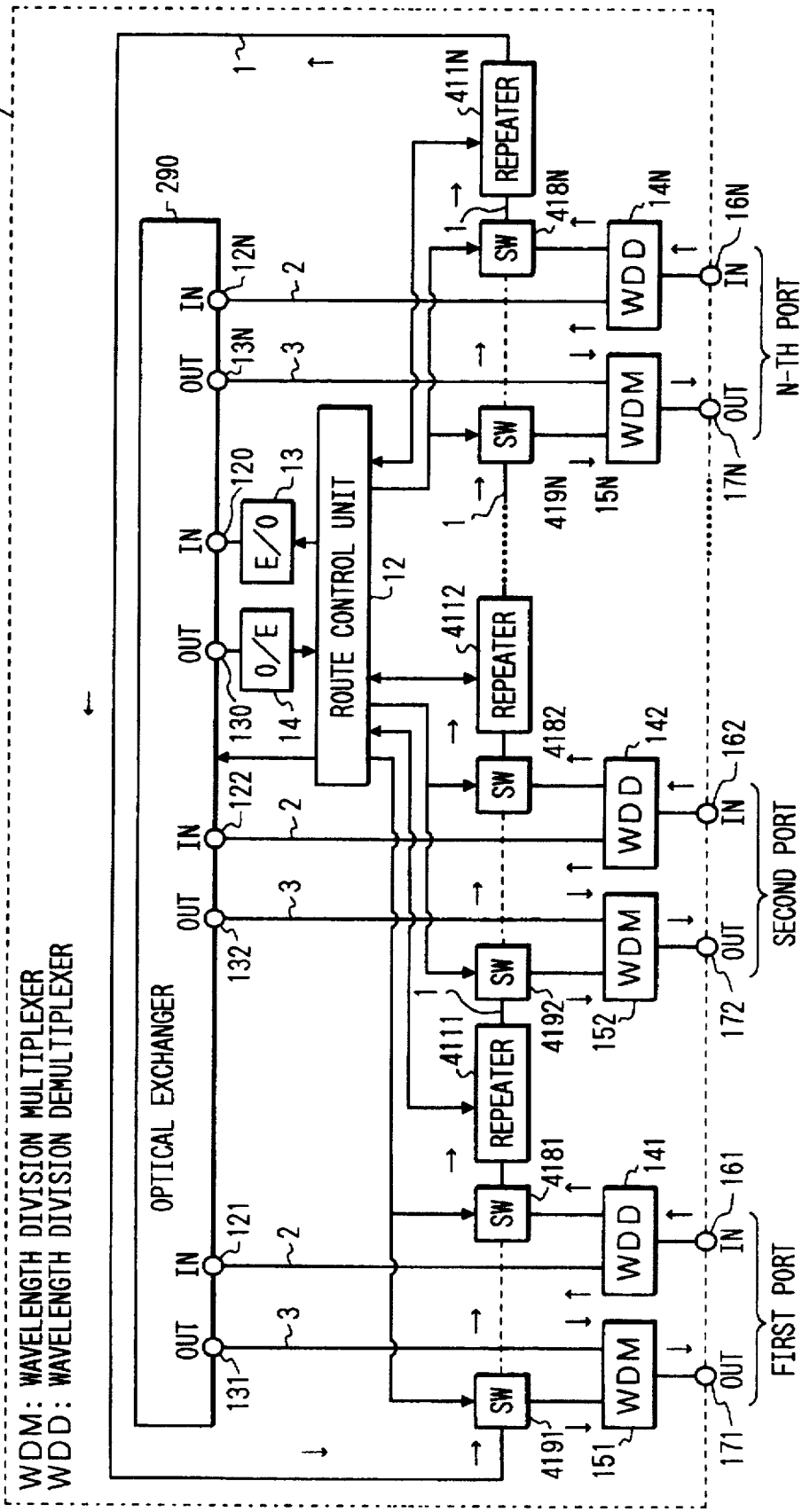
FIG. 31 is a block diagram showing the seventeenth embodiment of an optical concentrator according to the present invention.
Figure 32:
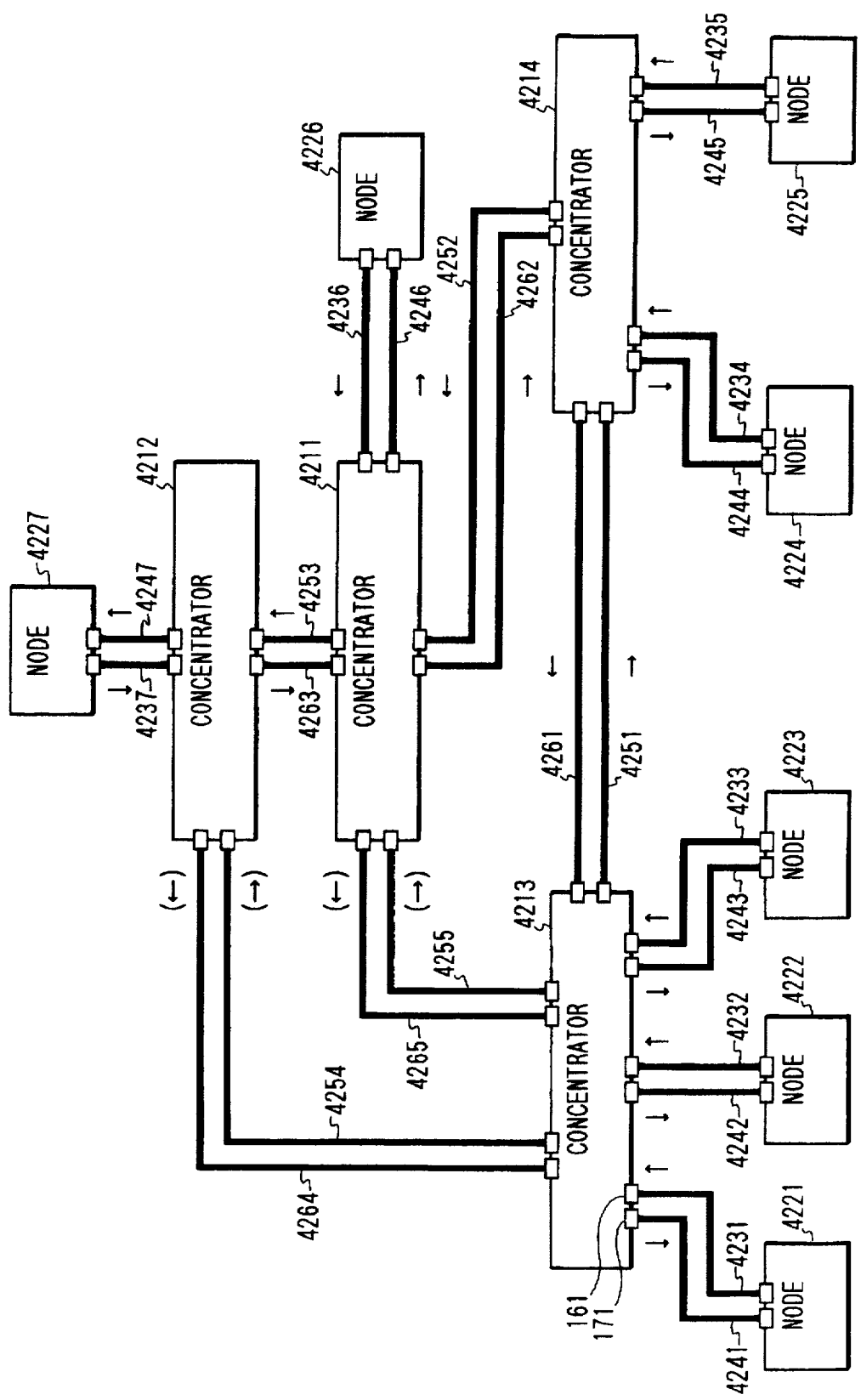
FIG. 32 is a block diagram showing the seventh embodiment of an optical communication network using the optical concentrator shown in FIG. 31.
Figure 33:
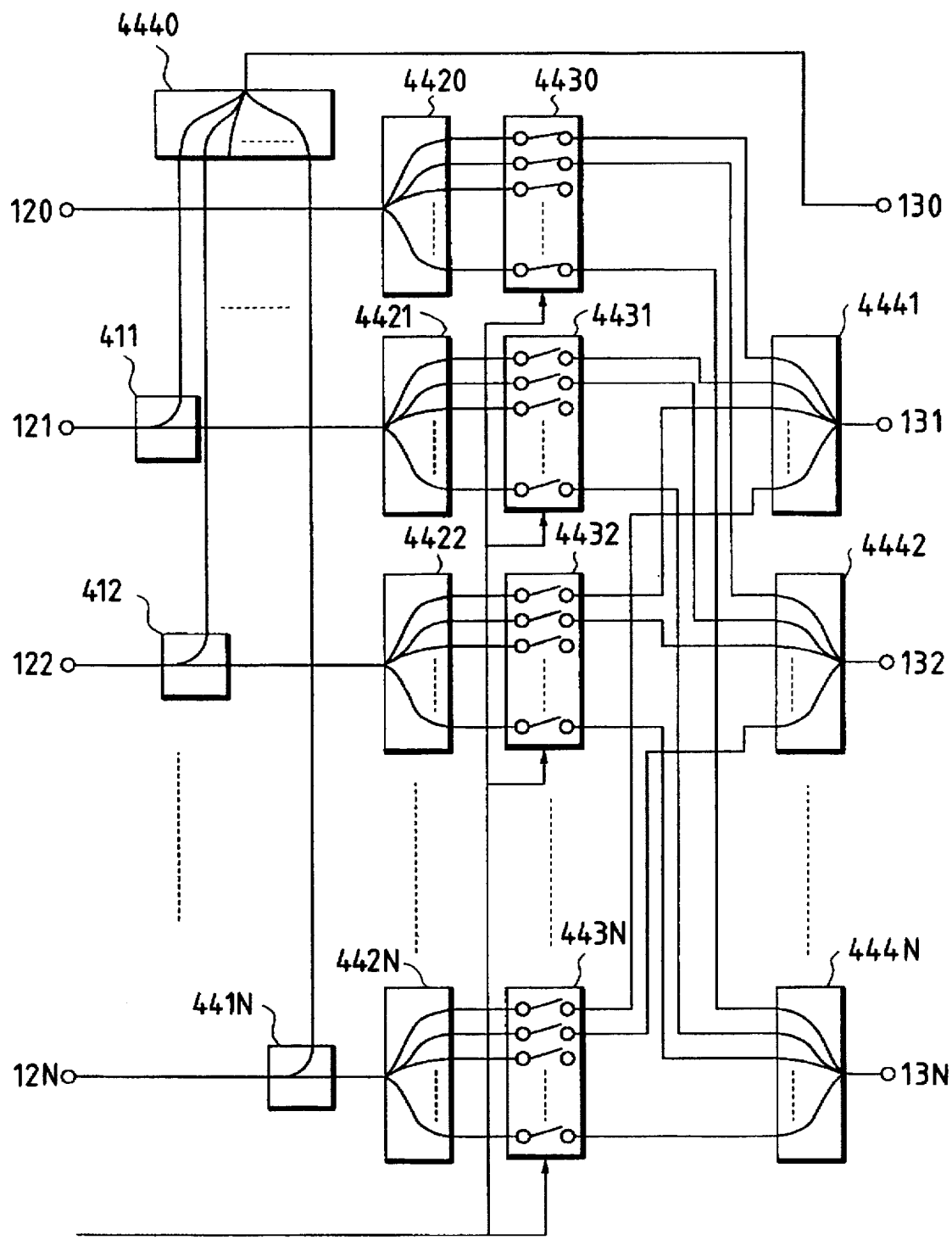
FIG. 33 is a block diagram showing the arrangement of an optical exchanger used in the optical concentrator shown in FIG. 31.

FIGS. 31, 32, and 33 are views showing the seventeenth embodiment of the present invention. FIG. 31 shows the seventeenth embodiment of a concentrator according to the present invention, FIG. 32 shows the arrangement or an optical communication network using this concentrator, and FIG. 33 is a view showing an optical exchanger of the concentrator of the present invention. The optical node shown in FIG. 7 is suitably used in this optical communication network. The arrangements of the concentrator, the optical communication network, and the optical exchanger will be described with reference to FIGS. 31 to 33.

Referring to FIG. 31, an N×N optical exchanger 290 has N input terminals 121, 122, . . . 12N, N output terminals 131, 132, . . . 13N, and control signal input/output terminals 120 and 130. The terminals 120 and 130, the terminals 121 and 131, . . . constitute input/output terminal pairs. The optical exchanger 290 comprises optical switches and star couplers and connect an input signal to at least one arbitrary output terminal. Branching filters 141, 142, . . . 14N demultiplex input signals into signals of first and second wavelength regions. The output terminals of the second wavelength region are connected to the input terminals of the optical exchanger 290. The input terminal of the branching filters serve as input ports 161, 162, . . . 16N of a concentrator 10. Multiplexers 151, 152, . . . 15N multiplex optical signals of the first and second wavelength regions. The input terminals of the second wavelength region are connected to the output terminals of the optical exchanger 290. The output terminals of the multiplexers serve as output ports 171, 172, . . . 17N of the concentrator 10. Signals output from the output terminals of the first wavelength region of the branching filters 141, 142, . . . 14N are connected to the input terminals of the first wavelength region of the multiplexers of the next ones of ports arranged in a predetermined order through first switches 4181, 4182, . . . 418N, repeaters 4111, 4112, . . . 411N, and second switches 4192, 4193, . . . 419N, and 4191. That is, as shown in FIG. 31, the output terminal of the first wavelength region of the branching filter 141 is connected to the input terminal of the first wavelength region of the multiplexer 152 through the first switch 4181, the repeater 4111, and the second switch 4192, and the output terminal of the first wavelength region of the branching filter 142 is connected to the input terminal of the first wavelength region of the multiplexer 153 through the first switch 4182, the repeater 4112, and the second switch 4193 (not shown in FIG. 31). Similarly, the output terminal of the first wavelength region of the branching filter 14N of the N-th port is connected to the input terminal of the first wavelength region of the multiplexer 151 of the first port through the first switch 418N, the repeater 411N, and the second switch 4191.

A route control unit 12 controls the first and second switches and the optical exchanger in accordance with control signals from the respective repeaters and controls the connection routes of the signals of the first and second wavelength regions. The route control unit 12 has a function of outputting control signals to the transmission channels of the first and second wavelength regions. When a control signal is output to the transmission line of the first wavelength region, the route control unit 12 causes arbitrary ones of the repeaters 4111, 4112, . . . 411N to output signals. When a control signal is output to the transmission channel of the second wavelength region, the route control unit 12 causes an electric/optical (E/O) converter 13 to output the signal through the input terminal 120 of the optical exchanger 290. The signals of the specific wavelengths are output from the output terminal 130 of the optical exchanger 290 and are converted into electrical signals by an optical/electric (O/E) converter 14. These output signals are processed by the route control unit 12. Referring to FIG. 32, concentrators 4211, 4212, 4213, and 4214 have an arrangement described with reference to FIG. 31. Each concentrator is connected to at least two other concentrators and at least one node. Optical fiber transmission channels 4231, 4232, . . . 4241, 4242, . . . connect nodes 4221, 4222, . . . 4227 and the concentrators. Optical fiber transmission channels 4251, 4252, . . . 4261, 4262 . . . connect the concentrators to each other.

FIG. 33 shows the arrangement of the optical exchanger 290 in FIG. 31. The optical exchanger 290 includes branching filters 4411, 4412, . . . 441N for demultiplex signals of specific wavelengths in the second wavelength region, 1×N star couplers 4420, 4421, . . . 442N, N optical switch groups 4430, 4431, . . . 443N, an N×1 star coupler 4440, and (N−1)×1 star couplers 4441, 4442, . . . 444N.

The operations of the concentrator of this embodiment and the optical communication network using this concentrator will be described with reference to FIGS. 7, 31, 32, and 33. Assume that an optical signal is output from the node 4221 connected through an upstream optical fiber transmission channel 4231 and 4241 to an input port 161 of the concentrator 4213 and input to the node 4221 connected through a downstream optical fiber transmission channel from an output port 171 of the concentrator 4213.

A signal output from an FDDI control unit is converted into an optical signal of the first wavelength region by an optical transmitter 36 and multiplexed by a wavelength division multiplexer 33. The resultant signal is output from an output terminal 31 to the upstream optical fiber transmission channel 4231. The optical signal transmitted through the optical fiber transmission channel 4231 and input to the input port 161 of the first port is demultiplexed by the branching filter 141 and input to the first switch 4181. The first switch 4181 selects a signal from the branching filter 141 or the second switch 4191 in accordance with a control signal from the route control unit 12. The selected signal is connected to the repeater 4111. The repeater 4111 regenerates and repeats the input optical signal and sends the resultant signal to the second switch 4192. At the same time, the repeater 4111 sends route control information in the input signal to the route control unit 12. The second switch 4192 connects the signal from the repeater 4111 to the multiplexer 152 or the first switch 4182 in accordance with a control signal from the route control unit 12. The first switch normally selects the signal from the branching filter and connects it to the repeater, and the second switch connects the signal from the repeater to the multiplexer. The signal input from the input port 161 of the first port is input to the multiplexer 152 of the second port as the adjacent port and is transmitted to the node 4222 through the downstream optical fiber transmission channel 4242 connected to the output port 172. In the node 4222, the signal is demultiplexed by a wavelength division demultiplexer 34 and converted into an electrical signal by an optical receiver 37. The converted signal is sent to an FDDI control unit 40. The FDDI control unit analyzes the contents of the received signal and sends a necessary signal to the optical transmitter 36. This signal is converted into an optical signal of the first wavelength region by the optical transmitter 36. The optical signal is then sent from the output terminal 31 to the upstream optical fiber transmission channel 4232 through the wavelength division multiplexer 33. The optical signal of the first wavelength region sent from the node 4222 connected to the second port is input to the input port 162 of the second port of the concentrator 4213 and is demultiplexed by the branching filter 142 and input to the multiplexer 143 of the third port as the next port through the first switch 4182, the repeater 4112, and the second switch 4193 (not shown in FIG. 31).

Similarly, the optical signal of the first wavelength region is sequentially sent to a plurality of ports arranged in a predetermined order. The signal is sequentially transmitted through the nodes 4221, 4222, and 4223 connected to the concentrator 4213 and then input to the concentrator 4214. Similarly, the signal is input to the concentrator 4212 through the nodes 4224 and 4225 and the concentrators 4211 and 4226. The first and second switches are set such that the concentrator 4212 does not supply a signal to the port connected to the concentrator 4213. The signal input from the concentrator 4211 is output and sent back to the node 4227 and is also supplied to the concentrator 4211. That is, if the optical fiber transmission channel connected to the concentrator 4213 of the N-th port is connected, the second switch 419N connects the signal from the repeater to the first switch 418N, and the first switch 418N connects the signal from the second switch 419N to the repeater 411N. The signal input to the concentrator 4211 is output from the port connected to the concentrator 4214 (the port connected to 4213 is interrupted). The signal input to the concentrator 4214 is output from the port connected to the concentrator 4213 and input to the concentrator 4213. The fist and second switches are set such that concentrator 4213 does not supply the signal to the ports connected to the concentrators 4211 and 4212 as in the concentrators 4211 and 4212. Therefore, the signal input to the concentrator 4213 is output from the port connected to the node 4221 and then input to the concentrator 4221.

As described above, the optical signal of the first wavelength region forms a loop-like transmission circuit, and loop type optical communication can be performed between the nodes.

On the other hand, the optical signal of the second wavelength region output from the optical transmitter 35 of the node 4221 is multiplexed with the optical signal of the first wavelength region by the wavelength division multiplexer 33 and then output from the output terminal 31 to the optical fiber transmission channel 4231. This signal is input to the input port 161 of the first port of the concentrator 4213. The signal is demultiplexed from the optical signal of the first wavelength region by the branching filter 141, and only the optical signal of the second wavelength region is input to the input terminal 121 of the optical exchanger 290 and is divided to at least arbitrary one of the output terminals 131, 132, . . . 13N.

Assume that an optical signal is to be divided from the node 4221 to the nodes 4222 and 4224. The optical exchanger 290 is controlled by the route control unit 12 to connect the second switch to the fourth switch of the optical switch group 4431. The optical signal input to the input terminal 121 passes through the branching filter 4411 and is connected to the star coupler 4421. The signal is then divided into N signals by the star coupler 4421. The optical switch group 4431 passes the second and fourth optical signals of the N input signals. One passed signal is supplied to the output terminal 132 through the star coupler 4442, and the other passed signal is output from the output terminal 134 through the star coupler 4444. The optical signal output from the output terminal 132 is multiplexed with the optical signal of the first wavelength region by the multiplexer 152 and output from the output port 172 to the downstream optical fiber transmission channel 4242. This signal is then input to the node 4222. In the node 4222, the input signal is demultiplexed into the optical signals of the first and second wavelength regions, and only the optical signal of the second wavelength region is input to a variable wavelength filter 39. When the transmission wavelength of the variable wavelength filter 39 is set to the wavelength of the optical signal output from the node 4221. The signal of the transmission wavelength can be received by the optical receiver 38. The optical signal supplied to the output terminal 134 of the optical exchanger 290 is received by the concentrator 4214 in the same manner as described above. The route control unit 12 in the concentrator 4214 controls the optical exchanger 290 to connect the signal from the concentrator 4213 to the node 4224. Therefore, the signal from the node 4221 is supplied to the node 4224.

When a request for transmission from a plurality of nodes to the node 4222 is sent during the above communication, these nodes output optical wavelength signals having wavelengths different from the communication wavelength in the second wavelength region. The concentrator controls the optical exchanger so that these signals can be connected to the node 4222. The node 4222 causes the variable wavelength filter 39 to select a target wavelength signal and can receive the signal without causing radio interference. In this manner, the optical signal of the second wavelength region can be divided to an arbitrary port of the concentrator 10, thereby performing transmission in the circuit switching or exchange optical communication form. The signal route of the second wavelength region can be arbitrarily selected. For example, when a signal is to be transmitted from the node connected to the concentrator 4213 to the node connected to the concentrator 4214, any route, i.e., a route of the transmission channel 4251, 4254, or 4255 may be arbitrarily set for the optical exchanger. In this manner, wavelength multiplexing can be performed in the second wavelength region, and a large number of high-speed signals can be simultaneously transmitted.

An operation performed upon occurrence of a failure such as the disconnection of a transmission channel in the above network will be described with reference to FIGS. 31, 32, and 33. When the optical fiber transmission channel is partially disconnected, the signal routes of the first and second wavelength regions are disconnected to disable communication. However, communication in the second wavelength region can be restarted through another route by controlling the optical exchanger. Communication in the first wavelength region can be restarted by the following procedures. Assume that the optical fiber transmission channel 4252 is disconnected. Any signal is not input to each repeater in the concentrator, and each route control unit 12 detects the occurrence of a failure. Each route control unit 12 outputs a signal representing the occurrence of the failure to each repeater. The repeater corresponding to the failed port cannot receive the signal from the route control unit 12. The route control unit 12 in the concentrator 4211 can recognize the position of the failure. The route control unit 12 causes an E/O converter 13 to output a failure informing signal using a specific wavelength in the second wavelength region. At the same time, the route control unit 12 controls the first and second switches of the port to which the optical fiber transmission channel 4252 is connected. Therefore, the signal is not supplied to this port. The failure informing signal is input to the input terminal 120 of the optical exchanger 290 and divided into N signals by the 1×N star coupler 4420. The N signals are supplied to star couplers 4441, 4442, . . . 444N through the optical switch group 4430 and output from the output terminals 131, 132, . . . 13N. The optical switch group 4430 is set to normally pass all the input signals and interrupt the signals as needed. The failure informing signal transmitted through the optical fiber transmission channel 4253 is input to the first port 161 of the concentrator 4212 (assume that the optical fiber transmission channel 4253 is connected to the first port). The signal passes through the branching filter 141 and is input to the input terminal 121 of the optical exchanger 290. The optical exchanger 290 separates the failure informing signal of the specific wavelength in the second wavelength region from the signal input to the input terminal 121 and outputs the failure informing signal to the output terminal 130 through the star coupler 4440. The optical signal from the output terminal 130 is converted into an electrical signal by an O/E converter 14, and the electrical signal is input to the route control unit 12. The route control unit 12 recognizes the failure position and controls the first and second switches for the ports connected to the optical fiber transmission channels 4254 and 4264 which have been interrupted, thereby allowing signal transmission again. At the same time, the route control unit 12 causes the E/O converter 13 to output the failure informing signal.

Similarly, the concentrators 4213 and 4214 recognize the failure position. The concentrator 4213 controls to supply signals to the ports connected to the optical fiber transmission channels 4254 and 4264 again and at the same time outputs the failure informing signal. The concentrator 4214 controls not to supply the signal to the ports connected to the optical fiber transmission channels 4252 and 4262 again. In this manner, a new loop circuit route is established, and communication can be performed without interrupting the route.

At this time, when the optical fiber transmission channel 4254 is disconnected, a loop circuit can be reconstructed using the route passing through the optical fiber transmission channels 4255 and 4265. Therefore, communication can be performed without interrupting the operation of the network.

When an optical fiber transmission channel between a concentrator and a node is disconnected, the first and second switches for the port connected to this optical fiber transmission channel are controlled not to supply the signal to this port.

As described above, nodes are connected to the concentrators of this embodiment through the upstream and downstream common optical fiber transmission channels to construct a wavelength-multiplexed optical communication network in which the loop type optical communication system and the circuit switching type optical communication are integrated. At the same time, concentrators larger than the number of failure positions are connected to each other to perform communication without interrupting the circuit.

In this embodiment, the node has loop and circuit switching optical transmitter and receiver. However, the network can be operated even if the node does not have one or both of the circuit switching optical transmitter and receiver.

In addition, the variable wavelength light source and the variable wavelength filter are used as the light source of the second wavelength region and the filter. However, a plurality of fixed wavelength light sources and a plurality of fixed filters in the second wavelength region can be used.

Figure 34:
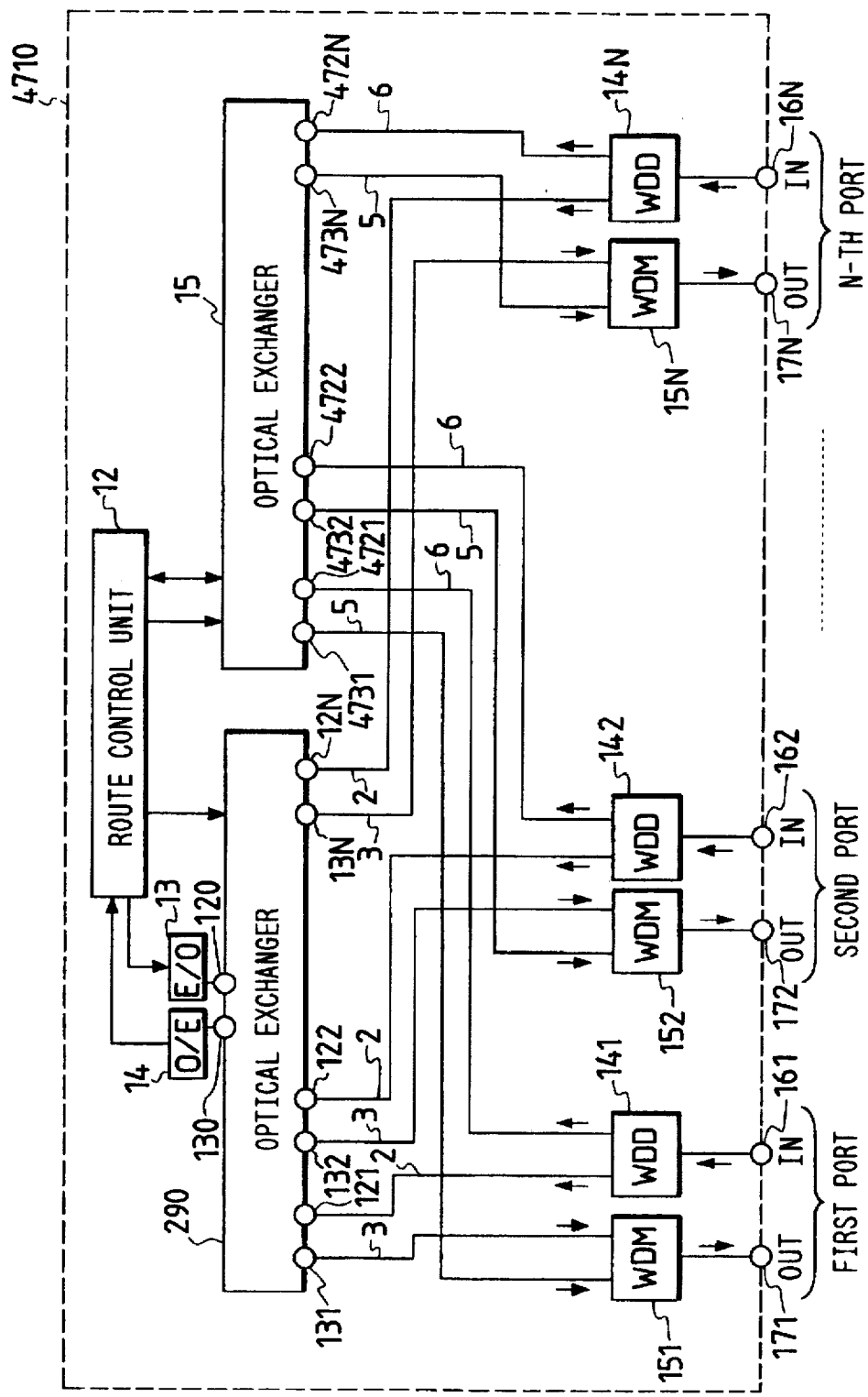
FIG. 34 is a block diagram showing the eighteenth embodiment of an optical concentrator according to the present invention.
Figure 35:
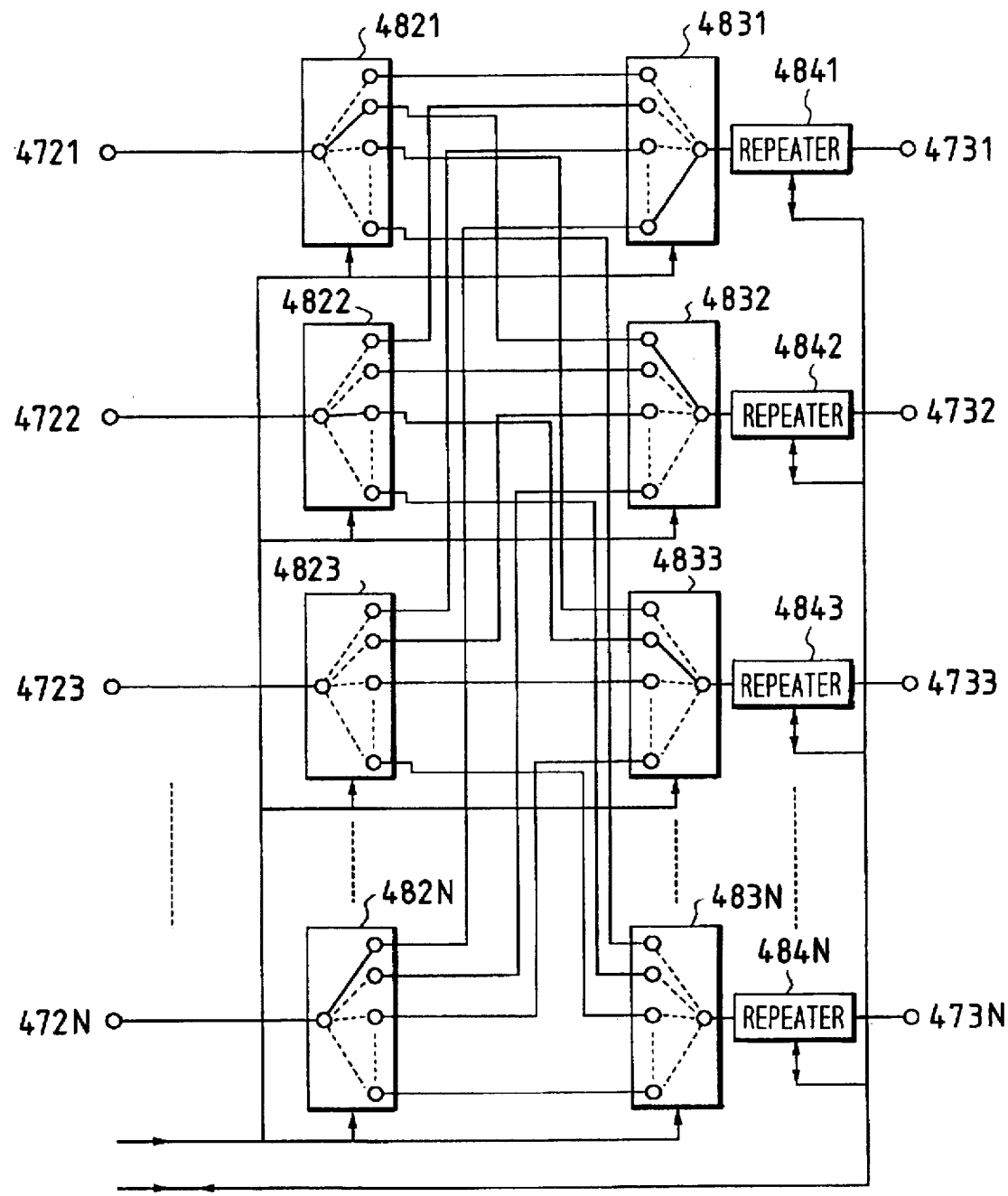
FIG. 35 is a block diagram showing the arrangement of an optical exchanger used in the optical concentrator shown in FIG. 34.

The eighteenth embodiment of the present invention will be described with reference to FIGS. 34 and 35. FIG. 34 shows the arrangement of the eighteenth embodiment of a concentrator according to the present invention, and FIG. 35 shows the arrangement of an optical exchanger 15 of the concentrator in FIG. 34.

A concentrator 4710 of this embodiment has substantially the same circuit switching type communication channel as that using the optical signal of the second wavelength region described with reference to the seventeenth embodiment. The same reference numerals as in the seventeenth embodiment denote the same parts in the eighteenth embodiment. The eighteenth embodiment is different from the seventeenth embodiment in that an optical exchanger having a switching function is arranged to arbitrarily determine the supply order of signals in configuration of a loop type communication channel. The arrangement of this optical exchanger is shown in FIG. 35. The optical exchanger comprises 1×N optical switches 4821, 4822, ... 482N, 4831, 4832, ... 483N and repeaters 4841, 4842, ... 484N. Optical signals input from input terminals 4721, 4722, ... 472N are output from output terminals 4731, 4732, ... 473N through arbitrary connection routes. The optical signal input from the input terminal 4721 is set to be output from the output terminal 4732 through the 1×N optical switches 4821 and 4832 and the repeater 4842. The optical signal input from the input terminal 4722 is set to be output from the output terminal 4733 through the 1×N optical switches 4822 and 4833 and the repeater 4843. Similarly, the optical signal input from the input terminal 472N is set to be output from the output terminal 4731 through the 1×N optical switches 482N and 4831 and the repeater 4841. With this arrangement, an optical signal of a first wavelength region input from an input port 161 of the first port of the concentrator 4710 is demultiplexed by a wavelength division demultiplexer 141 and input to the input terminal 4721 of the optical exchanger 15. This signal is input and multiplexed with a signal of a second wavelength region by a wavelength division multiplexer 152. The resultant signal is output from an output port 172. This signal is sent back at the node and input from an input port 162 and passes through a wavelength division demultiplexer 142. The signal is then input to the input terminal 4722 of the optical exchanger 15 and output from the output terminal 4733. The signal is output from the output port 172 through a wavelength division multiplexer 153. In this manner, the signal is sequentially sent to form a loop type communication channel. As described above, the signal input to the optical exchanger 15 is sent to the next port to obtain the same effect as in the seventeenth embodiment. When this setting is changed, a loop circuit is formed in an arbitrary order. When this concentrator is used in the communication network shown in FIG. 32, the failure restoration can be performed in the same procedures as in the seventeenth embodiment upon occurrence of a failure such as the disconnection of a transmission channel.

In this embodiment, the output terminals of an optical exchanger 290 are connected to all wavelength division multiplexers through optical transmission channels 3 constituted by optical fibers. The input terminals of the optical exchanger 290 are connected to all the wavelength division demultiplexers through optical transmission channels 2 constituted by optical fibers. Similarly, the output terminals of the optical exchanger 15 are connected to all the wavelength division multiplexers through optical transmission channels 5 constituted by optical fibers. The input terminals of the optical exchanger 15 are connected to all the wavelength division demultiplexers through optical transmission lines 6 constituted by optical fibers.

The arrangement of the optical exchanger 15 of the concentrator of the eighteenth embodiment is not limited to this. The optical exchanger 15 may have a star coupler arrangement of, e.g., 1×N switches 4831, 4832, ... 483N, an arrangement having a repeater in the optical exchanger in FIG. 33, or an arrangement having an N×N optical exchanging function.

Figure 36:
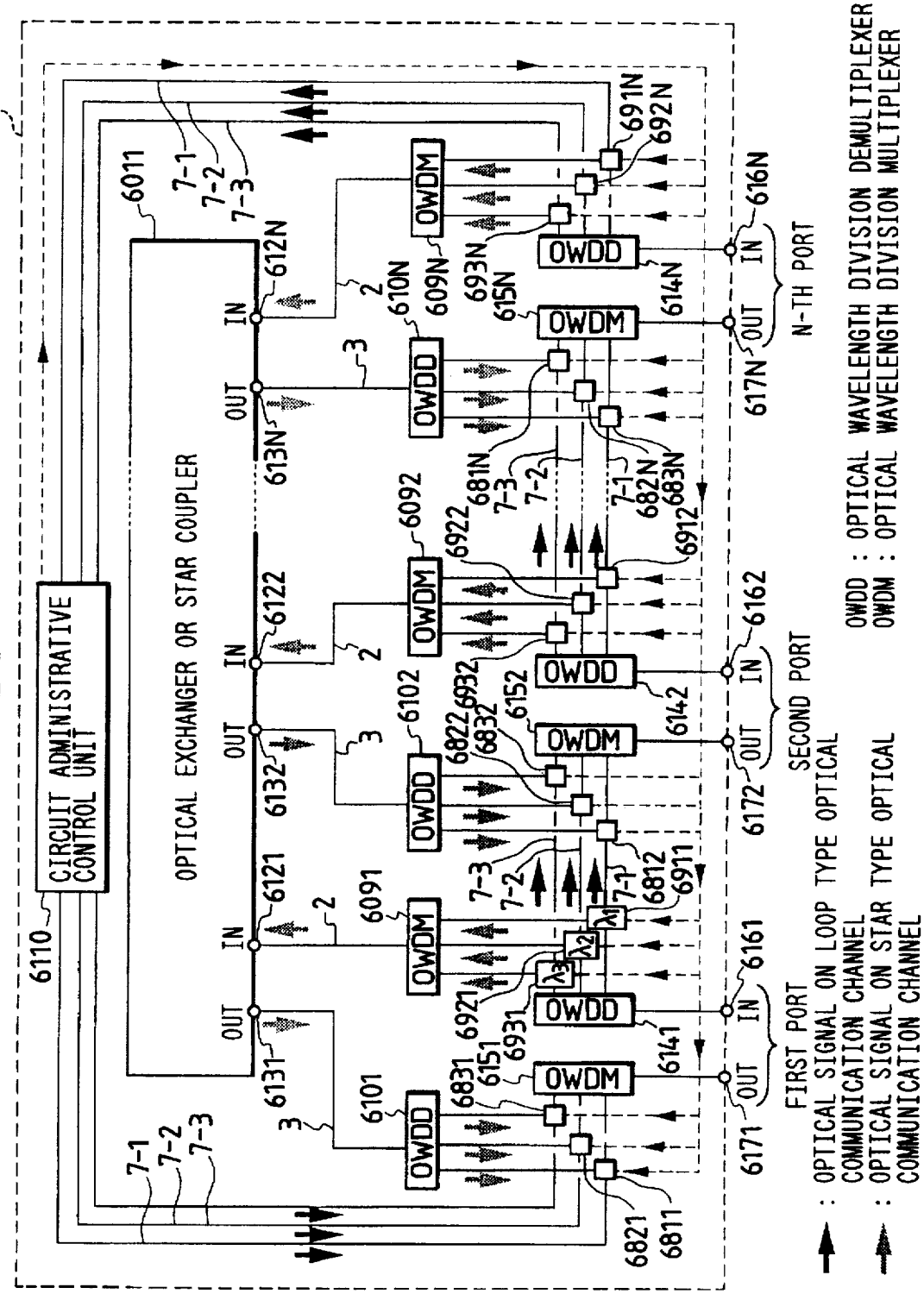
FIG. 36 is a block diagram showing the nineteenth embodiment of an optical concentrator according to the present invention.
Figure 37:
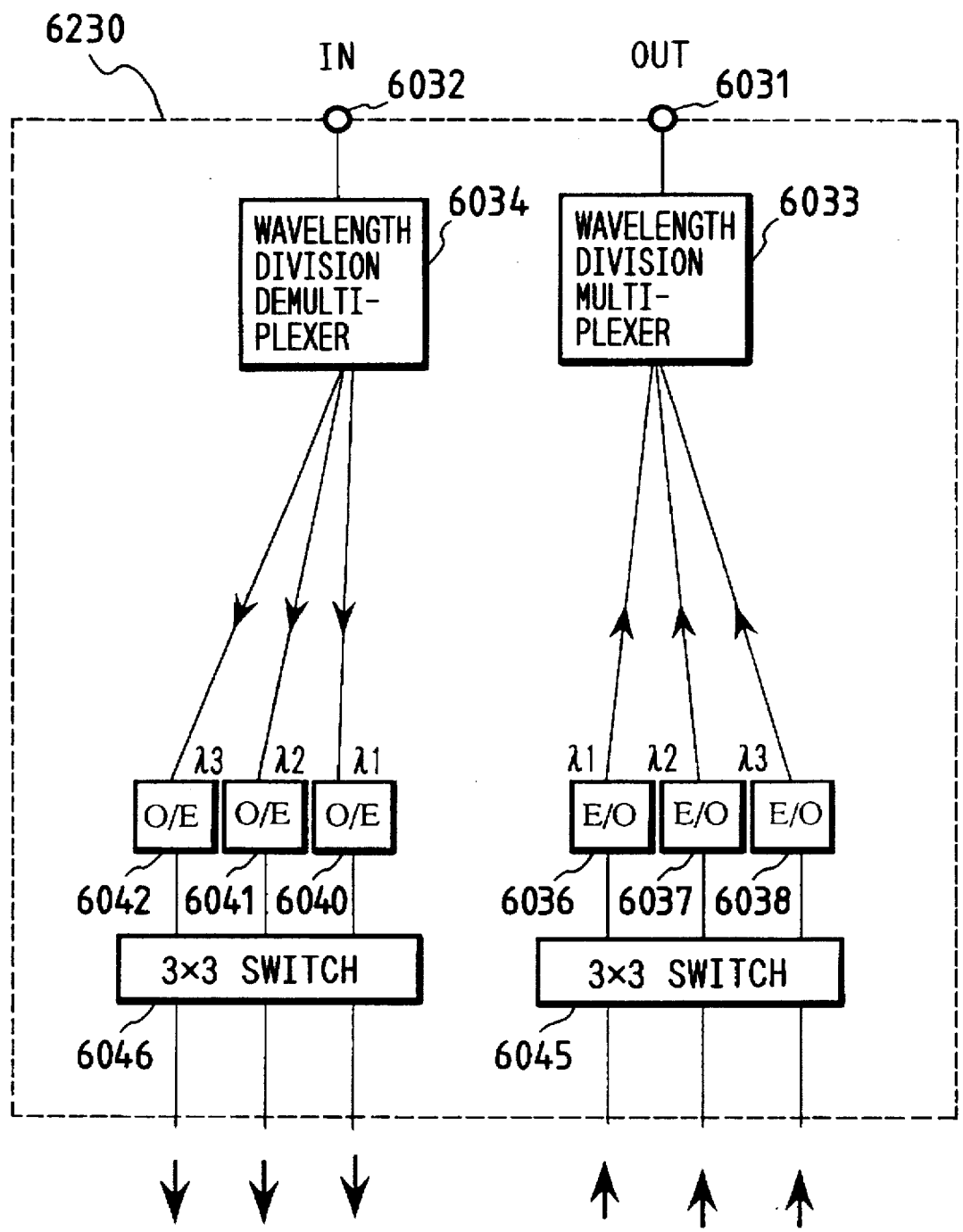
FIG. 37 is a block diagram showing the arrangement of an optical node connected to the optical concentrator shown in FIG. 36.

FIGS. 36 and 37 are views showing the nineteenth embodiment of the present invention. FIG. 36 shows an optical concentrator according to the nineteenth embodiment of the present invention, and FIG. 37 shows the arrangement of an optical node connected to the optical concentrator. The optical concentrator of this embodiment is suitably used in the optical communication network shown in FIG. 6 or 21.

Referring to FIG. 36, an N×N optical exchanger 6011 has N input terminals 6121, 6122, ... 612N and N output terminals 6131, 6132, ... 613N. The terminals 6121 and 6131, the terminals 6122 and 6132, ... the terminals 612N and 613N constitute input/output pairs. The optical exchanger 6011 can send an optical signal to at least one arbitrary output terminal (e.g., arbitrarily selected output terminals 6131, 6132, and 6134) in accordance with control using an external control signal. Optical wavelength division demultiplexers 6141, 6142, ... 614N demultiplex wavelength-multiplexed signals input from input ports 6161, 6162, ... 616N of the concentrator of this embodiment into respective wavelengths. The output terminals of the demultiplexed optical signals are connected to optical switches 6911 to 6931, 6912 to 6932, ... 691N to 693N. The optical switch 6911 switches the optical signal of a wavelength (let the wavelength be λ1) output from the optical wavelength division demultiplexer 6141 to an optical wavelength division multiplexer 6091 or the optical switch 6812. Circuit switching is performed by a circuit administrative control unit 6110. A control signal from the circuit administrative control unit 6110 is indicated by a dotted line in FIG. 36. The optical switches 6921, 6931, 6912, 6922, 6932, ... 691N, 692N, and 693N are used in the same manner as the optical switch 6911. Optical signals are switched to the optical wavelength division multiplexers connected to the respective optical switches or optical switches 6822, 6832, ... 681N, 682N, 683N. The optical switch 6812 selects the optical signal of the wavelength λ1 from the optical switch 6911 or the optical wavelength division demultiplexer 6102 and supplies the selected optical signal to an optical wavelength division multiplexer 6152. This optical switch is controlled by the circuit administrative control unit 6110. The optical switches 6811, 6821, 6831, 6822, 6832, . . . are used in the same manner as in an optical switch 6811. Optical signals from the optical wavelength division demultiplexers connected to the respective optical switches or the optical switches 691N, 692N, 693N, 6921, 6931, . . . are selected. The optical wavelength division multiplexers 6151 and 6152 and optical wavelength division multiplexers 6153, . . . 615N multiplex optical signals from the plurality of optical switches. The output terminals of the optical wavelength division multiplexers are used as output ports 6171, 6172, . . . 617N of a concentrator 6010 of this embodiment. The optical wavelength division multiplexer 6091 and optical wavelength division multiplexers 6092, . . . 609N multiplex optical signals from the respective switches. Each optical wavelength division multiplexer is connected to a plurality of optical switches. The output terminals of the optical wavelength division multiplexers 6091, 6092, . . . 609N are connected to the input ports 6121, 6122, . . . 612N of the optical exchanger 6011 of the concentrator 6010 of this embodiment, respectively. Optical wavelength division demultiplexers 6101, 6102, . . . 610N demultiplex wavelength-multiplexed signals output from the output ports 6131, 6132, . . . 613N of the optical exchanger 6011 into the respective wavelengths. The output terminals of these optical wavelength division demultiplexers are connected to the optical switches 6811, 6821, 6831, 6812, 6822, 6832, . . . 681N, 682N, 683N, respectively.

In this embodiment, the optical wavelength division demultiplexers and the optical wavelength division multiplexer are connected to each other through optical transmission channels 7-1, 7-2, and 7-3 constituted by optical fibers.

Referring to FIG. 37, a node has output and input terminals 6031 and 6032 which are connected to the input and output ports of the concentrator 6010 through an optical fiber transmission channel. A wavelength division multiplexer 6033 multiplexes optical signals of the respective wavelengths transmitted from the respective optical transmitters. The output terminal of the wavelength division multiplexer 6033 is connected to the output terminal 6031 of the node and outputs wavelength-multiplexed light of loop and switching circuits. A wavelength division demultiplexer 6034 demultiplexes wavelength-multiplexed light into the respective wavelengths, and its input terminal is connected to the input terminal 6032 of the node. Optical transmitters (E/Os) 6036, 6037, and 6038 have oscillation wavelengths λ1, λ2, and λ3, respectively, and convert video data or computer data into optical signals. Optical receivers (O/Es) 6040, 6041, and 6042 are connected to the output terminal of the wavelength division demultiplexer 6034. The optical receivers 6040, 6041, and 6042 convert the optical signals of the wavelengths λ1, λ2, and λ3, respectively. A 3×3 switch 6045 switches the computer or video information input from a computer or external input device to an optical transmitter having a wavelength determined by the circuit administrative control unit 6110. A 3×3 switch 6046 switches data received by each optical receiver to the computer or external output device.

The operations of the concentrator of this embodiment and an optical communication network using this concentrator will be described with reference to FIGS. 7, 36, and 37. This network is a communication system for connecting concentrators and nodes in a star shape to process multimedia information such as computer information and video information. The network has a loop circuit and a switching circuit. The switching circuit is defined as a circuit for supplying an optical signal transmitted from each terminal to an arbitrary terminal by the optical exchanger 6011 in the concentrator 6010 and transmits video information and the like. The loop circuit transmits computer information. Optical signals on the loop and switching circuits are wavelength-multiplexed in one optical fiber. The optical routes of the loop and switching circuits are formed as follows. For example, an optical signal (e.g., an optical signal of the wavelength λ1 output from the node 231 will be exemplified) of the switching circuit passes through a route of an upstream optical fiber 211→the wavelength division demultiplexer 6141 in the concentrator 6010→the optical switch 6911→the wavelength division multiplexer 6091→the optical exchanger 6011 (assume that the optical signal of the wavelength λ1 is input to the output port 6132 of the concentrator 6011)→the wavelength division demultiplexer 6102→the optical switch 6912→the wavelength division multiplexer 6152→a downstream optical fiber 222, and is then input to the node 232, thereby forming the switching circuit. An optical signal (e.g., an optical signal of a wavelength λ3 output from the node 231 is exemplified) of the loop circuit passes through a route of the upstream optical fiber 211→the wavelength division demultiplexer 6141 in the concentrator 6010→the optical switch 6931→the optical switch 6832→the wavelength division multiplexer 6152→the downstream optical fiber 222→the node 232. This signal is then electrically repeated by the node 232 and output to the upstream optical fiber 212. In the same manner as described above, the signal is transferred to the nodes 232, 234, . . . 238, thereby forming a loop circuit.

In this embodiment, the three wavelengths λ1, λ2, and λ3 are used on the network. Each wavelength is used for both the loop and switching circuits. In this network, the wavelengths λ1 and λ2 are normally assigned to the loop circuit, and the wavelength λ3 is assigned to the switching circuit. Assume that the wavelength λ1 is used in communication complying with the FDDI protocol, that the wavelength λ2 is used in communication of the time division multiplex scheme, and that the wavelength λ3 is used in the switching circuit for transmitting video information form the node 235 to the node 232. In this communicating state, the time division multiplex communication using the wavelength λ2 is completed, and the node 231 must transmit video information to the nodes 232 and 234 using the switching circuit. In this case, the node 231 superposes use request information of the switching circuit for transmitting video information on the optical signal of the wavelength λ1 (i.e., the FDDI circuit) and transmits the circuit use request information to the circuit administrative control unit 6110 in the concentrator. The optical signal of the wavelength λ1 is output from the node 231 to the upstream optical fiber 211 and input to the input port 6161 of the concentrator 6010. The optical signal of the wavelength λ1 is demultiplexed by the wavelength division demultiplexer 6141 and passes through the optical switches 6911 and 6812. The signal is then multiplexed by the wavelength division multiplexer 6152 and output from the output port 6172 of the concentrator 6010 to the node 232. The optical signal of the wavelength λ1 input to the node 232 is electrically repeated and output to the upstream optical fiber. In this same manner as described above, the optical signal of the wavelength λ1 passes through a route of the concentrator 6010→the optical node 233→the concentrator 6010→the optical node 234→. . . →the optical node 238, and is then input to the circuit administrative control unit 6110 in the concentrator 6010. The circuit administrative control unit 6110 selects the wavelength λ2 as a switching circuit use enable wavelength of the node 231 in response to the switching circuit use request. The wavelength λ2 is selected because the wavelength λ2 assigned to the switching circuit is currently used and the wavelength λ2 assigned to the loop circuit is unused. The unused wavelength of the loop circuit can be utilized to effectively utilize the usable wavelength (the number of usable circuits) on the network. The circuit administrative control unit 6110 superposes information of the selected wavelength on the optical signal of the wavelength λ1 and informs the node 231 of this information. The circuit administrative control unit 6110 switches an optical switch corresponding to the wavelength λ2 so that the optical signal route of the wavelength λ2 serves as a circuit switching type route. That is, the optical switch 6921 of the wavelength λ2 is switched to the wavelength division multiplexer 6091, and the optical switch 6822 and the optical switch 6824 (not shown) are switched to the wavelength division multiplexer 6102 and the wavelength division multiplexer 6104 (not shown). The node 231 having received the information of the use enable wavelength λ2 of the switching circuit from the circuit administrative control unit 6110 controls the 3×3 switch 6045 and supplies video information to the optical transmitter 6037 having the oscillation wavelength λ2. The video information is converted into the optical signal of the wavelength λ2 by the optical transmitter 37. The optical signal of the wavelength λ2 passes through the wavelength division multiplexer 6033 and is output from the output terminal 6031 to the optical fiber 211. The optical signal of the wavelength λ2 input to the input port 6161 of the first port of the concentrator 6010 is demultiplexed by the wavelength division demultiplexer 6141 and output from the output terminal of the wavelength λ2. The output optical signal of the wavelength λ2 passes through the optical switch 6921 switched to the switching circuit and is then input to the wavelength division multiplexer 6091. The optical signal of the wavelength λ2 multiplexed by the wavelength division multiplexer 6091 is output to the optical exchanger 6011. This output optical signal is divided to the output terminals 6132 and 6134 by the optical exchanger 6011. The light output from the output terminal 6132 is wavelength-multiplexed light transmitted from the nodes 231 and 251. This wavelength-multiplexed light is demultiplexed into optical signals of the wavelengths λ2 and λ3 by the wavelength division demultiplexer 6102. The optical signal of the wavelength λ2 is output to the wavelength division multiplexer 6152 by the optical switch 6822 of the wavelength λ2 and is multiplexed again with the optical signal of the wavelength λ2 by the wavelength division multiplexer 6152. The wavelength-multiplexed light of the wavelengths λ2 and λ3 is output from the output port 6172 to the downstream optical fiber 222. The wavelength-multiplexed light input to the node 232 is demultiplexed into optical signals of the wavelengths λ2 and λ3 by the wavelength division demultiplexer 6034. The optical signal of the wavelength λ2 is received by the optical receiver 6041. The optical signal of the wavelength λ2 supplied to the output terminal 6134 of the optical exchanger 6011 is received by the node 234 in the same manner as described above.

Assume that transmission of the video information from the node 231 is completed, and that the node 232 must transmit computer information to the node 231. The node 232 performs transmission of the computer information in accordance with a time division multiplex communication method using the loop circuit. The node 232 superposes loop circuit use request information on the optical signal of the wavelength λ1 and transmits the circuit use request information to the circuit administrative control unit 6110 in the concentrator. The optical signal route of the wavelength λ1 is the same as that described with reference to the switching circuit, and a detailed description thereof will be omitted. The circuit administrative control unit 6110 selects the wavelength λ2 as the use wavelength of the loop circuit of the node 232 in response to the loop circuit use request due to the following reason. The wavelength λ1 assigned to the loop circuit is currently used, and the wavelength λ2 assigned to the switching circuit is selected because the wavelength λ2 is unused. Therefore, the unused wavelength assigned to the switching circuit can be efficiently utilized. The circuit administrative control unit 6110 superposes information of the selected wavelength on the optical signal of the wavelength λ1 and informs the node 232 of this information. The circuit administrative control unit 6110 switches an optical switch corresponding to the wavelength λ2 so that the optical signal route of the wavelength λ2 becomes a loop circuit route. More specifically, the optical switches 6921 and 6822 of the wavelength λ2, the optical switches 6922 and 6823 of the wavelength λ2, ... the optical switches 692N and 682N are directly coupled to each other. The node 232 having received information of the loop circuit use enable wavelength λ2 from the circuit administrative control unit 6110 controls the 3×3 switch 6045 to input the computer information to the optical transmitter 6037 having the oscillation wavelength λ2. The computer information is converted into the optical signal of the wavelength λ2 by the optical transmitter 6037. The optical signal of the wavelength λ2 passes through the wavelength division multiplexer 6033 and is output from the output terminal 6031 to the optical fiber 212. This optical signal input to the input port 6162 of the second port of the concentrator 6010 is demultiplexed by the wavelength division demultiplexer 6142 and output from the output terminal of the wavelength λ2 thereof. This output optical signal of the wavelength λ2 is output to the adjacent optical switch 6923 by the optical switch 6922. The signal is then output from the optical switch 6923 to the wavelength division multiplexer 6173. The optical signal of the wavelength λ2 transmitted through the downstream optical fiber 223 and input to the node 233 is demultiplexed by the wavelength division demultiplexer 6034. The demultiplexed optical signal of the wavelength λ2 is converted into an electrical signal by the optical receiver 6041. The node 233 having received the computer information analyzes the data whether this data is sent to this node 233. If transfer is required, the data is electrically repeated and converted into the optical signal of the wavelength λ2 by the optical transmitter 6037. This optical signal is output from the output terminal 6031. The optical signal is transferred in a route of the concentrator 6010→the node 234→concentrator 6010→node 235→... →the concentrator 6010 and is then input to the node 231. The optical signal of the wavelength λ2 input to the node 231 is demultiplexed by the wavelength division demultiplexer 6034 and received by the optical receiver 6041. In this manner, a pair of optical switches of the wavelength λ2 located at adjacent ports are directly connected by the circuit administrative control unit 6110, thereby forming a loop circuit.

Communication of an optical network in which a plurality of concentrators are connected in a radial form will be described with reference to FIG. 21. An operation of a network using one concentrator of this type will be omitted.

Assume that a loop circuit communication request is sent from a node 5006 to a node 5003, and that the circuit administrative control unit 6110 (this circuit administrative control unit is included in the concentrator connected to the node 5006) assigns the unused wavelength λ2 assigned to the switching circuit to a loop circuit wavelength. The circuit administrative control unit 6110 informs the respective circuit administrative control units 6110 in the respective concentrators and the nodes on the network that the wavelength λ2 is newly assigned to the loop circuit. The circuit administrative control unit 6110 of each concentrator directly connects the optical switches 6921 and 6822 of the wavelength λ2, the optical switches 6922 and 6823 of the wavelength λ2, . . . the optical switches 692N and 6821 of the wavelength λ2. The optical signal route of the wavelength λ2 constitutes a loop circuit on the network. Thereafter, the node 5006 outputs the optical signal of the wavelength λ2, and the optical signal is transmitted in a loop circuit of 5006→5013→5011→5012→5001→5012→5002→5012→5003.

An operation of sending a switching circuit communication request from the node 5006 to the node 5003 and causing the circuit administrative control unit 6110 (this circuit administrative control unit is included in the concentrator connected to the node 5006) to assign an unused wavelength λ2 assigned to the loop circuit to the switching circuit will be described below. The circuit administrative control unit 6110 informs the circuit administrative control units 6110 of concentrators 5013, 5011, and 5012 on the network that the wavelength λ2 is newly assigned to the switching circuit. The circuit administrative control units 6110 in the concentrators 5013, 5011, and 5012 switch optical switches corresponding to the wavelength λ2 so that the optical signal of the wavelength λ2 serves as a circuit switching type optical signal. When the optical route of the switching circuit type is established, the node 5006 outputs the optical signal of the wavelength λ2, and the optical signal of the wavelength λ2 is transmitted in a route of 5006→5013→5011→5012→5003.

As described above, nodes are simply connected to the concentrators of this embodiment through the upstream and downstream common optical fibers to achieve wavelength-multiplexed optical communication in which the loop type optical communication system and the circuit switching type optical communication system are integrated. The number of wavelength-multiplexed channels of the entire network is optimally assigned to each circuit in accordance with a communication request for each circuit of all the terminals, thereby providing a new optical network capable of arbitrarily changing the transmission volumes of the two circuits required by all the nodes.

In this embodiment, the optical exchange of this embodiment is controlled by a method of supplying an external control signal directly to the optical exchanger, a method of arranging an optical receiver in part of the loop or circuit switching type optical signal route in the concentrator, supplying a control signal from a node connected to this concentrator, causing the optical receiver to receive the control signal, and supplying the control signal from the optical receiver to the optical exchanger, or by a method of forming a control information portion in part of a transmission signal, causing an optical receiver located on the loop or circuit switching type optical channel to read this information, and controlling the optical exchanger by the optical receiver.

The optical switch arranged between the input/output port of the concentrator and the input/output port of the optical exchanger is controlled by a method of arranging optical receivers in parts of the loop and switching circuit type optical signal channels, always monitoring a use condition of each circuit, and causing the circuit control unit in the concentrator to optimally select a use enable wavelength of each circuit in accordance with the use condition, a method of directly supplying an external control signal to the optical switch in the concentrator, a method of arranging an optical receiver at a common portion of the loop and switching circuit type optical signal channels in the concentrator, supplying a control signal from a node connected to this concentrator, causing the optical receiver to receive a control signal, and supplying the control signal from the optical receiver to the circuit administrative control unit 6110, or a method of arranging a control information portion in part of a transmission signal, causing the optical receiver located on the loop or circuit switching type optical channel to read the control information, and controlling the optical switch from the optical receiver.

In this embodiment, the circuit administrative control unit 6110 is located on the loop circuit between the wavelength division multiplexer 614N and the wavelength division demultiplexer 6101. The position of the circuit administrative control unit 6110 is not limited to this. The circuit administrative control unit may be arranged on the loop or switching circuit.

In this embodiment, the concentrator using the optical exchanger has been described. However, star communication using a star coupler in this portion can be performed.

A method of transmitting video data on the switching circuit and computer information on the loop circuit has been described. However, the types of data transmitted through the respective circuits are not limited to specific ones.

The network can be properly operated when at least one variable wavelength light source and at least one variable wavelength filter are used as the light source and filter of the wavelengths used.

The number of wavelengths used in this embodiment is three. However, the number of wavelengths to be multiplexed is not limited to three.

Figure 38:
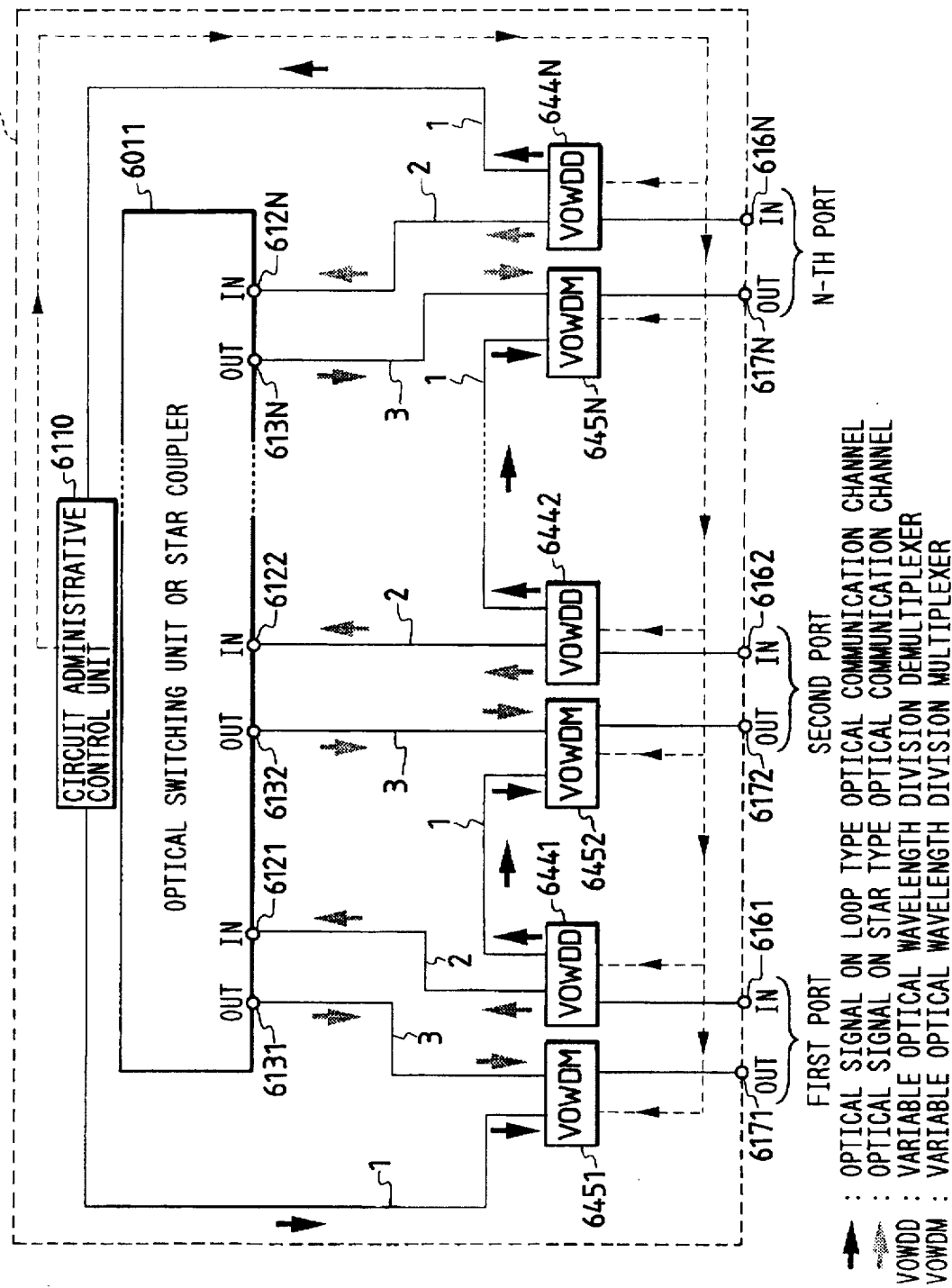
FIG. 38 is a block diagram showing the twentieth embodiment of an optical concentrator according to the present invention.
Figure 39:
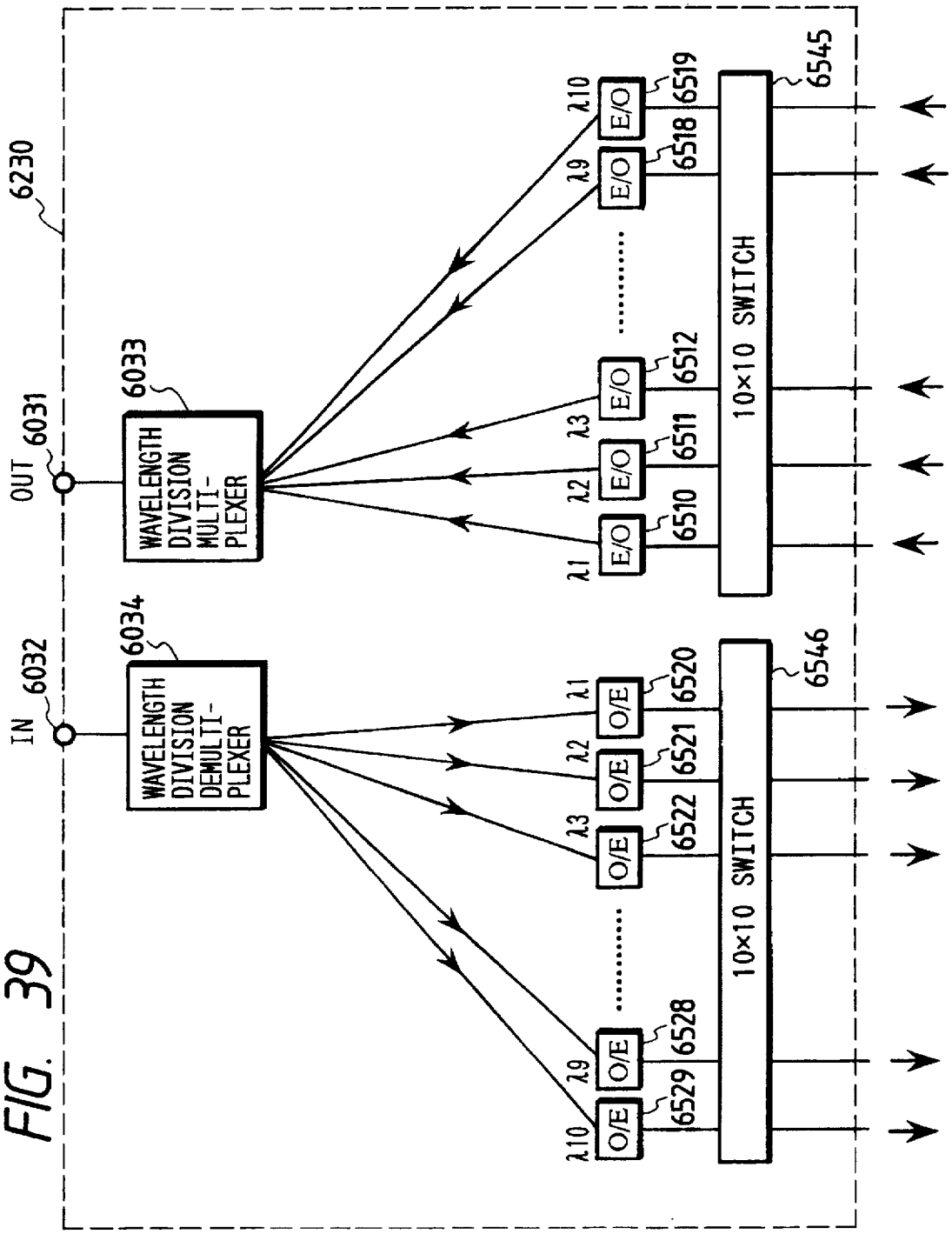
FIG. 39 is a block diagram showing the arrangement of an optical node connected to the optical concentrator shown in FIG. 38.

FIGS. 38 and 39 are views showing the twentieth embodiment of the present invention. FIG. 38 shows an optical concentrator according to the twentieth embodiment of the present invention. FIG. 39 shows the arrangement of an optical node connected to the optical concentrator shown in FIG. 38. The optical concentrator of this embodiment is suitably used in the optical communication network in FIG. 6 or 21.

Referring to FIG. 38, variable wavelength division demultiplexers 6441, 6442, . . . 644N demultiplex wavelength-multiplexed light input from input ports 6161, 6162, . . . 616N of a concentrator 6010 into wavelength-multiplexed light components of two wavelength regions as short and long wavelengths with respect to an arbitrarily set reference wavelength. Control of the reference wavelength for causing the variable wavelength division demultiplexer to demultiplex the input light into two wavelengths is performed by a circuit administrative control unit 6110. Variable wavelength division multiplexers 6451, 6452, . . . 645N multiplex wavelength-multiplexed light components of the respective wavelength regions output from the variable wavelength division demultiplexers 644N, 6441, 6442, . . . 644(N−1) or an optical exchanger. The output terminals of the variable wavelength division multiplexers 6441, 6442, . . . 644N are used as output ports 6171, 6172, . . . 617N of the concentrator 6010 of this embodiment. One output terminal of each of the variable wavelength division demultiplexers is connected to one input terminal of a variable wavelength division multiplexer of the next port. That is, as shown in FIG. 38, one output terminal of the variable wavelength division demultiplexer 6441 is connected to one input terminal of the variable wavelength division multiplexer 6452, and one output terminal of the variable wavelength division demultiplexer 6442 is connected to one input terminal of the variable wavelength division multiplexer 6453 (not shown in FIG. 38). Similarly, one output terminal of the variable wavelength division demultiplexer 644N of the N-th port is connected to one input terminal of the variable wavelength division multiplexer 6451.

Referring to FIG. 39, the node has optical transmitting and receiving means. A 10×10 switch 6545 switches computer or video information input from a computer or external input device to an optical transmitter having a wavelength determined by the circuit administrative control unit 6110. A 10×10 switch 6546 switches data received by each optical receiver to the computer or an external output device.

The operations of the concentrator of this embodiment and an optical communication network using this concentrator will be described with reference to FIGS. 7, 38, and 39. This network has a loop circuit and a switching circuit. The optical routes of the loop and exchange circuits are obtained as follows. For example, an optical signal (e.g., an optical signal of a wavelength λ1 output from a node 231) of the switching circuit passes through a route of an upstream optical fiber 211→the variable wavelength division demultiplexer 6441 in the concentrator 6010→an optical exchanger 6011 (e.g., the optical signal of the wavelength λ1 is input to the output port 6132 of the concentrator 6010)→the variable wavelength division multiplexer 6452→a downstream optical fiber 222, and is then input to a node 232 to form a switching circuit. An optical signal (e.g., an optical signal of a wavelength λ10 is output from the node 231) of the loop circuit passes through a route of the upstream optical fiber 211→the variable wavelength division demultiplexer 6441 in the concentrator 6010→the variable wavelength division multiplexer 6452→the downstream optical fiber 222→the node 232, is electrically repeated by the node 232, converted into the optical signal of the wavelength λ10 again, and is then transmitted to the optical fiber 212. In the same manner as described above, the signal is transmitted through the nodes 232, a node 234, . . . a node 238 to form a loop circuit. In the description of this embodiment, the number of wavelengths to be multiplexed in the network is 10. The wavelength λ1 is the shortest wavelength, and the wavelength λ10 is the longest wavelength. For the descriptive convenience, the output terminals connected to the optical exchangers of all the variable wavelength division demultiplexers and the input/output terminals connected to the optical exchangers of the variable wavelength division multiplexers transmit wavelength-multiplexed light of the long wavelength region, and the other output terminal of each variable wavelength division demultiplexer and the other output terminal of each variable wavelength division multiplexer transmit wavelength-multiplexed light of the short wavelength region. Each wavelength is used for both the loop and switching circuits. In this network, the wavelengths λ4, λ5, λ6, λ7, λ8, λ9, and λ10 are used for the switching circuit, and the wavelengths λ1, λ2, and λ3 are used for the loop circuit. The wavelength λ1 is assigned to communication complying with the FDDI protocol. Assume that time division multiplex communication using the wavelength λ3 of all the wavelengths assigned to the loop and switching circuits is completed, and that the node 231 must transmit video information to the nodes 232 and 234. The node 231 superposes the switching circuit use request information for transmitting video information on the optical signal of the wavelength λ1 (FDDI circuit) and transmits the circuit use request information to the circuit administrative control unit 6110 in the concentrator. The optical signal of the wavelength λ1 is transmitted on the loop circuit and input to the circuit administrative control unit 6110. The circuit administrative control unit 6110 selects the wavelength λ3 as the switching circuit use enable wavelength in response to the switching circuit use request because all the wavelengths λ4 to λ10 assigned to the switching circuit are currently used and the wavelength λ3 assigned to the loop circuit is an unused wavelength. The unused wavelength of the loop circuit is utilized to effectively utilize the usable wavelengths (the number of usable circuits) on the network. The circuit administrative control unit 6110 uses the optical signal (FDDI circuit) of the wavelength λ1 to transmit the information of the selected wavelength λ3 to the node 231. At the same time, the circuit administrative control unit 6110 sets the reference wavelength of each of the variable wavelength division demultiplexers and multiplexers in the concentrator 6010 to fall between the wavelengths λ2 and λ3 so that the route of the optical signal of the wavelength λ3 is set to a circuit switching type route. The node 231 controls the 10×10 switch to input video information to the optical transmitter 6512 having the oscillation wavelength λ3. The optical signal of the wavelength λ3 output from the node 231 is transmitted on the switching circuit described above and input to the nodes 232 and 234.

Assume that transmission of the video information from the node 232 is completed, and that the node 232 must transmit computer information to the node 231. The node 232 uses the loop circuit to transmit computer information in accordance with the time division multiplex communication method. The node 232 transmits the loop circuit use request information to the circuit administrative control unit 6110 in the concentrator. The circuit administrative control unit 6110 selects the wavelength λ3 as the loop circuit use enable wavelength of the node 232 in response to the loop circuit use request because all the wavelengths λ1 and λ2 assigned to the loop circuit are currently used, and the wavelength λ3 assigned to the loop circuit is an unused wavelength, thereby selecting the wavelength λ3. The unused wavelength assigned to the switching circuit can be effectively utilized. The circuit administrative control unit 6110 transmits information of the selected wavelength to the node 232. At the same time, the circuit administrative control unit 6110 sets the reference wavelength of each of the variable wavelength division demultiplexers and multiplexers in the concentrator 6010 to fall between the wavelengths λ2 and λ3 to control the variable wavelength division demultiplexer and multiplexer so that the optical signals of the wavelengths λ1 to λ3 output from the variable wavelength division demultiplexer are input to the variable wavelength division multiplexer of the next port to form a loop circuit. The node 232 controls the 10×10 switch to input the computer information to the optical transmitter 6512 having the oscillation wavelength λ3. The optical signal of the wavelength λ3 output from the node 231 is input to the node 231 again through the above-described loop circuit.

Communication of an optical network in which a plurality of concentrators of this embodiment are connected in a radial form will be described with reference to FIG. 21. The operation of a network using one concentrator of this type, and the same operations as in the nineteenth embodiment will be omitted. Assume that a loop circuit communication request is sent to from a node 5006 to a node 5003, and that the circuit administrative control unit 6110 (this circuit administrative control unit is included in the concentrator connected to the node 5006) assigns the unused wavelength λ3 assigned to the switching circuit to a loop circuit wavelength. The circuit administrative control unit 6110 informs the respective circuit administrative control units 6110 in the respective concentrators and the nodes on the network that the wavelength λ3 is newly assigned to the loop circuit. The circuit administrative control unit 6110 of each concentrator sets the reference wavelength of each of the variable wavelength division multiplexer and demultiplexer to fall between λ3 and λ4 and inputs the optical signals of the wavelengths λ1 to λ3 output from the variable wavelength division demultiplexer to the variable wavelength division multiplexer of the next port, thereby forming a loop circuit. The node 5006 outputs the optical signal of the wavelength λ3 and transmits it in the loop circuit of 5006→5013→5011→5012→5001→5012→5002→5012→5003.

An operation for sending a switching circuit communication request from the node 5006 to the node 5003 and causing the circuit administrative control unit 6110 (this circuit administrative control unit is included in the concentrator 5013 connected to the node 5006) to assign the unused wavelength λ3 assigned to the loop circuit to the switching circuit will be described below. The circuit administrative control unit 6110 informs the circuit administrative control units 6110 of the concentrators 5013, 5011, and 5012 on the network that the wavelength λ3 is newly assigned to the switching circuit. The circuit administrative control unit of each of the concentrators 5013, 5011, and 5012 on the network sets the reference wavelength of each of the variable wavelength division multiplexer and demultiplexer in each concentrator to fall between λ2 and λ3 to control them so that the optical signals of the wavelengths λ3 to λ10 output from the variable wavelength division demultiplexer are input to the optical exchanger 6011 to form a switching circuit. After the switching circuit type optical route is established, the node 5006 outputs the optical signal of the wavelength λ3, and the optical signal of the wavelength λ3 is transmitted in the route of 5006→5013→5011→5012→5003.

In this embodiment, the optical exchanger of this embodiment is controlled by a method of supplying an external control signal directly to the optical exchange, a method of arranging an optical receiver in part of the loop or circuit switching type optical signal route in the concentrator, supplying a control signal from a node connected to this concentrator, causing the optical receiver to receive the control signal, and supplying the control signal from the optical receiver to the optical exchanger, or by a method of forming a control information portion in part of a transmission signal, causing an optical receiver located on the loop or circuit switching type optical channel to read this information, and controlling the optical exchanger by the optical receiver.

The variable wavelength division multiplexer and demultiplexer arranged between the input/output port of the concentrator and the input/output port of the optical exchanger are controlled by a method of arranging optical receivers in parts of the loop and switching circuit type optical signal channels, always monitoring a use condition of each circuit, and causing the circuit control unit in the concentrator to optimally select a use enable wavelength of each circuit in accordance with the use condition, a method of directly supplying an external control signal to the variable wavelength division multiplexer and demultiplexer in the concentrator, a method of arranging an optical receiver at a common portion of the loop and switching circuit type optical signal channels in the concentrator, supplying a control signal from a node connected to this concentrator, causing the optical receiver to receive a control signal, and supplying the control signal from the optical receiver to the circuit administrative control unit 6110, or a method of arranging a control information portion in part of a transmission signal, causing the optical receiver located on the loop or circuit switching type optical channel to read the control information, and controlling the variable wavelength division multiplexer and demultiplexer from the optical receiver.

In this embodiment, the circuit administrative control unit 6110 is located on the loop circuit between the wavelength division multiplexer 644N and the wavelength division demultiplexer 6451. The position of the circuit administrative control unit 6110 is not limited to this. The circuit administrative control unit may be arranged on the loop or switching circuit.

The variable wavelength division demultiplexer and multiplexer can be realized by changing the incident angle of a multilayered dielectric film of a multiplexing/demultiplexing device.

In this embodiment, the concentrator using the optical exchanger has been described. However, star communication using a star coupler in this portion can be performed.

A method of transmitting video date on the switching circuit and computer information on the loop circuit has been described. However, the types of data transmitted through the respective circuits are not limited to specific ones.

The network can be properly operated when at least one variable wavelength light source and at least one variable wavelength filter are used as the light source and filter of the wavelengths used.

The number of wavelengths used in this embodiment is ten. However, the number of wavelengths to be multiplexed is not limited to ten.

Figure 40:
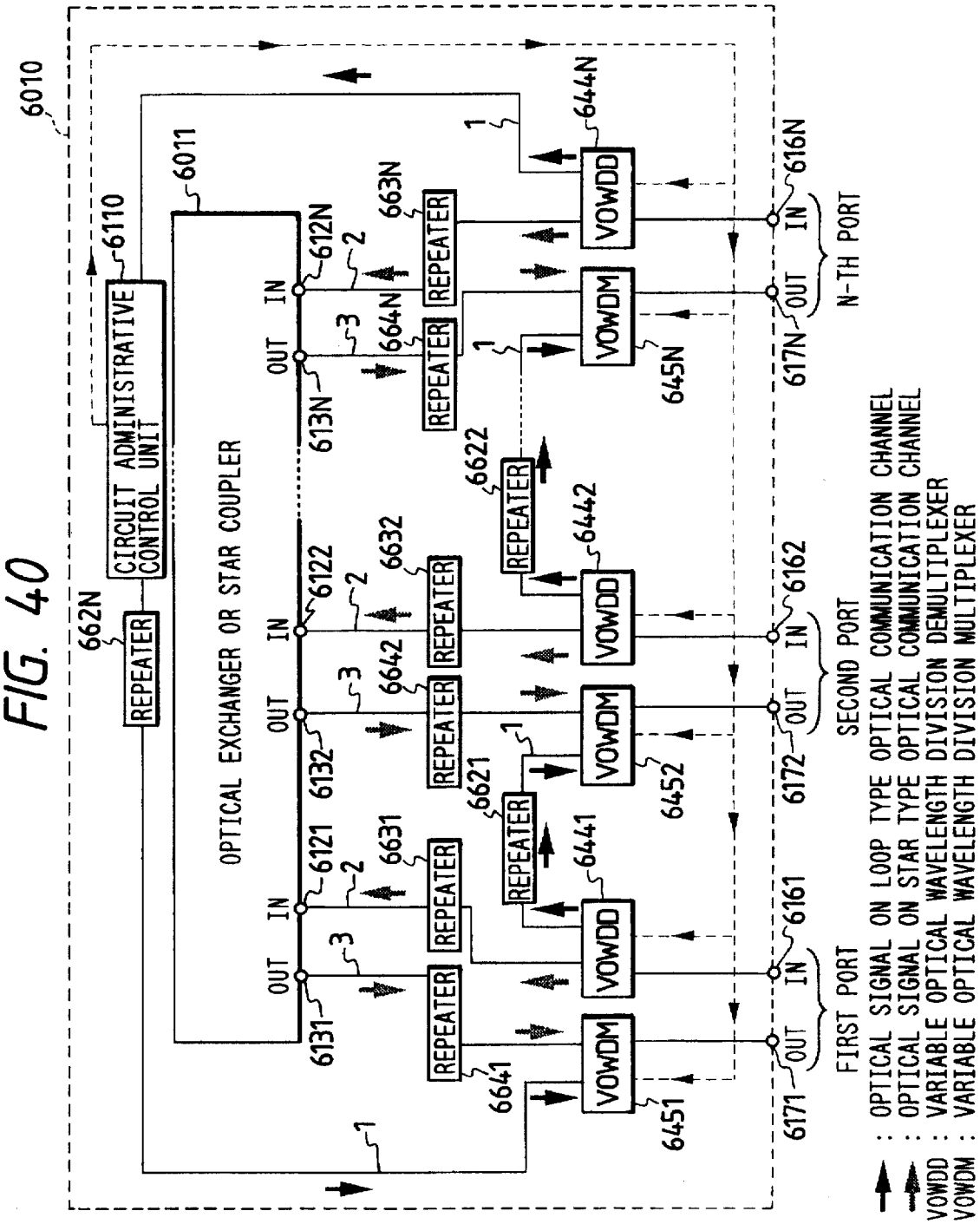
FIG. 40 is a block diagram showing the twenty-first embodiment of an optical concentrator according to the present invention.

The twenty-first embodiment of the present invention will be described with reference to FIG. 40. FIG. 40 shows the arrangement of the twenty-first embodiment of a concentrator according to the present invention. The same reference numerals as in the twenty embodiment shown in FIG. 38 denote the same parts in the twenty-first embodiment. The twenty-first embodiment is different from the twentieth embodiment in that first repeaters 6621, 6622, . . . 662N for repeating and amplifying a loop circuit wavelength-multiplexed optical signal are arranged between the output terminals of the loop circuit wavelength-multiplexed light of the variable wavelength division demultiplexers of the respective ports and the variable wavelength division multiplexers of the next ports (for example, 6452 for 6441 and 6451 for 644N), that second repeaters 6631, 6632, . . . 663N for repeating and amplifying circuit switching wavelength-multiplexed light are arranged between input terminals 6121, 6122, . . . 612N of an optical exchanger 6011 and variable wavelength division demultiplexer 6441, 6442, . . . 644N connected thereto, and that third repeaters 6641, 6642, . . . 664N for repeating and amplifying switching circuit wavelength-multiplexed light are arranged between output terminals 6131, 6132, . . . 613N and variable wavelength division multiplexers 6651, 6652, . . . 665N connected thereto. Optical amplifiers for amplifying and repeating optical signals are suitably used as the first, second and third repeaters. In particular, when wavelength multiplexing is performed within the above wavelength region, the optical amplifier can be preferably used as a repeater. However, wavelength multiplexing is not performed within the wavelength region, an electrical regenerative repeater for temporarily converting a signal into an electrical signal and converting the electrical signal into the optical signal again can be used.

Of all the operations of the concentrator 6810 of this embodiment, points different from the twentieth embodiment will be described below. The first repeaters are arranged to compensate for optical losses of the wavelength-multiplexed light of the loop circuit input to the input ports of the concentrator 6010, which losses are caused by the variable wavelength division demultiplexer and multiplexer. The intensity of the optical signal input to the optical receiver for the each wavelength-multiplexed light for the loop circuit at the connected node can be increased. The second and third repeaters can compensate for the optical losses of the wavelength-multiplexed light for the switching circuit input to the input ports of the concentrator 6010, which losses are caused by the variable wavelength division multiplexer and demultiplexer and the optical exchanger. The intensity of the optical signal input to the optical receiver for the wavelength-multiplexed light for the switching circuit of the connected node can be increased. In particular, when the number of input and output terminals of the optical exchanger is increased, the optical losses are increased, so that the first to third repeaters are effective.

Assume that the intensity of an optical signal from an optical transmitter is sufficiently high, that the reception sensitivity of an optical receiver is sufficiently high, and that the optical losses of the variable wavelength division multiplexer and multiplexer and the optical exchanger are sufficiently small. All the first, second, and third repeaters need not be arranged, and some of them can be omitted. The repeaters need not be arranged at the respective ports, and some of them may be omitted, as needed.

The concentrator 6010 of this embodiment is suitably used in the optical communication network shown in FIG. 7, thereby providing a wavelength-multiplexed optical communication network having a sufficiently large margin of the intensities of optical signals.

The concentrator 6010 of this embodiment can be arranged on the basis of the basis arrangement of the twentieth embodiment. However, an arrangement based on the basic arrangement of the nineteenth embodiment can also be assumed.

Figure 41:
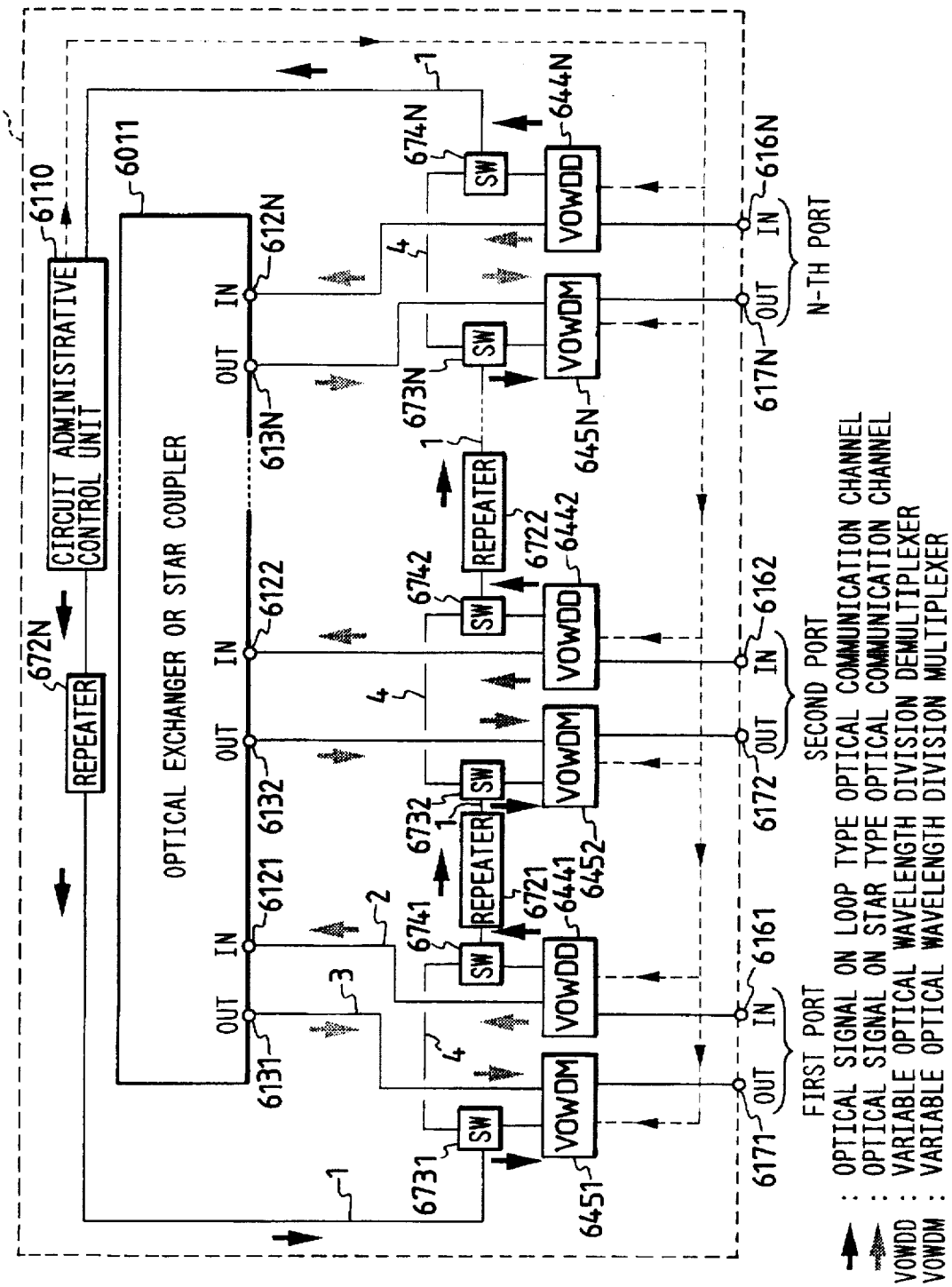
FIG. 41 is a block diagram showing the twenty-second embodiment of an optical concentrator according to the present invention.

The twenty-second embodiment of the present invention will be described with reference to FIG. 41. FIG. 41 shows the arrangement showing the twenty-second embodiment of a concentrator according to the present invention.

A concentrator 6010 of this embodiment is basically the same as the concentrator 6010 of the twentieth embodiment shown in FIG. 38. The same reference numerals as in the twentieth embodiment denote the same parts in FIG. 41. The twenty-second embodiment is different from the twentieth embodiment in that a countermeasure means is arranged in the concentrator when wavelength-multiplexed light components of the loop circuit output from output ports of the concentrator are not input to the concentrator from input ports which constitute pairs with the output ports due to the failure of a node connected to the input/output port and disconnections of optical fibers for connecting the concentrator and the nodes, or when signal degradation occurs even if the signals are input to the input ports. The arrangement of the concentrator having this failure countermeasure means is shown in FIG. 41. More specifically, when a failure has occurred, an optical signal of the wavelength-multiplexed light of the loop circuit is not supplied to this port. For this purpose, first optical switches 6731, 6732, . . . 673N are connected to the input terminals of the wavelength-multiplexed light of the loop circuit of variable wavelength division multiplexers of the respective ports, and second optical switches 6741, 6742, . . . 674N and repeaters 6721, 6722, . . . 672N for repeating and amplifying the wavelength-multiplexed light of the loop circuit are connected to the output terminals of the wavelength-multiplexed light at the loop circuit of variable wavelength division demultiplexers. When a failure has occurred in a terminal or a transmission channel, the optical signal of the loop circuit passes through the first and second switches of the failed port. The above repeaters are arranged for compensation of losses of the optical signals and are constituted by optical amplifiers or electrical regenerative repeaters. If optical losses do not pose any problem, the repeaters may be omitted.

Of the operations of the concentrator 6010 of this embodiment, points different from the twentieth embodiment will be described. Assume that a failure does not have occurred. For example, an optical signal of the loop circuit wavelength input from the input port 6161 to the concentrator 6010 is output from the variable wavelength division demultiplexer 6141, passes through the second optical switch 6741, is amplified by the repeater 6721, input to the variable wavelength division multiplexer 6452 through the first optical switch 6732, and then output from the output port 6172. This signal is received by the node connected to the output port 6172 and the input port 6162. After the signal is properly processed, the signal is output as an optical signal of the loop circuit wavelength. This signal is then input from the input port 6162 to the concentrator 6010. The optical signal of the loop circuit wavelength is output from the variable wavelength division demultiplexer 6442, passes through the second optical switch 6742, and is then input to the repeater 6722. Optical signals of the loop circuit wavelength from the remaining ports are similarly transmitted. For example, if a failure has occurred in the node connected to the output port 6172 and the input port 6162 or a failure such as the disconnection of the connected optical fiber to fail to input the wavelength-multiplexed light of the loop circuit to the input port 6162, output light from the first optical switch 6732 is input to the second optical switch 6742 and then to the repeater 6722. In this manner, interruption of the optical signal which is caused by the failure can be prevented. Interruption of the optical signals caused by the failures in other ports can also be prevented in the same manner as described above.

This embodiment exemplifies one failure countermeasure means. Any other arrangement may be employed if the optical signal of the wavelength-multiplexed light of the loop circuit input from the input port of a port immediately preceding the failed port is output to the output port of a port succeeding the failed port.

If the means for preventing interruption of the wavelength-multiplexed light of the loop circuit is arranged outside the concentrator or a node or optical fiber whose reliability is assured is connected to the network, the port failure countermeasure means may be omitted.

Although a failure detecting means is not illustrated in FIG. 41, a means for monitoring the optical signal and detecting the failure may be arranged on the passing route of the wavelength-multiplexed light of the loop circuit input from the input port may be arranged, as needed.

The present invention is not limited to the particular embodiments described above. Various changes and modifications may be made. The present invention incorporates these applications without departing the scope of the appended claims.

What is claimed is:

1. An optical concentrator which is utilized in an optical communication network comprising an optical concentrator and a plurality of nodes respectively connected to said optical concentrator comprising:

N where N is an integer of not less than two) ports for inputting and outputting first and second optical signals having different wavelength regions, said N ports including a plurality of ports each of which is connected to a node;

an optical coupler connected to each of said N ports, said optical coupler transmitting the second optical signal input from one of said N ports to at least one of the remaining ports;

transmitting means for connecting said N ports in a loop form and transmitting the first optical signal input from each of said N ports; and demultiplexing means, arranged at each of said N ports, for demultiplexing the first and second optical signals input from each of said N ports, and guiding the first optical signal to said transmitting means and the second optical signal to said optical coupler.

2. A concentrator according to claim 1, wherein each of said N ports comprises an input terminal and an output terminal, and said demultiplexing means comprises N wavelength division demultiplexers each of which is connected to said input terminal of each of said N ports.

3. A concentrator according to claim 2, further comprising multiplexing means, arranged at each of said N ports, for multiplexing the first optical signal transmitted by said transmitting means and the second optical signal output from said optical coupler and outputting the multiplexed signal to each of said N ports.

4. A concentrator according to claim 3, wherein said multiplexing means comprises N wavelength division multiplexers each of which is connected to said output terminal of each of said N ports.

5. A concentrator according to claim 4, wherein said transmitting means connects one of said N wavelength division demultiplexers and one of said N wavelength division multiplexers which are connected to different ports.

6. A concentrator according to claim 1, wherein said optical coupler comprises a star coupler for dividing the second optical signal input from one of said N ports to all ports.

7. A concentrator according to claim 1, wherein said optical coupler comprises an optical exchanger for selectively transmitting the second optical signal input from one of said N ports to at least one of the remaining ports.

8. A concentrator according to claim 1, wherein said N ports input and output third and fourth optical signals having wavelength regions different from those of the first and second optical signals, said optical concentrator further comprises another optical coupler connected to said each of said N ports, said another optical coupler transmitting the fourth optical signal input from one of said N ports to at least one of the remaining ports, and another transmitting means for connecting said N ports in a loop form and transmitting the third optical signal input from each of said N ports, and said demultiplexing means demultiplexes the third and fourth optical signals input from each of said N ports, and guides the third optical signal to said another transmitting means and the fourth optical signal to said another optical coupler.

9. A concentrator according to claim 1, wherein one of said N ports comprises a repeating port, and said optical coupler comprises a first tree coupler for dividing the second optical signal input from said repeating port to all ports except for said repeating port, and a second tree coupler for transmitting the second optical signal input from all the ports except for said repeating port to said repeating port.

10. A concentrator according to claim 9, wherein said repeating port comprises an input unit and an output unit, and said optical concentrator further comprises switch means for directly and selectively inputting the first and second optical signals output from said output unit of said repeating port to said input unit of said repeating port.

11. A concentrator according to claim 1, further comprising a repeater, arranged in said transmitting means for connecting each of said N ports, for amplifying the first optical signal transmitted through said transmitting means.

12. A concentrator according to claim 1, further comprising a repeater, arranged between each of said N ports and said optical coupler, for amplifying the second optical signals input to and output from each of said N ports.

13. A concentrator according to claim 1, further comprising switch means for coupling said transmitting means without being through a failed port when a failure has occurred in any one of said N ports.

14. A concentrator according to claim 13, wherein each of said N ports comprises an input terminal and an output terminal, and said switch means comprises first and second optical switches arranged on said transmitting means, said first and second optical switches corresponding to each of said output and input terminals, and a transmission channel for directly connecting said first and second optical switches corresponding to each of said output and input terminals of each of said N ports.

15. A concentrator according to claim 1, further comprising wavelength converting means, connected to each of said N ports, for converting a wavelength of the second optical signal input from each of said N ports to said optical coupler.

16. A concentrator according to claim 15, further comprising wavelength control means, connected to said transmitting means, for controlling said wavelength converting means in accordance with the first optical signal transmitted by said transmitting means.

17. A concentrator according to claim 1, wherein the first optical signal comprises a plurality of optical signals having different wavelengths in a predetermined wavelength region, said transmitting means comprises a plurality of transmission channels, and said demultiplexing means further demultiplexes the plurality of optical signals and guides the optical signals to different ones of said plurality of transmission channels.

18. An optical communication network comprising:

an optical concentrator having N (where N is an integer of not less than two) ports for inputting and outputting first and second optical signals having different wavelength regions; and a plurality of nodes each of which is connected to any one of said N ports of said optical concentrator;

said optical concentrator comprising:

an optical coupler connected to each of said N ports, said optical coupler transmitting the second optical signal input from one of said N ports to at least one of the remaining ports, transmitting means for connecting said N ports in a loop form and transmitting the first optical signal input from each of said N ports; and demultiplexing means, arranged at each of said N ports, for demultiplexing the first and second optical signals input from each of said N ports, and guiding the first optical signal to said transmitting means and the second optical signal to said optical coupler.

19. A network according to claim 18, wherein each of said N ports of said optical concentrator comprises an input terminal and an output terminal, and said demultiplexing means comprises N wavelength division demultiplexers, each of which is connected to said input terminal of each of said N ports.

20. A network according to claim 19, wherein said optical concentrator further comprises multiplexing means, arranged at each of said N ports, for multiplexing the first optical signal transmitted by said transmitting means and the second optical signal output from said optical coupler, and outputting the multiplexed signal to each of said N ports.

21. A network according to claim 20, wherein said multiplexing means comprises N wavelength division multiplexers each of which is connected to said output terminal of each of said N ports.

22. A network according to claim 21, wherein said transmitting means connects one of said N wavelength division demultiplexers and one of said N wavelength division multiplexers which are connected to different ports.

23. A network according to claim 18, wherein each of said plurality of nodes comprises a first optical transmitter for generating the first optical signal, a second optical transmitter for generating the second optical signal, a wavelength division multiplexer for multiplexing the first and second optical signals and outputting the multiplexed signal to a port of said optical concentrator, a wavelength division demultiplexer for demultiplexing the first and second optical signals input from a port of said optical concentrator, a first optical receiver for receiving the first optical signal demultiplexed by said wavelength division demultiplexer, and a second optical receiver for receiving the second optical signal demultiplexed by said wavelength division demultiplexer.

24. A network according to claim 23, wherein said second optical transmitter comprises a variable wavelength semiconductor laser, and each node further comprises a variable wavelength filter arranged between said wavelength division demultiplexer and said second optical receiver.

25. A network according to claim 18, further comprising another optical concentrator connected to one of said N ports of said optical concentrator.

26. A network according to claim 18, wherein said optical coupler comprises a star coupler for dividing the second optical signal input from one of said N ports to all ports.

27. A network according to claim 18, wherein said optical coupler comprises an optical exchanger for selectively transmitting the second optical signal input from one of said N ports to at least one of the remaining ports.

28. A network according to claim 18, further comprising a repeater, arranged in said transmitting means for connecting each of said N ports, for amplifying the first optical signal transmitted through said transmitting means.

29. A network according to claim 18, further comprising a repeater, arranged between each of said N ports and said optical coupler, for amplifying the second optical signal input to and output from each of said N ports.

30. A network according to claim 18, further comprising switch means for coupling said transmitting means without being through a failed port when a failure has occurred in any one of said N ports.

31. A network according to claim 30, wherein each of said N ports comprises an input terminal and an output terminal and said switch means comprises first and second optical switches arranged on said transmitting means, said first and second optical switches corresponding to each of said output and input terminals, and a transmission channel for directly connecting said first and second optical switches corresponding to each of said output and input terminals of each of said N ports.

32. A network according to claim 18, wherein said optical concentrator further comprises wavelength converting means, connected to each of said N ports, for converting a wavelength of the second optical signal input from each of said N ports to said optical coupler.

33. A network according to claim 32, wherein said optical concentrator further comprises wavelength control means, connected to said transmitting means, for controlling said wavelength converting means in accordance with the first optical signal transmitted by said transmitting means.

34. A network according to claim 18, wherein the first optical signal comprises a plurality of optical signals having different wavelengths in a predetermined wavelength region, said transmitting means comprises a plurality of transmission channels, and said demultiplexing means further demultiplexes the plurality of optical signals and guides the optical signals to different ones of said plurality of transmission channels.

35. A network according to claim 18, wherein said optical concentrator is a first optical concentrator, and one of said N ports comprises a repeating port, and said optical coupler comprises a first tree coupler for dividing the second optical signal input from said repeating port to all ports except for said repeating port, and a second tree coupler for transmitting the second optical signal input from all the ports except for said repeating port to said repeating port, and said network further comprising a second optical concentrator which connects to said repeating port.

36. A network according to claim 35, said first optical concentrator further comprising:
first demultiplexing means, arranged at said repeating port, for demultiplexing the first and second optical signals input from said repeating port, and guiding the first optical signal to said transmitting means and the second optical signal to said first tree coupler; and
second demultiplexing means, arranged at each port except for said repeating port, for demultiplexing the first and second optical signals input from each port, and guiding the first signal to said transmitting means and the second optical signal to said second tree coupler.

37. A network according to claim 36, wherein said first optical concentrator further comprises first multiplexing means, arranged at said repeating port, for multiplexing the first optical signal transmitted through said transmitting means and the second optical signal output from said second tree coupler, and outputting the multiplexed signal to said repeating port, and second multiplexing means, arranged at each port except for said repeating port, for multiplexing the first optical signal transmitted through said transmitting means and the second optical signal output from said first tree coupler, and outputting a multiplexed signal to each port except for said repeating port.

38. A network according to claim 36, wherein said repeating port comprises an input unit and an output unit, and said first concentrator further comprises switch means for selectively and directly inputting the first and second optical signals output from said output unit of said repeating port to said input unit of said repeating port.

39. A method of transmitting optical signals using an optical concentrator which is utilized in an optical communication network comprising an optical concentrator and a plurality of nodes respectively connected to said optical concentrator, comprising N (where N is an integer of not less than two) ports, said N ports including a plurality of ports, each of which is connected to a node, an optical coupler having N ports each of which is connected to one of said N ports, and transmitting means for connecting said N ports in a loop form, comprising the steps of:

inputting first and second optical signals having different wavelength regions from one of said N ports;

demultiplexing the first and second optical signals input from said one port;

transmitting the demultiplexed first optical signal through said transmitting means; and transmitting the demultiplexed second optical signal to at least one of the remaining ports by said optical coupler.

40. A method according to claim 39, further comprising the steps of: multiplexing the first optical signal transmitted through said transmitting means and the second optical signal transmitted by said optical coupler; and outputting a multiplexed signal to at least one of the remaining ports.

41. A method according to claim 39, further comprising the step of coupling said transmitting means without being through a failed port when a failure has occurred in any one of said N ports.

42. A method according to claim 39, further comprising the step of converting a wavelength of the second optical signal input from each so said N ports to said optical coupler.

43. A method according to claim 42, further comprising the step of controlling wavelength conversion of the second optical signal in accordance with the first optical signal transmitted through said transmitting means.

44. An optical concentrator which is utilized in an optical communication network comprising an optical concentrator and a plurality of nodes respectively connected to said optical concentrator comprising:

N (where N is an integer of not less than two) ports for inputting and outputting optical signals, said N ports including a plurality of ports each of which is connected to a node;

N wavelength division demultiplexers, respectively, connected to said N ports, for demultiplexing the optical signals input from said N ports into first and second portions;

an optical coupler, connected to said N wavelength division demultiplexers, for outputting the second portion of the optical signal input from one of said N ports to at least one of remaining ports; and N wavelength division multiplexers, respectively connected to said N ports and arranged such that a first wavelength division multiplexer of said N wavelength division multiplexers multiplexes the first portion of the optical signal demultiplexed by an N-th wavelength division demultiplexer and the second portion of the optical signal output from said optical coupler, and a k-th (where k=2, . . . N) wavelength division multiplexer multiplexes the first portion of the optical signal demultiplexed by a (k−1)-th wavelength division demultiplexer and the second portion of the optical signal output from said optical coupler.

45. A concentrator according to claim 44, wherein said optical coupler comprises a star coupler for transmitting the second portion of the optical signal input from one of said N ports to all ports.

46. A concentrator according to claim 44, wherein said optical coupler comprises an optical exchanger for selectively transmitting the second portion of the optical signal input from one of said N ports to at least one of the remaining ports.

47. A concentrator according to claim 44, wherein one of said N ports comprises a repeating port, and said optical coupler comprises a first tree coupler for dividing the second portion of the optical signal input from said repeating port to all ports except for said repeating port and a second tree coupler for transmitting the second portion of the optical signal input from all the ports except for said repeating port to said repeating port.

48. A concentrator according to claim 47, wherein said repeating port comprises an input unit and an output unit, and said optical concentrator further comprises switch means for directly and selectively inputting the first portion of the optical signal and the second portion of the optical signal which are output from said output unit of said repeating port to said input unit of said repeating port.

49. A concentrator according to claim 44, further comprising transmitting means for connecting said wavelength division demultiplexers and said wavelength division multiplexers and a repeater for amplifying the first portion of the optical signal transmitted through said transmitting means.

50. A concentrator according to claim 44, further comprising repeaters, arranged between each of said N wavelength division demultiplexers and said optical coupler and between each of said wavelength division multiplexers and said optical coupler, for inputting and outputting the second portion of the optical signal to all the ports.

51. A concentrator according to claim 44, further comprising switch means for coupling said transmitting means without being through a failed port when a failure has occurred in any one of said N ports.

52. A concentrator according to claim 51, wherein each of said N ports comprises an input terminal and an output terminal, and said switch means comprises first and second optical switches arranged on said transmitting means, said first and second optical switches corresponding to each of said output and input terminals, and a transmission channel for directly connecting said first and second optical switches corresponding to each of said output and input terminals of each of said N ports.

53. A concentrator according to claim 44, further comprising wavelength converting means, connected to each of said N wavelength division demultiplexers, for converting a wavelength of the second portion of the optical signal input from each of said N wavelength division demultiplexers to said optical coupler.

54. A concentrator according to claim 53, further comprising transmitting means for connecting each of said N wavelength division demultiplexers and each of said N wavelength division multiplexers and wavelength control means for controlling said wavelength converting means in accordance with the first portion of the optical signal transmitted by said transmitting means.

55. A concentrator according to claim 44, further comprising a plurality of transmission channels for connecting said wavelength division demultiplexers and said wavelength division multiplexers, the first portion of the optical signal comprises a plurality of optical signals having different wavelengths in a predetermined wavelength region, and said each wavelength division demultiplexer further demultiplexes the plurality of signals and guides the signals to different ones of said transmission channels.

56. An optical communication network comprising:

an optical concentrator having N (where N is an integer of not less than two) ports for inputting and outputting optical signals; and a plurality of nodes each of which is connected to any one of said N ports of said optical concentrator;

said optical concentrator comprising:

N wavelength division demultiplexers, respectively, connected to said N ports, for demultiplexing the optical signals input from said N ports into first and second portions, an optical coupler, connected to said N wavelength division demultiplexers, for outputting the second portion of the optical signal input from one of said N ports to at least one of remaining ports, and N wavelength division multiplexers, respectively connected to said N ports and arranged such that a first wavelength division multiplexer of said N wavelength division multiplexers multiplexes the first portion of the optical signal demultiplexed by an N-th wavelength division demultiplexer and the second portion of the optical signal output from said optical coupler, and a k-th (where k=2, . . . N) wavelength division multiplexer multiplexes the first portion of the optical signal demultiplexed by a (k−1)-th wavelength division demultiplexer and the second portion of the optical signal output from said optical coupler.

57. A network according to claim 56, wherein each of said plurality of nodes comprises a first optical transmitter for Generating the first portion of the optical signal, a second optical transmitter for Generating the second portion of the optical signal, a wavelength division multiplexer for multiplexing the first portion of the optical signal and second portion of the optical signal and outputting the multiplexed signal to a port of said optical concentrator, a wavelength division demultiplexer for demultiplexing the first portion of the optical signal and second portion of the optical signal input from a port of said optical concentrator, a first optical receiver for receiving the first portion of the optical signal demultiplexed by said wavelength division demultiplexer, and a second optical receiver for receiving the second portion of the optical signal demultiplexed by said wavelength division demultiplexer.

58. A network according to claim 57, wherein said second optical transmitter comprises a variable wavelength semiconductor laser, and each node further comprises a variable wavelength filter arranged between said wavelength division demultiplexer and said second optical receiver.

59. A network according to claim 56, further comprising another optical concentrator connected to one of said N of ports of said optical concentrator.

60. A network according to claim 56, wherein said optical coupler comprises a star coupler for dividing the second portion of the optical signal input from one of said N of ports to all ports.

61. A network according to claim 56, wherein said optical coupler comprises an optical exchanger for selectively transmitting the second portion of the optical signal input from one of said N ports to at least one of the remaining ports.

62. A network according to claim 56, wherein one of said N ports comprises a repeating port, and said optical coupler comprises a first tree coupler for dividing the second portion of the optical signal input from said repeating port to all ports except for said repeating port and a second tree coupler for transmitting the second portion of the optical signal input from all the ports except for said repeating port to said repeating port.

63. A network according to claim 62, wherein said repeating port comprises an input unit and an output unit, and said optical concentrator further comprises switch means for directly and selectively inputting the first portion of the optical signal and the second portion of the optical signal which are output from said output unit of said repeating port to said input unit of said repeating port.

64. A network according to claim 56, wherein said optical concentrator further comprises transmitting means for connecting said wavelength division demultiplexers and said wavelength division multiplexers and a repeater for amplifying the first portion of the optical signal transmitted through said transmitting means.

65. A network according to claim 56, wherein said optical concentrator further comprises repeaters, arranged between each of said wavelength division demultiplexers and said optical coupler and between each of said wavelength division multiplexers and said optical coupler, for inputting and outputting the second portion of the optical signal to all the ports.

66. A network according to claim 56, wherein said optical concentrator further comprises switch means for coupling said transmitting means without being through a failed port when a failure has occurred in any one of said N of ports.

67. A network according to claim 66, wherein each of said N ports comprises an input terminal and an output terminal, and said switch means comprises first and second optical switches arranged on said transmitting means, said first and second optical switches corresponding to each of said output and input terminals, and a transmission channel for directly connecting said first and second optical switches corresponding to each of said output and input terminals of each of said N ports.

68. A network according to claim 56, wherein said optical concentrator further comprises wavelength converting means, connected to each of said N wavelength division demultiplexers, for converting the wavelength of the second portion of the optical signal input from each of said N wavelength division demultiplexers to said optical coupler.

69. A network according to claim 68, wherein said optical concentrator further comprises transmitting means for connecting each of said N wavelength division demultiplexers and each of said N wavelength division multiplexers and wavelength control means for controlling said wavelength converting means in accordance with the first portion of the optical signal transmitted by said transmitting means.

70. A network according to claim 56, wherein said optical concentrator further comprises a plurality of transmission channels for connecting said wavelength division demultiplexers and said wavelength division multiplexers, the first portion of the optical signal comprises a plurality of optical signals having different wavelengths in a predetermined wavelength region, and each of said N wavelength division demultiplexers further demultiplexes the plurality of signals and guides the signals to different ones of said transmission channels.

71. An optical concentrator which is utilized in an optical communication network comprising an optical concentrator and a plurality of nodes respectively connected to said optical concentrator comprising:

N (where N is an integer of not less than two) ports for inputting and outputting first and second optical signals, each of said N ports having a first input terminal for inputting the first optical signal, a second input terminal for inputting the second optical signal, a first output terminal for outputting the first optical signal, and a second output terminal for outputting the second optical signal, said N ports including a plurality of ports each of which is connected to a node;

an optical coupler, connected to said second input and output terminals of said N ports, for outputting the second optical signal input from said second input terminal of one of said N ports to said second output terminal of at least one of remaining ports; and transmitting means for connecting said N ports in a loop form, said transmitting means connecting said first input terminal of a first port to said first output terminal of an N-th port and said first input terminal of a k-th (where k=2, . . . N) port to said first output terminal of a (k−1)-th port.

72. A concentrator according to claim 71, wherein said optical coupler comprises an optical exchanger for selectively transmitting the second optical signal input from said second input terminal of one of said N ports to said output terminal of at least one of the remaining ports.

73. A concentrator according to claim 71, further comprising a repeater, arranged in said transmitting means, for amplifying and repeating the first optical signal transmitted through said transmitting means.

74. A concentrator according to claim 71, further comprising repeaters, arranged between said second input terminal of each of said N ports and said optical coupler and between said second output terminal of each of said N ports and said optical coupler, for amplifying the second optical signal.

75. A concentrator according to claim 71, further comprising switch means for coupling said transmitting means without being through a failed port when a failure has occurred in any one of said N ports.

76. A concentrator according to claim 75, wherein each of said. N ports comprises an input terminal and an output terminal, and said switch means comprises first and second optical switches arranged on said transmitting means, said first and second optical switches corresponding to each of said output and input terminals, and a transmission channel for directly connecting said first and second optical switches corresponding to each of said output and input terminals of each of said N ports.

77. An optical communication network comprising:

an optical concentrator having N (where N is an integer of not less than two) ports for inputting and outputting first and second optical signals; and a plurality of nodes each of which is connected to any one of said N ports of said optical concentrator;

each of said N ports of said optical concentrator having a first input terminal for inputting the first optical signal, a second input terminal for inputting the second optical signal, a first output terminal for outputting the first optical signal, and a second output terminal for outputting the second optical signal, and said optical concentrator further comprising:

an optical coupler, connected to said second input and output terminals of said N ports, for outputting the second optical signal input from said second input terminal of one of said N ports to said second output terminal of at least one of remaining ports; and transmitting means for connecting said N ports in a loop form, said transmitting means connecting said first input terminal of a first port to said first output terminal of an N-th port and said first input terminal of a k-th (where k=2, . . . N) port to said first output terminal of a (k−1)-th port.

78. A network according to claim 77, wherein said each node comprises a parallel transmission control unit and a serial transmission control unit.

79. A network according to claim 77, wherein said optical coupler comprises an optical exchanger for selectively transmitting the second optical signal input from said second input terminal of one of said N ports to at least one output terminal of the remaining ports.

80. A network according to claim 77, wherein said optical concentrator further comprises a repeater, arranged in said transmitting means, for amplifying the first optical signal transmitted through said transmitting means.

81. A network according to claim 77, wherein said optical concentrator further comprises repeaters, arranged between said second input terminal of each of said N ports and said optical coupler and between said second output terminal of each of said N ports and said optical coupler, for amplifying the second optical signals.

82. A network according to claim 77, wherein said optical concentrator further comprises switch means for coupling said transmitting means without being through a failed port when a failure has occurred in any one of said N ports.

83. A network according to claim 82, wherein each of said N ports comprises an input terminal and an output terminal, and said switch means comprises first and second optical switches arranged on said transmitting means, said first and second optical switches corresponding to each of said output and input terminals, and a transmission channel for directly connecting said first and second optical switches corresponding to each of said output and input terminals of each of said N ports.

* * * * *

UNITED STATES PATENT AND TRADEMARK OFFICE
CERTIFICATE OF CORRECTION

PATENT NO. : 5,663,818
DATED : September 2, 1997
INVENTOR(S) : Yamamoto et al.

Page 1 of 6

It is certified that error appears in the above-identified patent and that said Letters Patent is hereby corrected as shown below:

TITLE PAGE:

[56] <u>References Cited</u>:

Under "OTHER PUBLICATIONS",

"L. Ciminiera, C. Demartini, A. Serra, a. Valenzano," should read --L. Ciminiera, C. Demartini, A. Serra, A. Valenzano,--.

[57] ABSTRACT:

Line 1, "concentrator" should read --concentrator,--.

<u>SHEET 32 OF THE DRAWINGS</u>:

In Fig. 28B, "PRALLEL" should read --PARALLEL--.

<u>COLUMN 2</u>:

Line 45, "LAND" should read --LAN--.

<u>COLUMN 3</u>:

Line 7, "Signal" should read --signal--.

<u>COLUMN 6</u>:

Line 8, "comprises" should read --comprises:--.

UNITED STATES PATENT AND TRADEMARK OFFICE
CERTIFICATE OF CORRECTION

PATENT NO. : 5,663,818
DATED : September 2, 1997
INVENTOR(S) : Yamamoto et al.

It is certified that error appears in the above-identified patent and that said Letters Patent is hereby corrected as shown below:

COLUMN 7:

Line 18, "exchanges;" should read --exchanger;--; and
    Line 21, "block ,diagram" should read --block diagram--.

COLUMN 9:

Line 65, "region is" should read --region,--; and
    Line 66, "selected," should be deleted.

COLUMN 12:

Line 10, "wavelength" should read --the wavelength--.

COLUMN 17:

Line 17, "particular," should read --particular, since--.

COLUMN 18:

Line 67, "Output" should read --output--.

COLUMN 19:

Line 25, "may be arranged," should be deleted.

UNITED STATES PATENT AND TRADEMARK OFFICE
CERTIFICATE OF CORRECTION

PATENT NO. : 5,663,818
DATED : September 2, 1997
INVENTOR(S) : Yamamoto et al.

It is certified that error appears in the above-identified patent and that said Letters Patent is hereby corrected as shown below:

COLUMN 23:

Line 1, "then" should read --then is--.

COLUMN 27:

Line 45, "constitute" should read --constitutes--.

COLUMN 35:

Line 6, "503," should read --5003,--;
    Line 18, "has" should read --has a--; and
    Line 40, ". to" should read --to--.

COLUMN 39:

Line 33, "does not have" should read --has not--.

COLUMN 40:

Line 34, "of" should read --of the--.

COLUMN 44:

Line 19, "does not have" should read --has not--; and
    Line 30, "input" should read --is input--.

UNITED STATES PATENT AND TRADEMARK OFFICE
CERTIFICATE OF CORRECTION

PATENT NO. : 5,663,818
DATED : September 2, 1997
INVENTOR(S) : Yamamoto et al.

It is certified that error appears in the above-identified patent and that said Letters Patent is hereby corrected as shown below:

COLUMN 46:

Line 33, "or" should read --of--.

COLUMN 48:

Line 55, "fist" should read --first--.

COLUMN 49:

Line 10, "arbitrary" should read --an arbitrary--; and
    Line 35, "4221.  The" should read --4221, the--.

COLUMN 54:

Line 43, "form" should read --from--.

COLUMN 58:

Line 29, ".  the" should read --the--.

COLUMN 61:

Line 11, "multiplexer and demultiplexer" should read --multiplexers and demultiplexers--.

UNITED STATES PATENT AND TRADEMARK OFFICE
CERTIFICATE OF CORRECTION

PATENT NO. : 5,663,818  
DATED : September 2, 1997  
INVENTOR(S) : Yamamoto et al.

Page 5 of 6

It is certified that error appears in the above-identified patent and that said Letters Patent is hereby corrected as shown below:

COLUMN 62:

Line 29, "date" should read --data--; and  
    Line 46, "twenty" should read --twentieth--.

COLUMN 63:

Line 34, "multiplexer" should read --demultiplexer--.

COLUMN 64:

Line 23, "does not have" should read --has not--.

COLUMN 65:

Line 10, "N where" should read --N (where--.

COLUMN 69:

Line 6, "ports" should read --ports,--; and  
    Line 28, "so" should read --of--.

COLUMN 71:

Line 26, "Generating" should read --generating--;  
    Line 27, "Generating" should read --generating--; and  
    Line 50, "N of ports" should read --N ports--.

UNITED STATES PATENT AND TRADEMARK OFFICE
CERTIFICATE OF CORRECTION

PATENT NO. : 5,663,818
DATED : September 2, 1997
INVENTOR(S) : Yamamoto et al.

It is certified that error appears in the above-identified patent and that said Letters Patent is hereby corrected as shown below:

<u>COLUMN 72</u>:

Line 19, "N of ports" should read --N ports--.

<u>COLUMN 73</u>:

Line 30, "said." should read --said--.

Signed and Sealed this

Seventh Day of July, 1998

Attest:

BRUCE LEHMAN

*Attesting Officer*     *Commissioner of Patents and Trademarks*